US011130572B2

(12) United States Patent
Ciesielczyk et al.

(10) Patent No.: US 11,130,572 B2
(45) Date of Patent: Sep. 28, 2021

(54) MOUNTING ASSEMBLY FOR MOUNTING CLAMP

(71) Applicant: Preformed Line Products Co., Mayfield Village, OH (US)

(72) Inventors: Benjamin Franklin Ciesielczyk, Mentor, OH (US); Adam Michael Deel, North Olmsted, OH (US); Cameron Joseph Clines, Gates Mills, OH (US); Jacob Jeffrey Palmer, Chesterland, OH (US); Andrew James Hanneman, Mayfield Heights, OH (US); Jonathon Randall Olszewski, Elyria, OH (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 246 days.

(21) Appl. No.: 16/386,166

(22) Filed: Apr. 16, 2019

(65) Prior Publication Data
US 2019/0315464 A1    Oct. 17, 2019

Related U.S. Application Data

(60) Provisional application No. 62/794,897, filed on Jan. 21, 2019, provisional application No. 62/658,549, filed on Apr. 16, 2018.

(51) Int. Cl.
*B64C 39/02* (2006.01)
*F16B 2/10* (2006.01)
(Continued)

(52) U.S. Cl.
CPC .............. *B64C 39/024* (2013.01); *F16B 2/10* (2013.01); *F16B 2/18* (2013.01); *H02G 1/02* (2013.01);
(Continued)

(58) Field of Classification Search
CPC .......... B64C 2201/00; B64C 2201/027; B64C 2201/042; B64C 2201/108;
(Continued)

(56) References Cited

U.S. PATENT DOCUMENTS

D557,746 S    12/2007  Hammar
7,770,533 B2   8/2010  Ramierz et al.
(Continued)

FOREIGN PATENT DOCUMENTS

WO    2006011990 A2    2/2006

OTHER PUBLICATIONS

Scott Lobermeier, et al., "Mitigating Avian Collision with Power Lines" a Proof of Concept for Installation of Line Markers via Unmanned Aerial Vehicle , Journal of Unmanned Vehicle Systems, Dec. 1, 2015, pp. 252-258, vol. 3, No. 4.
(Continued)

*Primary Examiner* — Robert Sandy
*Assistant Examiner* — David M Upchurch
(74) *Attorney, Agent, or Firm* — Cooper Legal Group LLC

(57) ABSTRACT

An unmanned aerial vehicle for mounting a clamp to a line includes a body, a first propeller attached to the body, a second propeller attached to the body, and a third propeller attached to the body. The body is between at least one of the first propeller and the second propeller, the first propeller and the third propeller, or the second propeller and the third propeller. A guide is attached to the body and is configured to support the clamp for mounting to the line by flying the unmanned aerial vehicle toward the line. The guide is configured to support the clamp such that an imaginary clamp line between a first jaw of the clamp and a second jaw of the clamp when the clamp is in an arrested position is (Continued)

non-parallel to a plane intersecting the first propeller, the second propeller, and the third propeller.

20 Claims, 42 Drawing Sheets

(51) Int. Cl.
*F16B 2/18* (2006.01)
*H02G 1/02* (2006.01)

(52) U.S. Cl.
CPC .... *B64C 2201/027* (2013.01); *B64C 2201/12* (2013.01)

(58) Field of Classification Search
CPC .......... B64C 2201/12; B64C 2201/165; B64C 39/024; F16B 2/10; F16B 2/18; H02G 1/02
See application file for complete search history.

(56) References Cited

U.S. PATENT DOCUMENTS

| | | |
|---|---|---|
| D634,788 S | 3/2011 | Andersson |
| 8,869,732 B1 | 10/2014 | Chervick |
| 9,753,461 B1 * | 9/2017 | Johnson ............... G01R 31/085 |
| 9,764,838 B2 * | 9/2017 | Priest .................. B64C 39/024 |
| 2016/0023761 A1 | 1/2016 | McNally |
| 2016/0121673 A1 * | 5/2016 | Hutson .................. A63H 17/14 |
| | | 244/62 |
| 2016/0122015 A1 * | 5/2016 | Hutson ................. B64C 39/024 |
| | | 244/17.23 |
| 2017/0200530 A1 | 7/2017 | Davis et al. |
| 2017/0313421 A1 * | 11/2017 | Gil ............................ B64F 1/22 |

OTHER PUBLICATIONS

Trend: "Ako pracuje speciály dron od Syker Engineering", Youtube, Nov. 11, 2016, p. 1, https://www.youtube.com/watch?v=qNkBd0UjVRk.

Rick Harness, "Using an Unmanned Aerial Vehicle to Install Wire Markers to Mitigate Bird Collisions ENV-VISION: Environmental Vision", May 25, 2016, pp. 1-42, https://epristorage.blob.core.windows.net/documents/Rick%20Harness_EDM%20International.pdf.

Corresponding International Patent Application No. PCT/US2019/027762, International Search Report and Written Opinion, dated Aug. 23, 2019.

Chris Jumonville, "Bird Diverter Drone Installation", https://www.youtube.com/watch?v=2KDeFVy6uus&feature=youtu.be

* cited by examiner

MOUNTING ASSEMBLY FOR MOUNTING CLAMP

CROSS REFERENCE TO RELATED APPLICATIONS

This application claims priority to U.S. Provisional Patent Application No. 62/658,549 filed on Apr. 16, 2018, entitled "MOUNTING ASSEMBLY FOR MOUNTING CLAMP" and U.S. Provisional Patent Application No. 62/794,897, filed on Jan. 21, 2019, entitled "MOUNTING ASSEMBLY FOR MOUNTING CLAMP," both of which are hereby incorporated by reference herein.

TECHNICAL FIELD

The instant application is directed towards a mounting assembly. For example, the instant application is directed toward a mounting assembly for mounting a clamp to a line.

BACKGROUND

Mounting assemblies may be used for mounting a clamp. Mounting assemblies may be used to mount a clamp to a line.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

According to some embodiments, an unmanned aerial vehicle for mounting a clamp to a line includes a body. The unmanned aerial vehicle also includes first propeller attached to the body, a second propeller attached to the body, and a third propeller attached to the body. The body is between at least one of the first propeller and the second propeller, the first propeller and the third propeller, or the second propeller and the third propeller. The unmanned aerial vehicle further includes a guide attached to the body, the guide is configured to support the clamp for mounting to the line by flying the unmanned aerial vehicle toward the line. The guide is configured to support the clamp such that an imaginary clamp line between a first jaw of the clamp and a second jaw of the clamp when the clamp is in an arrested position is non-parallel to a plane intersecting the first propeller, the second propeller, and the third propeller.

According to some embodiments, an unmanned aerial vehicle for mounting a clamp to a line includes a body having a first side and a second side. The unmanned aerial vehicle also includes a support structure attached to the first side of the body. The support structure is configured to support the unmanned aerial vehicle on a surface when the unmanned aerial vehicle is not flying. The unmanned aerial vehicle further includes a guide attached to the first side of the body. The guide is configured to support the clamp for mounting to the line by flying the unmanned aerial vehicle toward the line.

According to some embodiments, a clamp includes a first jaw and a second jaw attached to the first jaw. The clamp also includes a biasing member having a first end attached to the first jaw and a second end attached to the second jaw. The biasing member is configured to at least one of: rotate the first jaw relative to the second jaw about an axis; or rotate the second jaw relative to the first jaw about the axis. The clamp further includes an arresting member configured to engage at least one of the first jaw or the second jaw. The arresting member is movable between a first position relative to at least one of the first jaw or the second jaw and a second position relative to at least one of the first jaw or the second jaw. In the first position, the arresting member is configured to at least one of: restrain rotation of the first jaw relative to the second jaw about the axis; or restrain rotation of the second jaw relative to the first jaw about the axis. In the second position, the arresting member is configured to at least one of: enable rotation of the first jaw relative to the second jaw about the axis; or enable rotation of the second jaw relative to the first jaw about the axis.

According to some embodiments, a guide configured to support a clamp for mounting to a line by flying, toward the line, an unmanned aerial vehicle to which the guide is attached includes a quick disconnect configured to disconnect the guide from the unmanned aerial vehicle.

According to some embodiments, an unmanned aerial vehicle for mounting a clamp to a line includes a body and a first propeller attached to the body. The unmanned aerial vehicle also includes a guide attached to the body that is configured to support the clamp for mounting to the line by flying the unmanned aerial vehicle toward the line. The unmanned aerial vehicle further includes a propeller guard attached to the body that is configured to inhibit the propeller from contacting the line and is configured to direct the clamp to the line.

According to some embodiments, an attachment feature of a guide configured to support a clamp for mounting to a line by flying, toward the line, an unmanned aerial vehicle to which the guide is attached, includes an attachment component configured to attach the clamp to the guide. The attachment feature also includes a backing portion configured to exert a detachment force on the clamp to detach the clamp from the guide as the clamp moves from an arrested position to a closed position whereby a distance between a first jaw of the clamp and a second jaw of the clamp is decreased to mount the clamp to the line.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

Figure 1:
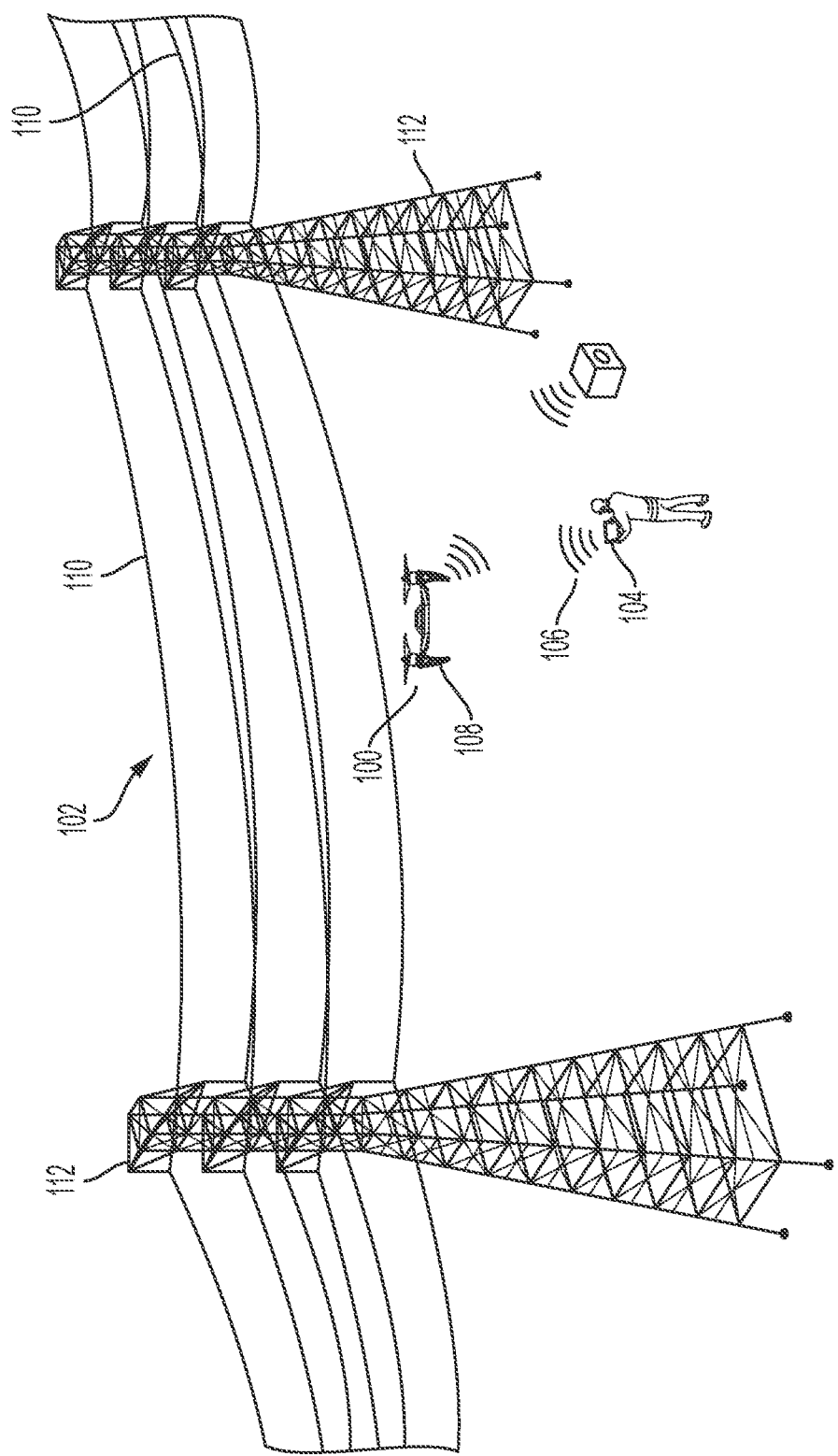
FIG. 1 is an illustration of a clamp mounting system including an unmanned aerial vehicle near a line.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

The present disclosure relates to supporting clamps in flight and mounting clamps to lines using an unmanned aerial vehicle (UAV). For the purposes of the present disclosure, the terms unmanned aerial vehicle, UAV, and drone can be used interchangeably to indicate an aircraft without a human pilot onboard. UAVs can be a component of an unmanned aircraft system (UAS); which can include a UAV, a ground-based controller, and a system of communications between the UAV and the ground-based controller. UAVs may operate and/or fly with various degrees of autonomy, for example, fly under remote control by a human operator, fly autonomously by onboard computers, or fly using a combination of the two.

While there are many different styles of UAVs in use, some common features of UAVs include a body, propellers to develop lift, an electric motor-driven propulsion apparatus attached to the UAV (e.g., attached to the body), and a rechargeable electrical battery apparatus attached to the UAV. The description and figures within this disclosure relate to a UAV having six propellers attached to arms extending radially away from the body of the UAV, however, this is not meant to be limiting, and various styles, sizes, and propulsion systems are contemplated for use with the present disclosure.

Referring to FIG. 1, an overview of an unmanned aerial vehicle (UAV) 100 in an application environment is illustrated. The UAV 100 can be one part of a clamp attachment system 102 that also includes (as noted previously) a ground-based controller 104, and a system of communications 106 between the UAV 100 and the ground-based controller 104.

In some embodiments, the UAV 100 as part of the clamp attachment system 102 may be used to mount or attach a clamp 108 to a line 110. For the purposes of the present disclosure, the line can include, but is not limited to: an overhead conductor, a power line, a cable, a wire, a rope, a cord, a grounding/bonding device, etc. The line 110 may be positioned at a location that is not easily accessible, such as a distance above the ground, as shown in FIG. 1. In some embodiments, the line 110 may comprise an overhead power line such that the line 110 is generally inaccessible (difficult to access, e.g., workers may need a helicopter or bucket truck to access the overhead conductor). In some embodiments, line 110 may be used in electric power transmission networks to transmit electrical energy. The line 110 can comprise one or more overhead conductors that are suspended by towers and/or poles 112. In this way, the UAV 100 may be piloted or flown a distance above the ground, whereupon the UAV 100 is able to mount the clamp 108 to the line 110.

Figure 2:
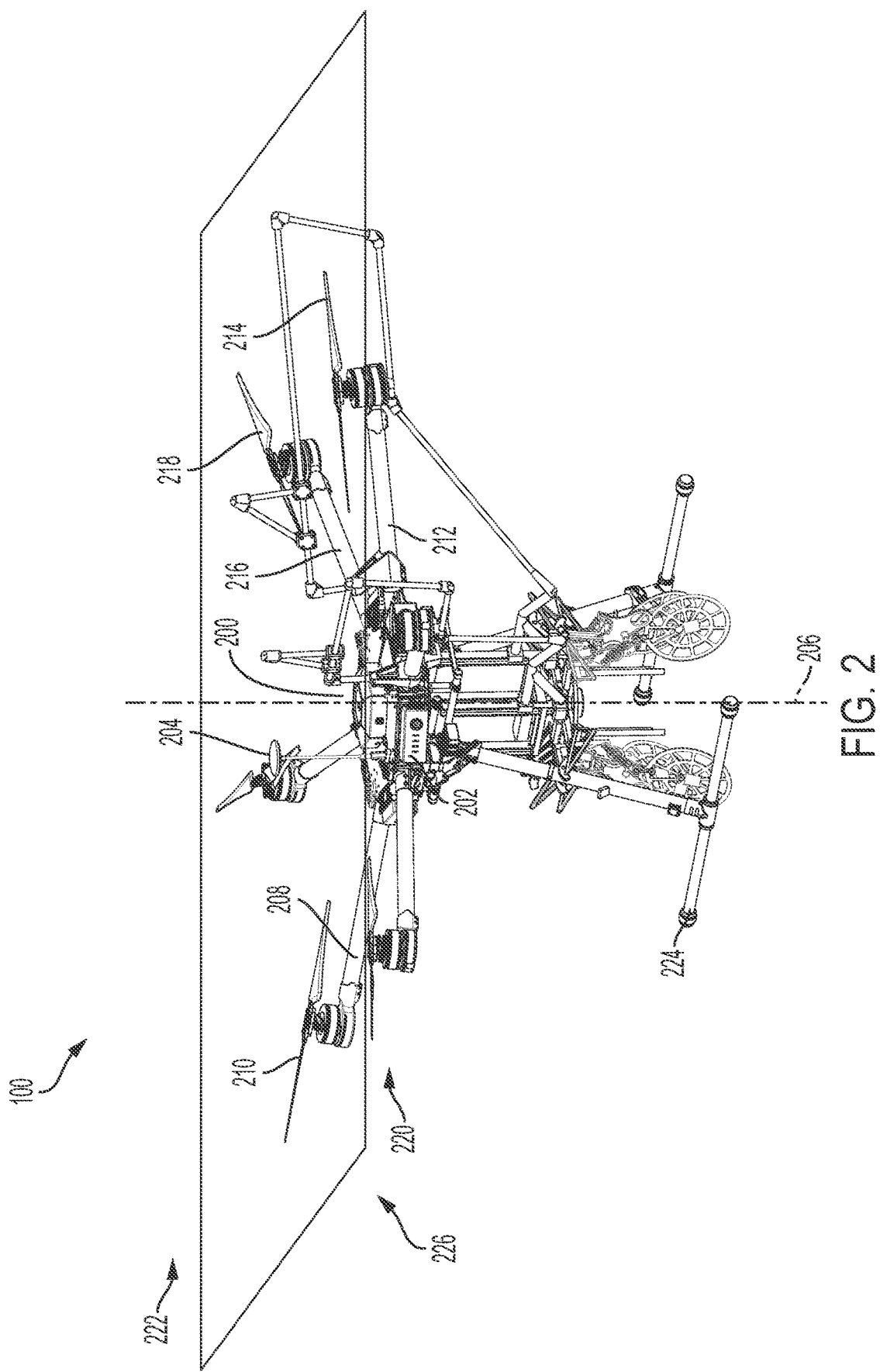
FIG. 2 is an illustration of an unmanned aerial vehicle.

Referring to FIG. 2, a perspective view of the UAV 100 is illustrated according to some embodiments. The UAV 100 includes a body 200. The body 200 can be a basic framework for mounting various components of the UAV 100, such as a controller (not shown), rechargeable batteries 202, an antenna 204 to receive communications from the ground-based controller 104 (shown in FIG. 1), etc. In some embodiments, the body 200 can be centered about a central axis 206. The body 200 can also provide a mounting location for a first arm 208 configured to mount a first propeller 210 at a distance from the body 200. As such, the first propeller 210 is attached to the body 200 through the first arm 208. Similarly, a second arm 212 is attached to the body 200 and provides a mount for a second propeller 214 to be attached to the body 200. A third arm 216 is also attached to the body 200 and provides a mount for a third propeller 218 that is attached to the body 200.

The body 200 is between at least one of the first propeller 210 and the second propeller 214, the first propeller 210 and the third propeller 218, or the second propeller 214 and the third propeller 218. In some embodiments, the meaning of the body 200 being between a number of propellers is that the propellers are on opposing sides of the UAV 100. In some embodiments, the meaning of the body 200 being between a number of propellers is that the propellers are attached to arms and the path of attachment between the propellers extends from one propeller, through an arm, through the body, and finally through another arm to another propeller. A geometric construct of a plane 226 can also be described that intersects the first propeller 210, the second propeller 214, and the third propeller 218. In some embodiments, for ease of description, the plane 226 can be defined by the center points of the propellers 210, 214, and 218.

Figure 3:
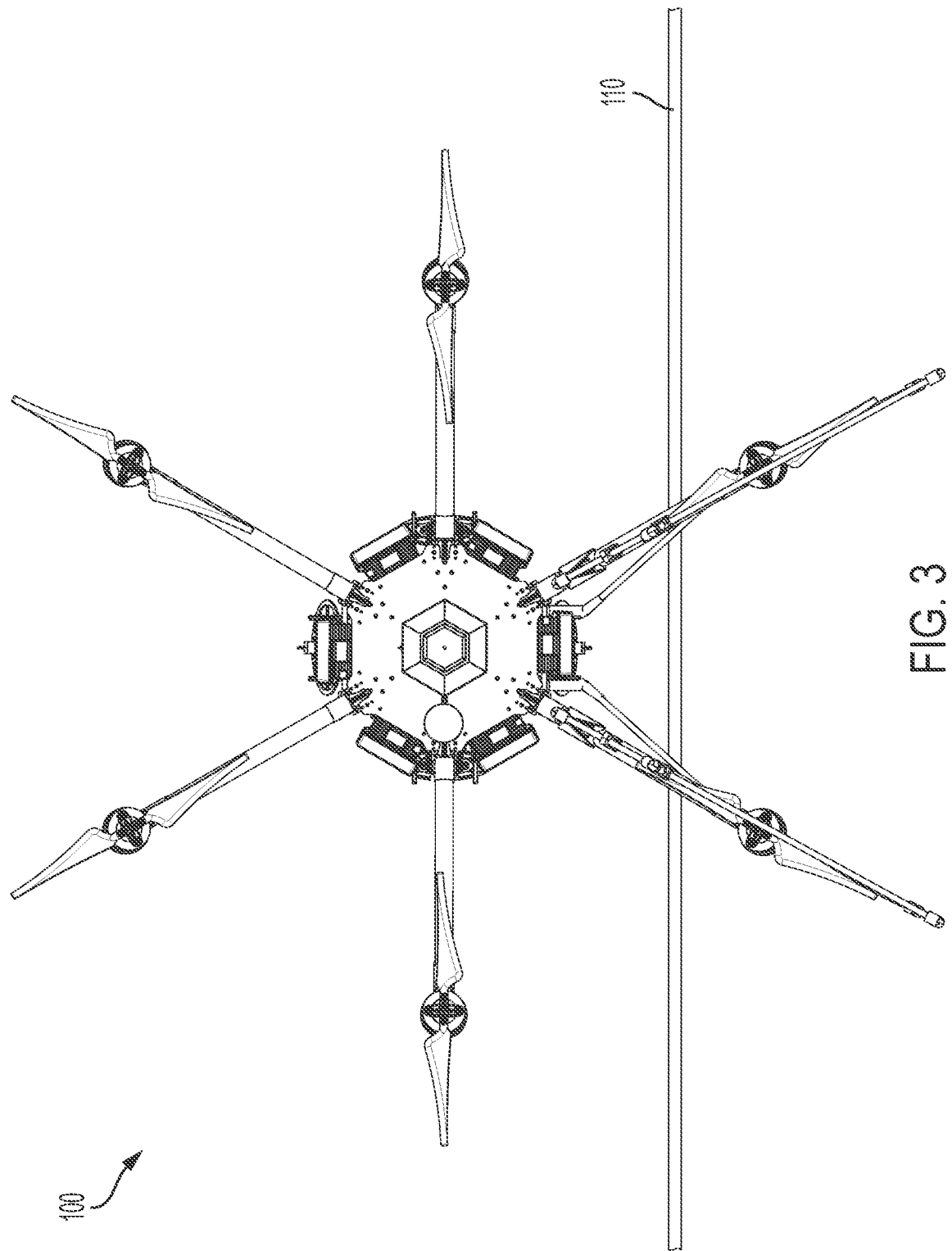
FIG. 3 is an illustration of an unmanned aerial vehicle.

Referring to FIG. 3, a top, or plan, view of the UAV 100 proximate the line 110 is illustrated. As previously discussed, the figures collectively show a UAV 100 having six propellers in a particular orientation (e.g., generally within a single plane and oriented in a hexagonal fashion as shown in FIG. 3), however, the UAV 100 can include any suitable number and arrangement of propellers.

Figure 4:
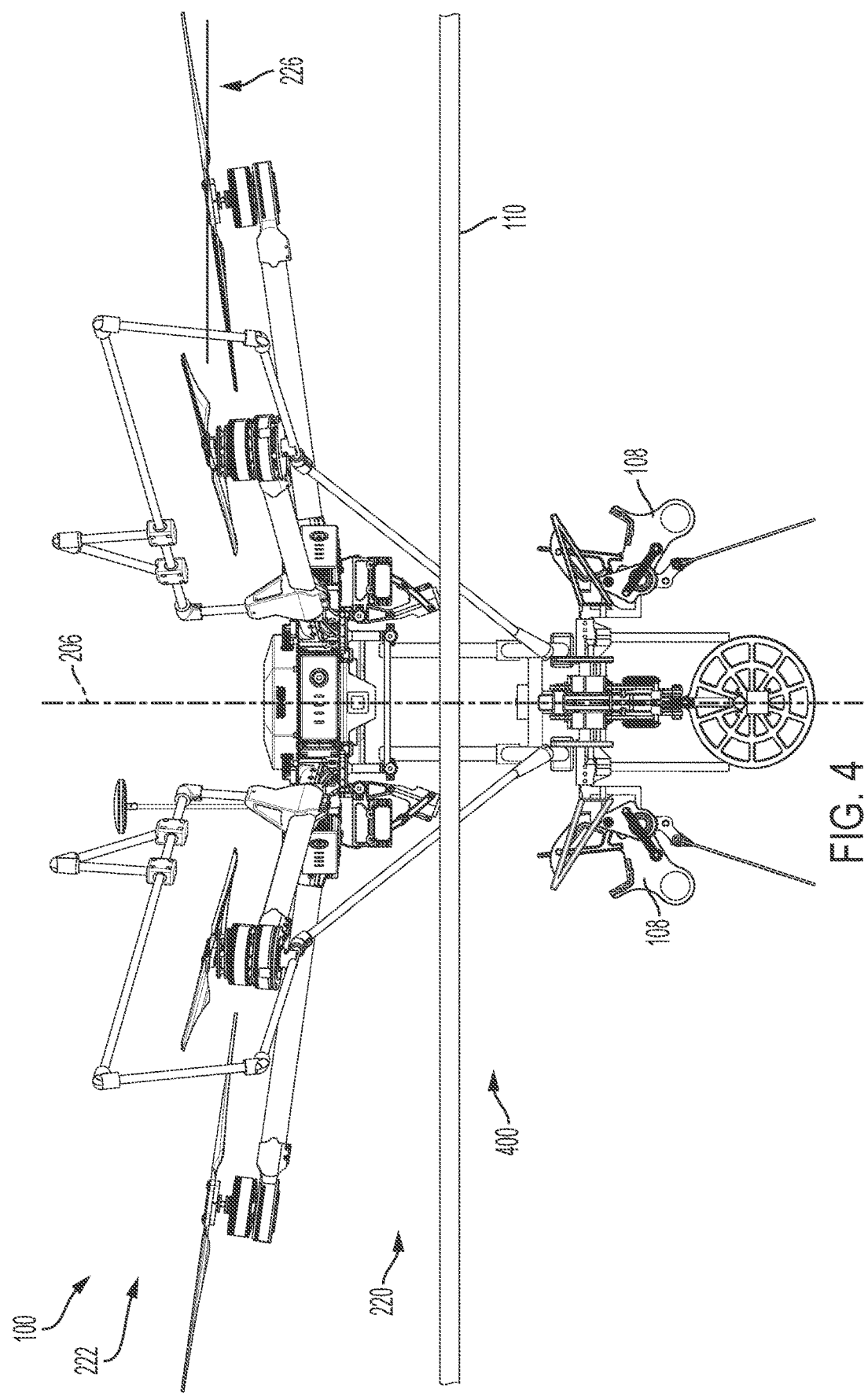
FIG. 4 is an illustration of an unmanned aerial vehicle.

Referring to FIG. 4, a side, or elevation, view of the UAV 100 is illustrated in proximity to the line 110. It is also to be understood that each of the propellers can be canted such that the axis of rotation of each propeller is not parallel to the central axis 206, but angles toward the central axis 206 as the axis of rotation extends upward and away from the UAV 100. Canting of the propellers in this way can increase the airborne stability of the UAV 100.

Returning to FIG. 2, the body 200 of the UAV 100 has a first side 220 and a second side 222. A support structure 224 is attached to the first side 220 of the body 200, for example, a pair of legs. The support structure 224 is configured to support the UAV 100 on a surface (e.g., the ground, a work surface, etc.) when the UAV 100 is not flying. In some embodiments, the support structure 224 can be rotated about a mounting joint at the body 200 during UAV 100 flight.

Returning to FIG. 4, a guide 400 is attached to the first side 220 of the body 200. The first side 220 is the side of the body 200 that faces downward, or toward the ground. The guide 400 is configured to support the clamp 108 for mounting the clamp 108 to the line 110 by flying the UAV 100 toward the line 110. In some embodiments, the guide 400 is configured to support the clamp 108 for mounting the clamp 108 to the line 110 by flying the UAV 100 toward the line 110 and causing contact between the clamp 108 and the line 110.

Figure 5:
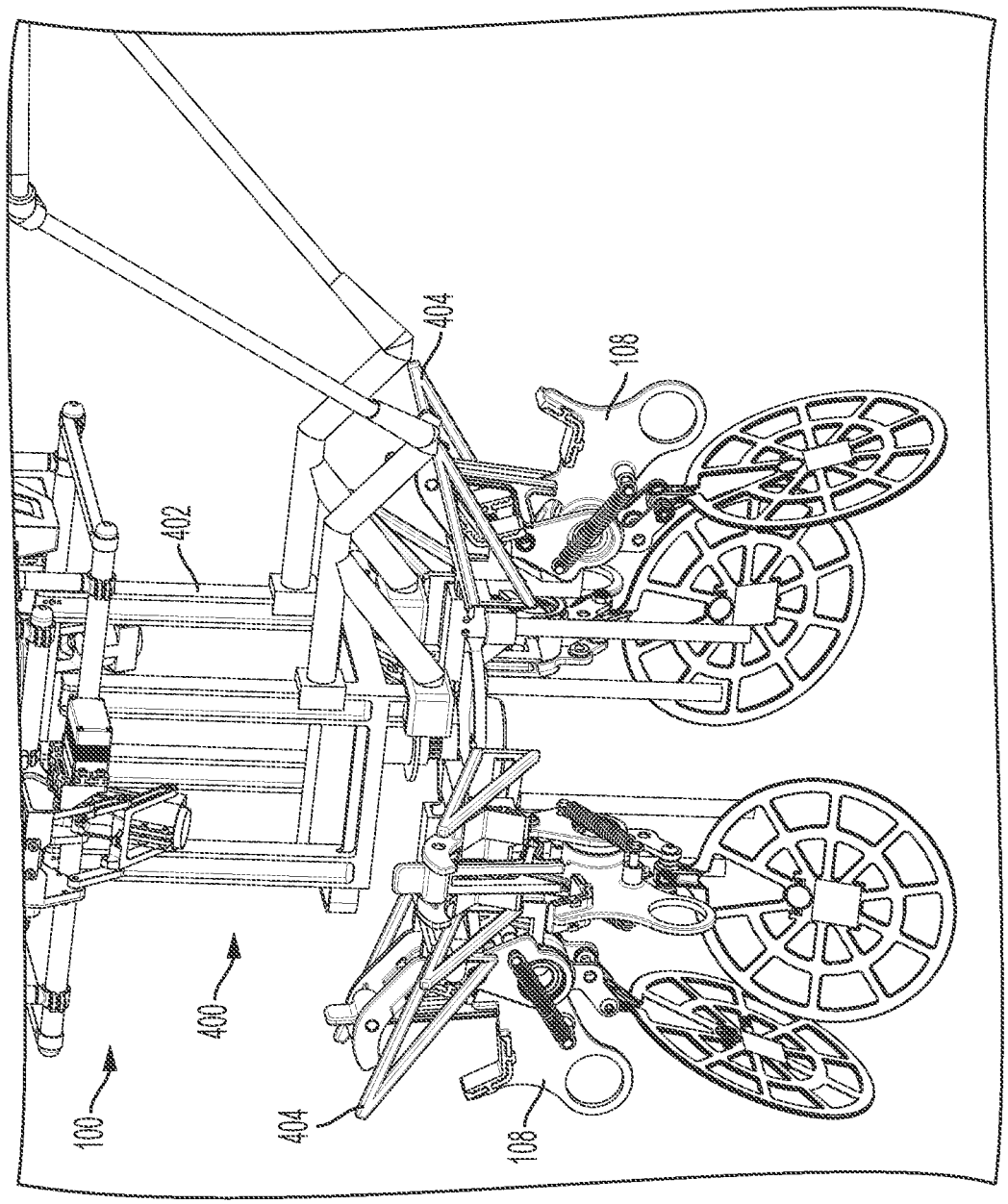
FIG. 5 is an illustration of a guide with a clamp.

Referring to FIG. 5, a detail view of the guide 400 is shown with the clamp 108 attached to the guide 400. The guide 400 includes a mount 402 a first attachment feature, and a second attachment feature 404. In some embodiments, the mount 402 and the second attachment feature 404 may be attached to each other with additional components between the mount 402 and the second attachment feature 404, as is the case with the embodiment shown in FIG. 5. In some embodiments, the second attachment feature 404 is attached directly to the mount 402, as will be discussed below. Regardless of the attachment arrangement between the second attachment feature 404 and the mount 402, the mount 402 can be attached to the UAV 100, while the second attachment feature 404 can be attached to the clamp 108.

Figure 6:
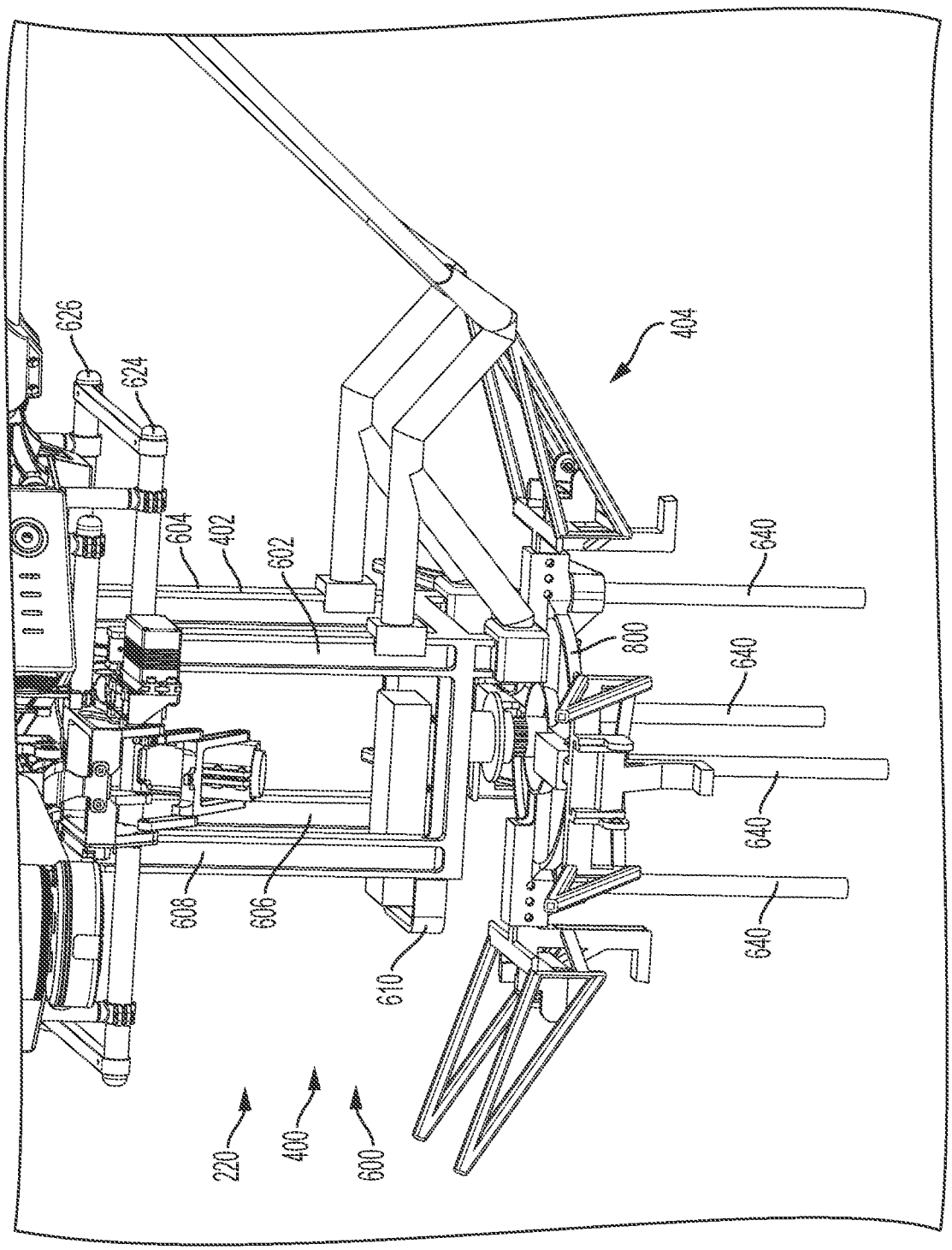
FIG. 6 is an illustration of an example guide without clamps.

Referring to FIG. 6, a detail view of the guide 400 is shown with the clamp 108 removed from the guide 400 and the support structure 224 removed from the body 200 for clarity. The mount 402 of the guide 400 is shown as mounted to the first side 220 of the body 200. In some embodiments, the mount 402 comprises one or more columns 600. For example, the mount 402 may comprise a first column 602, a second column 604, a third column 606, and/or a fourth column 608. The first column 602, the second column 604, the third column 606, and/or the fourth column 608 may be spaced apart and may extend substantially parallel to one another. In some embodiments, the first column 602, the second column 604, the third column 606, and/or the fourth column 608 may be spaced apart to form a rectangular shape, though, other shapes are envisioned. Additionally, first ends of the first column 602, the second column 604, the third column 606, and/or the fourth column 608 may be attached to a base 610.

Figure 7:
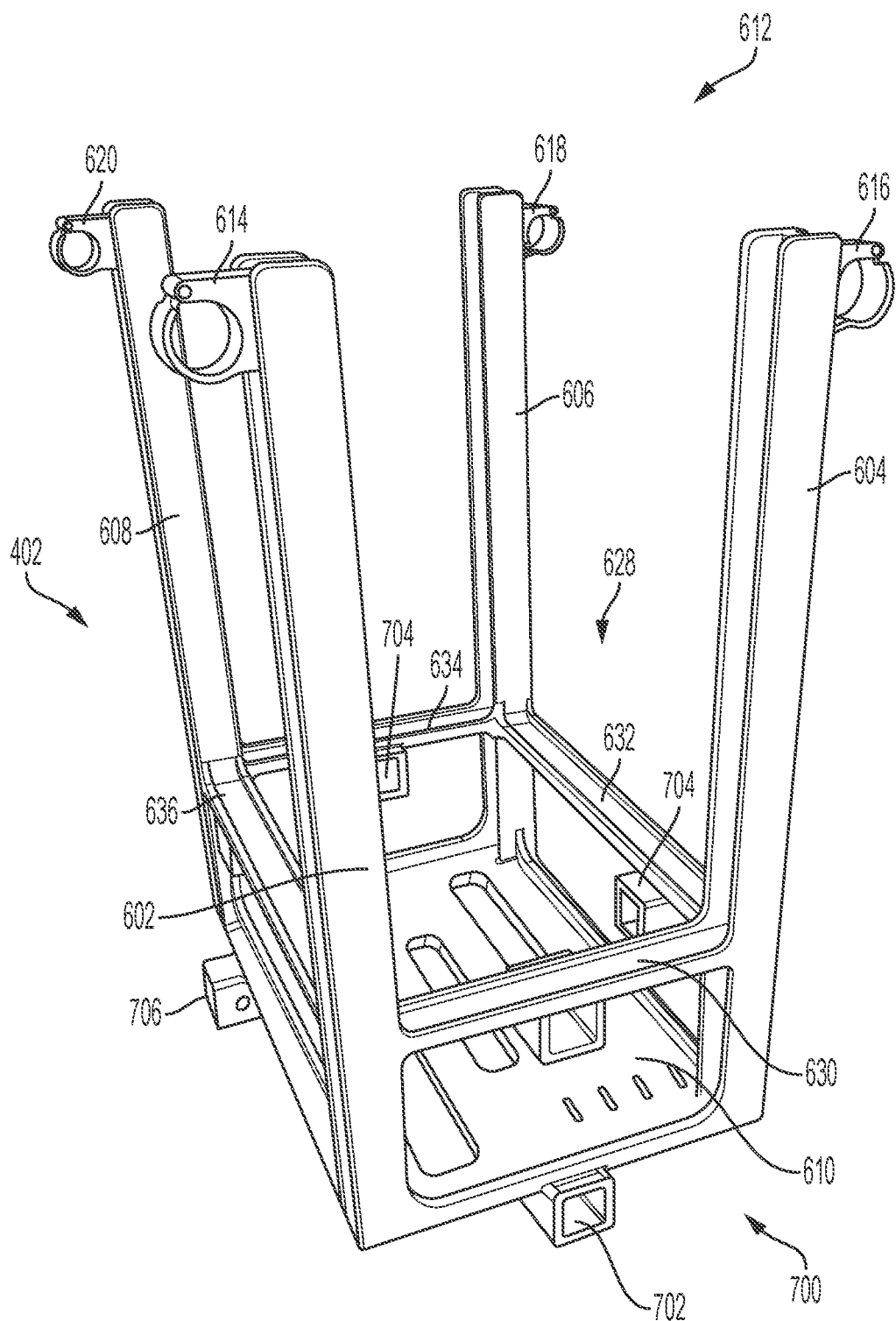
FIG. 7 is an illustration of an example mounting assembly.

Referring to FIG. 7, a detail view of the mount 402 is illustrated. Opposing second ends of the first column 602, the second column 604, the third column 606, and/or the fourth column 608 may include the first attachment feature 612. In some embodiments, the first attachment feature 612 may comprise a first locking bracket 614, a second locking bracket 616, a third locking bracket 618, and/or a fourth locking bracket 620. The first locking bracket 614 may be attached to the first column 602. The second locking bracket 616 may be attached to the second column 604. The third locking bracket 618 may be attached to the third column 606. The fourth locking bracket 620 may be attached to the fourth column 608.

The first attachment feature 612 (e.g., the locking brackets 614, 616, 618, 620) comprises any number of structures configured to attach the mount 402 to the UAV 100. In some embodiments, the locking brackets 614, 616, 618, 620 may comprise a wall that defines an opening into which a portion of the UAV 100 may be received, such as a rail 624, 626 of the UAV 100, for example. In this way, the locking brackets 614, 616, 618, 620 may receive a rail of the drone, such as by the first locking bracket 614 and the second locking bracket 616 receiving a first rail 624 (shown in FIG. 6) of the UAV 100, and the third locking bracket 618 and the fourth locking bracket 620 receiving a second rail 626 (shown in FIG. 6) of the UAV 100. As such, in some embodiments, the first attachment feature 612 may function to removably attach the mount 402 of the guide 400 to the UAV 100.

Returning to FIG. 7, in some embodiments, the mount 402 comprises one or more lateral supports 628 that may extend between the columns 602, 604, 606, 608. For example, the lateral supports 628 may comprise a first lateral support 630, a second lateral support 632, a third lateral support 634, and/or a fourth lateral support 636. The first lateral support 630 may extend between the first column 602 and the second column 604. The second lateral support 632 may extend between the third column 606 and the fourth column 608. The third lateral support 634 may extend between the second column 604 and the fourth column 608. The fourth lateral support 636 may extend between the first column 602 and the third column 606. In some embodiments, the lateral supports 630, 632, 634, 636 may extend in a direction that is non-parallel to the columns 602, 604, 606, 608, such as by extending substantially perpendicular to the columns 602, 604, 606, 608. In some embodiments, the first lateral support 630 may extend substantially parallel to the second lateral support 632. In some embodiments, the third lateral support 634 may extend substantially parallel to the fourth lateral support 636. In this way, the ends of the lateral supports 630, 632, 634, 636 may be attached to the respective columns 602, 604, 606, 608 to which the lateral supports extend between. As such, the lateral supports 630, 632, 634, 636 may provide additional support to the columns 602, 604, 606, 608 so as to limit unintended vibration, flexing, deformation, or the like.

The mount 402 can also include the base 610. In some embodiments, the base 610 is attached to an end of the columns 602, 604, 606, 608 that is opposite the first attachment feature 612. In this way, the base 610 is spaced a distance apart from the UAV 100. The base 610 may provide additional support to the columns 602, 604, 606, 608 so as to limit unintended vibration, flexing, deformation, or the like.

Figure 8:
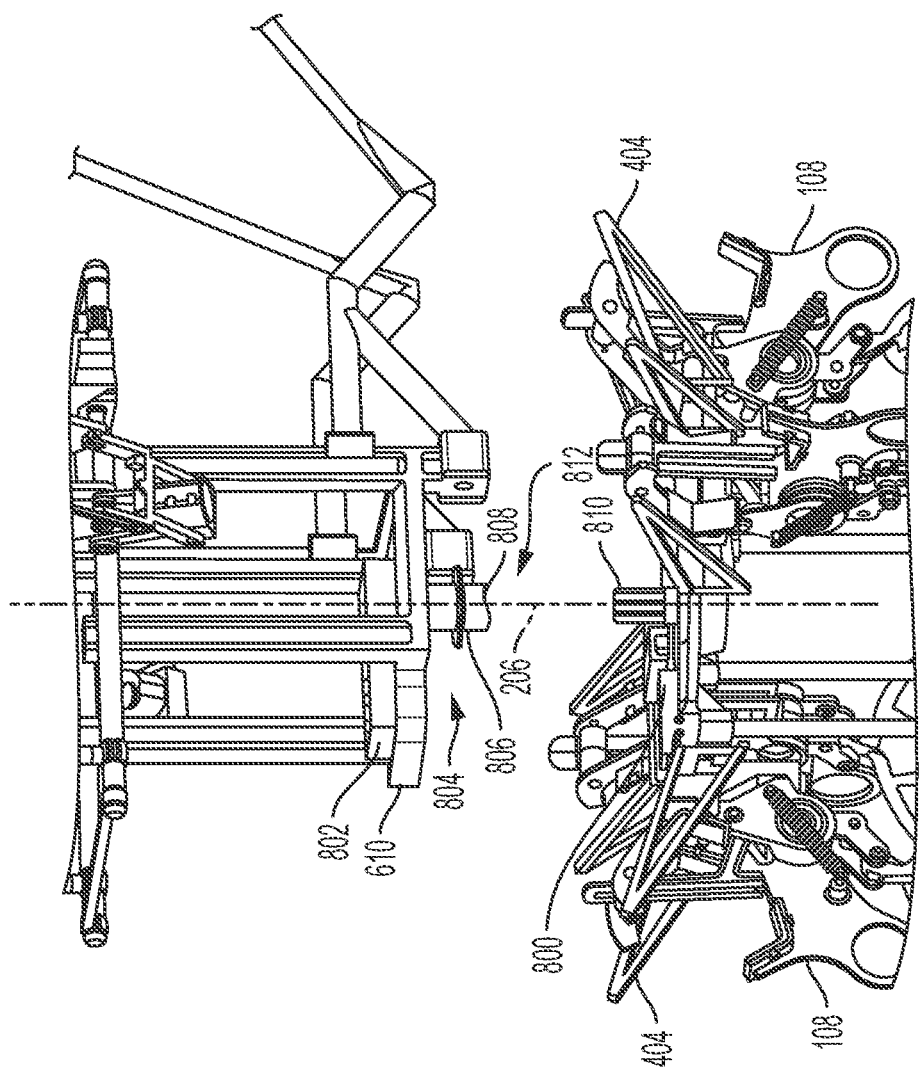
FIG. 8 is an illustration of an example mounting assembly.

Referring to FIG. 8, the UAV 100 includes a rotation device 800 configured to rotate about an axis (e.g., the central axis 206) that is perpendicular to the plane 226 (shown in FIG. 2). The rotation device 800 can also be termed a clamp carrier. The second attachment feature 404 is configured to support the clamp 108 and is attached to the rotation device 800 such that rotation of the rotation device 800 can maneuver the clamp 108 into a first position for mounting to the line 110 (e.g., the right-most clamp 108 shown in FIG. 5). Additionally, rotation of the rotation device 800 can maneuver the clamp 108 into a second position for mounting to a second line. In some embodiments, the second line can be defined as the same line 110 that has had a clamp 108 mounted to the line 110 at a different location. In some embodiments, the second line is a different line than line 110.

In some embodiments, the base 610 can provide a mounting location for a driver 802 (e.g., a servo motor). The driver 802 can be used to rotate the rotation device 800 a fixed number of degrees to help ensure that a clamp 108 is at the proper location to mount to the line 110. In some embodiments, a controller on the UAV 100 can receive a signal from the ground-based controller 104 to cycle the rotation device 800 to mount the next clamp 108 in sequence. The driver 802 can then rotate the rotation device 800 a fixed number of degrees (e.g., 90 degrees) in order to place the next clamp 108 in a position to be mounted to the line 110. In some embodiments, an operator using the ground-based controller 104 (shown in FIG. 1) can use a single motion (e.g., depress a button), in order to cause the driver 802 to rotate the rotation device 800 to the next position. It is worthy of note that the rotation device 800 can be used such that the UAV 100 can approach the line 110 from a single orientation for each clamp mounting event. In other words, the operator or pilot of the UAV 100 does not have to consider which direction in which to orient the UAV 100 in order to mount the next clamp 108 in a mounting sequence.

Returning to FIG. 6, the rotation device 800 can also include over-distance guards 640 extending generally downward from the rotation device 800. The over-distance guards 640 can help protect the clamps 108 if the UAV 100 is driven too far toward/into the line 110. For example, the over-distance guards 640 prevent the clamps 108 from being forcibly removed from the second attachment features 404 if the line 110 impacts that part of the guide 400. Any suitable number and construction style of over-distance guards 640 are contemplated.

Returning to FIG. 8, a connection feature 804 can include a fitting 806 configured to reliably transmit rotational force from the driver 802 (e.g., the servo motor) to the rotation device 800. In some embodiments, the fitting 806 can be a splined fitting with a female spline member 808 attached to an output of the driver 802. The female spline member 808 is configured to cooperate with a male spline member 810 mounted to the rotation device 800. Any suitable device used to transmit rotational force between the driver 802 and the rotation device 800 can be used in the spirit of this disclosure.

Additionally, the guide 400 can include a quick disconnect feature 812 configured to disconnect the guide 400 from the UAV 100. The quick disconnect feature 812 can include the spline members 808, 810 as described above. The quick disconnect feature 812 can foster relatively quick replacement of a rotation device 800 after all of the clamps 108 from a first rotation device 800 have been mounted to a line 110 or multiple lines 110. An operator or pilot can relatively quickly remove the empty rotation device 800 with a rotation device 800 with a full complement of clamps 108.

For the purposes of this disclosure, the quick disconnect feature 812 includes any plug (e.g., the male spline member 810) and socket (e.g., the female spline member 808) connector that does not require the use of traditional hand tools to operate. When connected properly, the plug and socket lock the joint effectively to resist any tensile forces that tend to pull the connector apart. The quick disconnect feature 812 enables the mount 402 and the rotation device 800 to be relatively easily disconnected without tools by disengaging a locking mechanism and separating the plug and socket.

Figure 9:
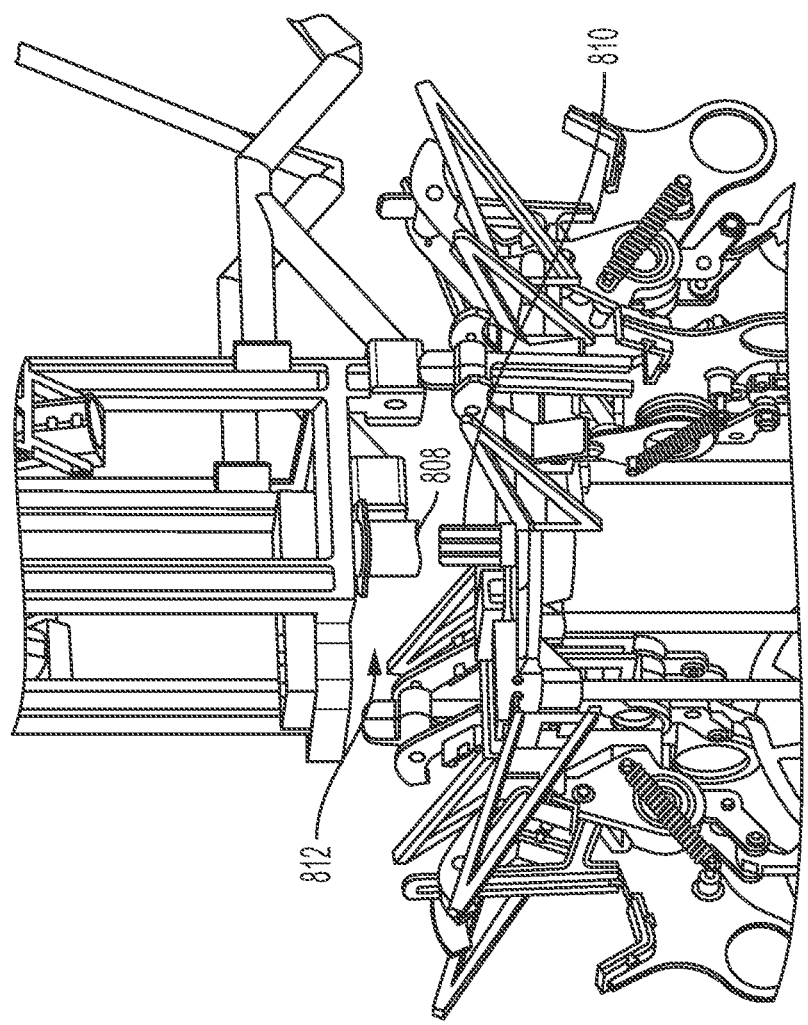
FIG. 9 is an illustration of an example mounting assembly.

Referring to FIG. 9, the quick disconnect feature 812 is shown with the female spline member 808 pulled upward (e.g., by using an operator's hand) against an internal spring force to release the internal lock in preparation for insertion of the male spline member 810.

Figure 10:
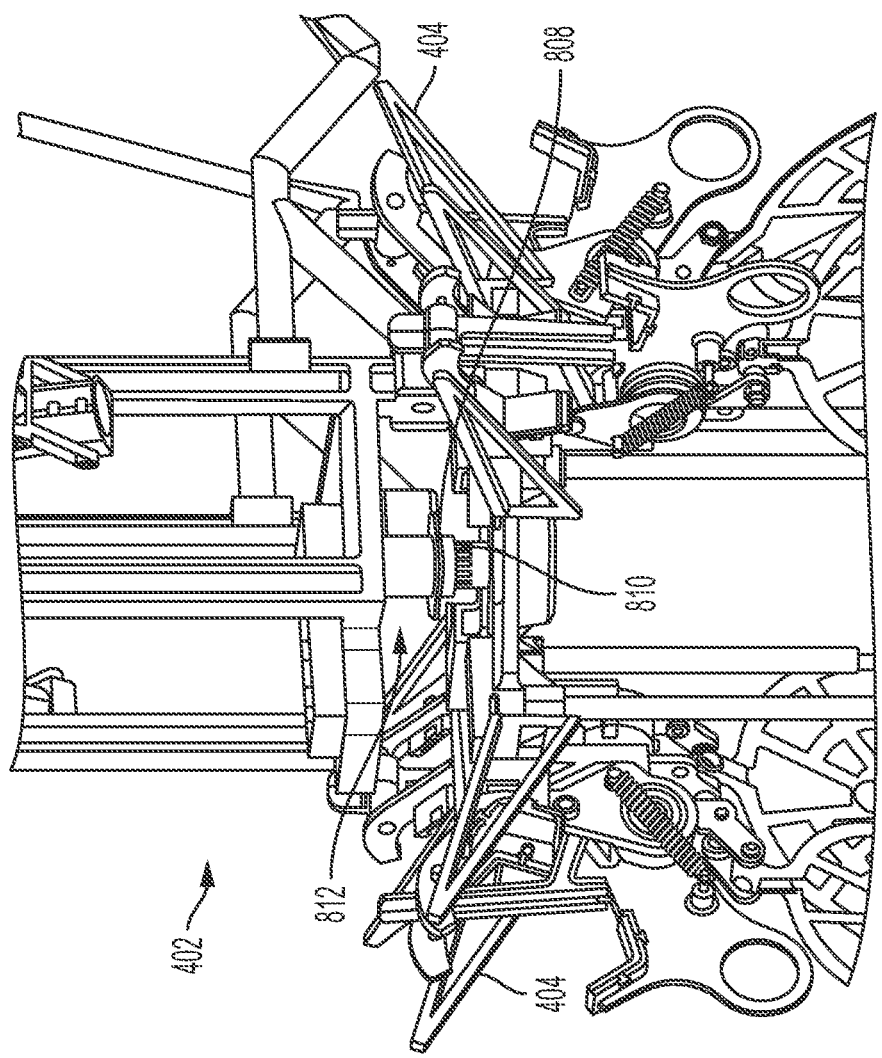
FIG. 10 is an illustration of an example mounting assembly.

Referring to FIG. 10, the male spline member 810 has been inserted into the female spline member 808 and the female spline member 808 has been released and has moved to a downward locked position. In this position, the quick disconnect feature 812 is locked and the rotation device 800 is firmly connected to the mount 402 and thus the UAV 100. As described, the second attachment feature 404 is configured to attach the clamp 108 to the guide 400, and the quick disconnect feature 812 is configured to disconnect the second attachment feature 404 from the first attachment feature 612 such that the second attachment feature 404 is disconnected from the UAV 100.

Figure 11:
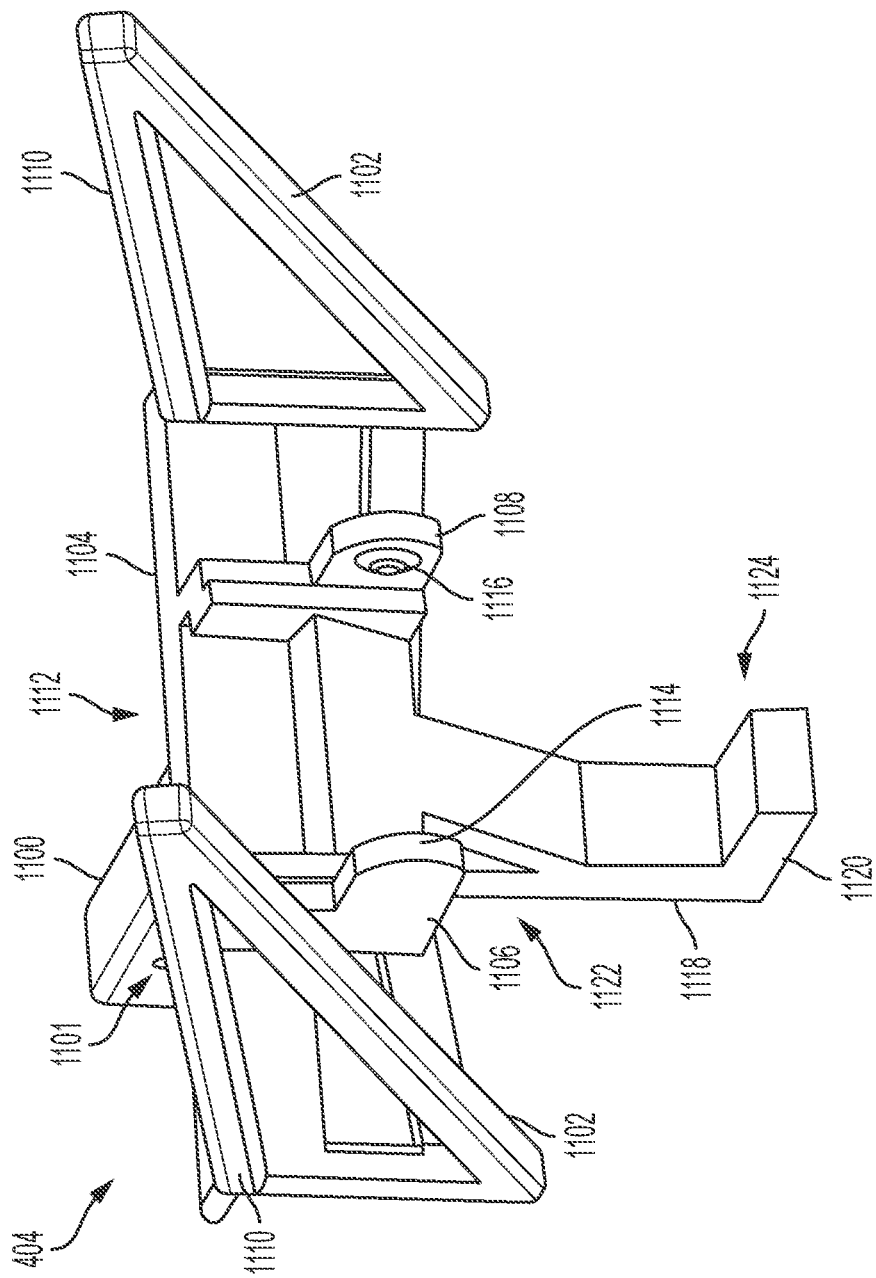
FIG. 11 is an illustration of an example second attachment feature.

Referring to FIG. 11, a perspective view of a second attachment feature 404 is shown in detail. The second attachment feature 404 includes an attachment component 1100. The attachment component 1100 may extend outwardly from a center of the second attachment feature 404 and may be sized to fit within an attachment opening defined by the rotation device 800. In some embodiments, the attachment portion 1100 may have one or more openings 1101 to allow for mechanical fasteners (not shown) to pass therethrough so as to attach the second attachment feature 404 to the rotation device 800.

The second attachment feature 404 comprises an alignment structure 1102 that is attached to the attachment portion 1100 that will be discussed in greater detail below. The alignment structure 1102 configured to direct the clamp 108 to the line 110 for mounting the clamp 108 to the line 110. In some embodiments, the second attachment feature 404 includes a cross-brace 1104. The cross-brace 1104 may be disposed between the attachment portion 1100 and the alignment structure 1102. In some embodiments, the cross-brace 1104 may extend substantially perpendicular to the attachment portion 1100, with the attachment portion 1100 attached to the cross-brace 1104. In some embodiments, the alignment structure 1102 may be attached to the cross-brace 1104 opposite the attachment portion 1100. That is, in some embodiments, the attachment portion 1100 may be attached to a first side of the cross-brace 1104 while the alignment structure 1102 may be attached to a second side of the cross-brace 1104.

The cross-brace 1104 includes one or more attachment walls, such as a first attachment wall 1106 and a second attachment wall 1108. The first attachment wall 1106 and the second attachment wall 1108 may be attached to the cross-brace 1104 on the same side as the alignment structure 1102. In this way, the first attachment wall 1106 and the second attachment wall 1108 may be disposed between the elongated arms 1110 of the alignment structure 1102. The first attachment wall 1106 and the second attachment wall 1108 may extend a distance outwardly from the cross-brace 1104, and may be spaced apart to define an opening 1112 therebetween. In some embodiments, the first attachment wall 1106 and the second attachment wall 1108 may comprise an attachment component 1114 configured to attach the clamp 108 to the guide 400. In some embodiments, the attachment component can be a first mating portion 1116 such as a protrusion or nub. For example, the first mating portion 1116 may project inwardly from the first attachment wall 1106 toward the second attachment wall 1108. Although hidden in FIG. 11, another first mating portion 1116 may project inwardly from the second attachment wall 1108 towards the first attachment wall 1106.

Remaining with FIG. 11, the second attachment feature 404 can include an abutment wall 1118. In an example, the abutment wall 1118 can be attached to the cross-brace 1104, such as by extending outwardly from the cross-brace 1104. For example, the abutment wall 1118 may extend substantially perpendicular to the cross-brace 1104, and may extend downwardly from the cross-brace 1104. The abutment wall 1118 may comprise an abutment extension 1120. In some embodiments, a first end 1122 of the abutment wall 1118 may be attached to the cross-brace 1104 while a second end 1124 of the abutment wall 1118 may be attached to the abutment extension 1120. The abutment extension 1120 may extend substantially perpendicular to the abutment wall 1118, such as by extending in the same direction as the elongated arms 1110. In this way, as illustrated in FIG. 11, one end of the abutment extension 1120 may be attached to the abutment wall 1118 while another end of the abutment extension 1120 may be spaced apart from the abutment wall 1118. In some embodiments, the end of the abutment extension 1120 is in closer proximity to the cross-brace 1104 than the first mating portion 1116.

In some embodiments, the first mating portion 1116 is configured to mate with a second mating portion (to be discussed below) of the clamp 108 to attach the clamp 108 to the second attachment feature 404. The first mating portion 1116 may have a non-circular shape. That is, in an example, the first mating portion 1116 may have a half-circular shape. The shape of the first mating portion 1116 can ease attachment and/or detachment of the clamp 108 from the second attachment feature 404, and thus, the guide 400.

Figure 12:
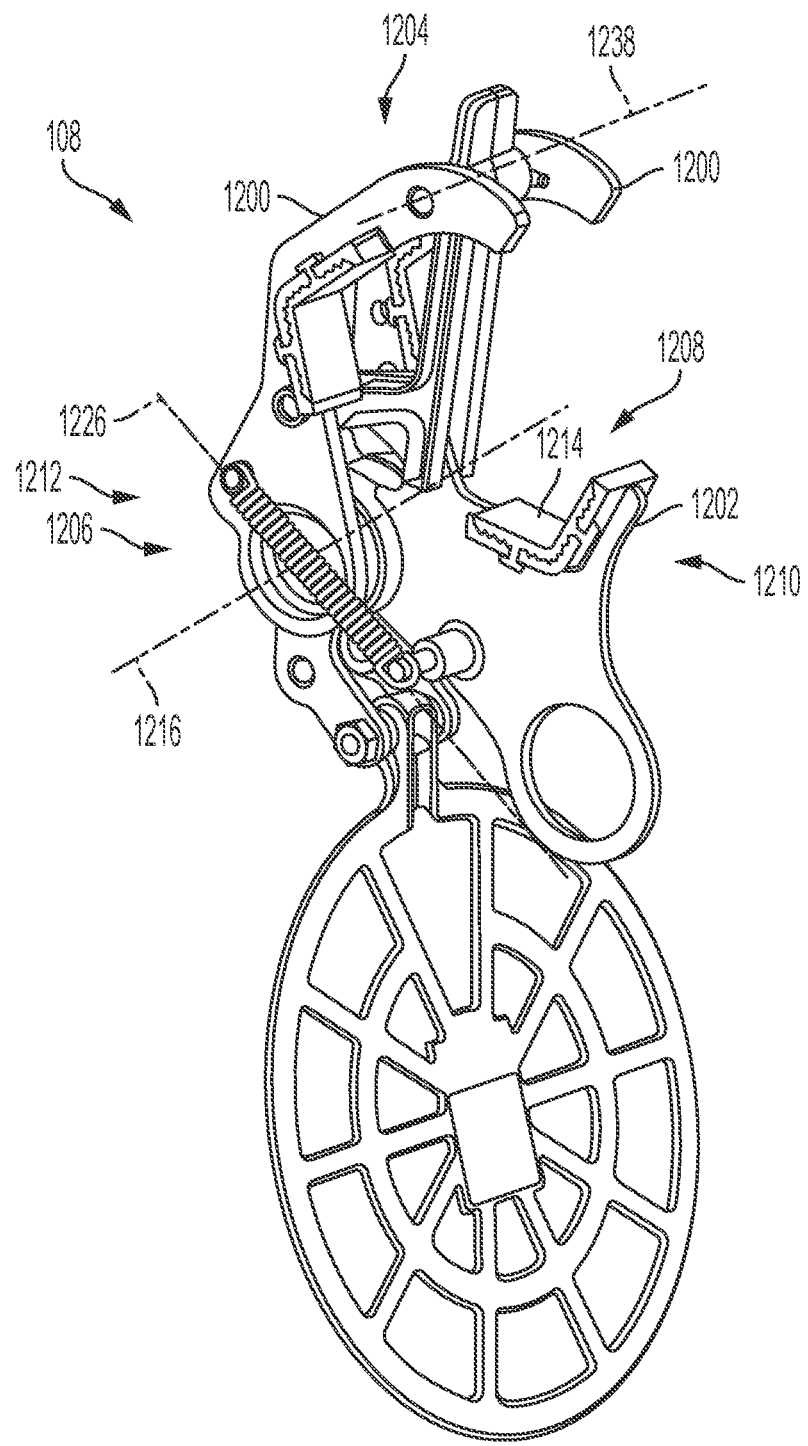
FIG. 12 is an illustration of an example clamp.

Referring to FIG. 12, a perspective view of the clamp 108 is illustrated. The clamp 108 may comprise a first jaw 1200 and a second jaw 1202 attached to the first jaw 1200. The first jaw 1200 and the second jaw 1202 may be movable relative to each other. The first jaw 1200 may extend between a gripping end 1204 and an attachment end 1206. The gripping end 1204 may be curved and may define one or more inner teeth, for example. In some embodiments, the first jaw 1200 may extend non-linearly between the gripping end 1204 and the attachment end 1206.

The second jaw 1202 may be attached to the first jaw 1200 and may define a gripping opening 1208. In some embodiments, the second jaw 1202 may extend between a gripping end 1210 and an attachment end 1212. The gripping end 1210 may be curved and may define one or more inner teeth, for example. In this way, the teeth of the gripping ends 1204, 1210 may provide an increased frictional surface so as to improve the gripping of the line 110 by the clamp 108. In some embodiments, the inner teeth may be covered by a relatively soft or flexible cover 1214.

The attachment end 1212 of the second jaw 1202 may be attached to the attachment end 1206 of the first jaw 1200. In some embodiments, the attachment end 1212 of the second jaw 1202 may be pivotably attached to the attachment end 1206 of the first jaw 1200. That is, the first jaw 1200 may pivot about an axis 1216 relative to the second jaw 1202. In some embodiments, the axis 1216 may intersect the attachment ends 1206, 1212 of the first jaw 1200 and the second jaw 1202. In this way, the first jaw 1200 and the second jaw 1202 may move (e.g., rotate, pivot, etc.) relative to each other between an over-center position, an arrested position, and a closed position. In some embodiments, both the over-center position and the arrested position can be considered an opened position. In the opened position, the first jaw 1200 and the second jaw 1202 may receive the line 110 within the gripping opening 1208 in order to mount the clamp 108 to the line 110. In the closed position, the line 110 may be gripped by the first jaw 1200 and the second jaw 1202, such that the clamp 108 may remain affixed to the line 110.

Figure 13:
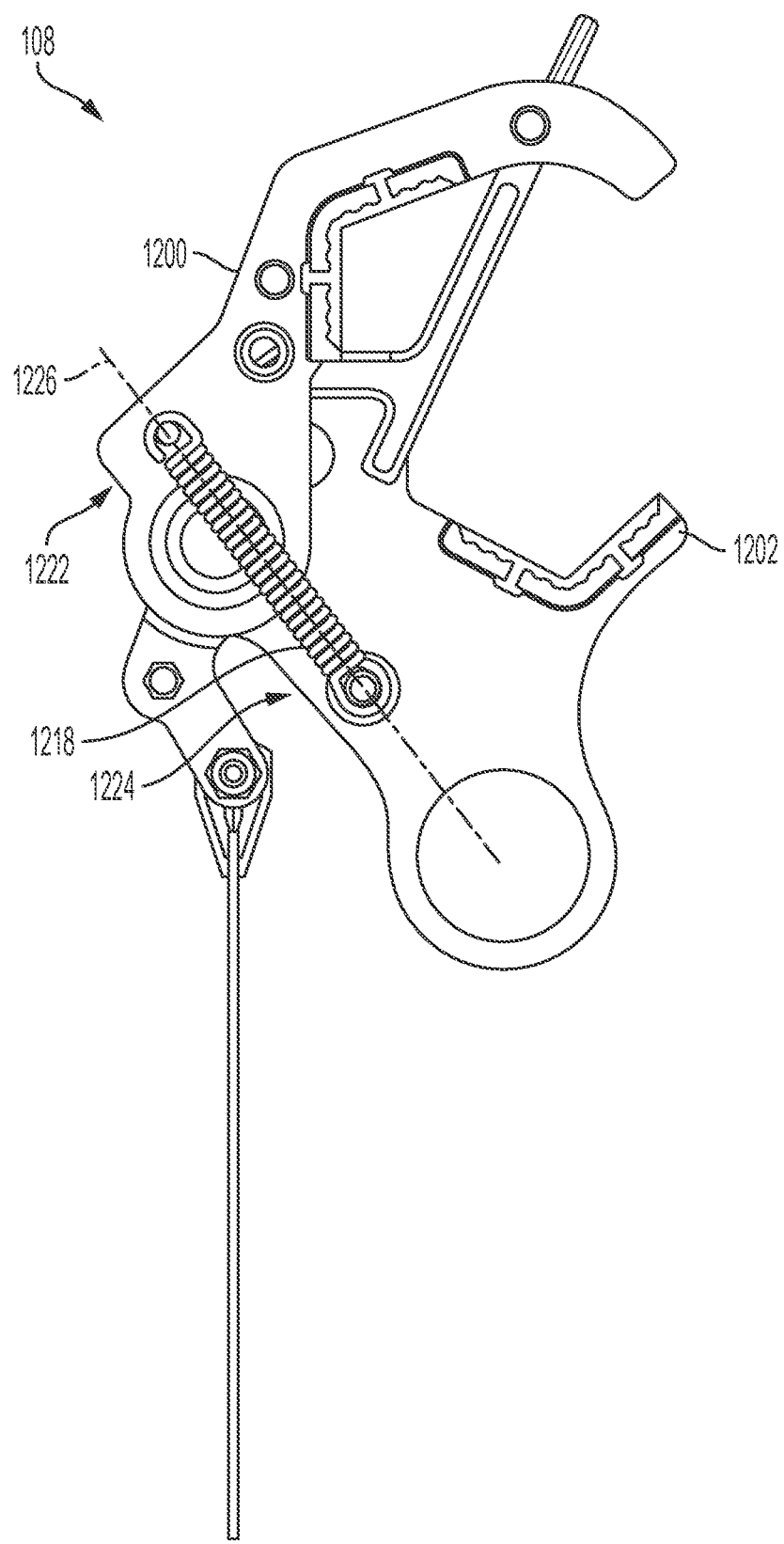
FIG. 13 is an illustration of an example clamp.

Referring to FIG. 13, in order to assist in moving the first jaw 1200 and the second jaw 1202 between the opened and the closed positions, the clamp 108 may comprise a biasing member 1218. The biasing member 1218 may extend between a first end 1222 and a second end 1224. In some embodiments, the biasing member 1218 may comprise a spring, such as a spring that extends along a biasing member axis 1226. The first end 1222 of the biasing member 1218 may be attached to the first jaw 1200. The second end 1224 of the biasing member 1218 may be attached to the second jaw 1202. In some embodiments, the biasing member 1218 is configured to at least one of: rotate the first jaw 1200 relative to the second jaw 1202 about the axis 1216 (shown in FIG. 12) or rotate the second jaw 1202 relative to the first jaw 1200 about the axis 1216. In this way, the biasing member 1218 may bias the first jaw 1200 and the second jaw 1202 towards a closed position (e.g., with the gripping end 1204 of the first jaw 1200 tending to move towards the gripping end 1210 of the second jaw 1202).

Figure 14:
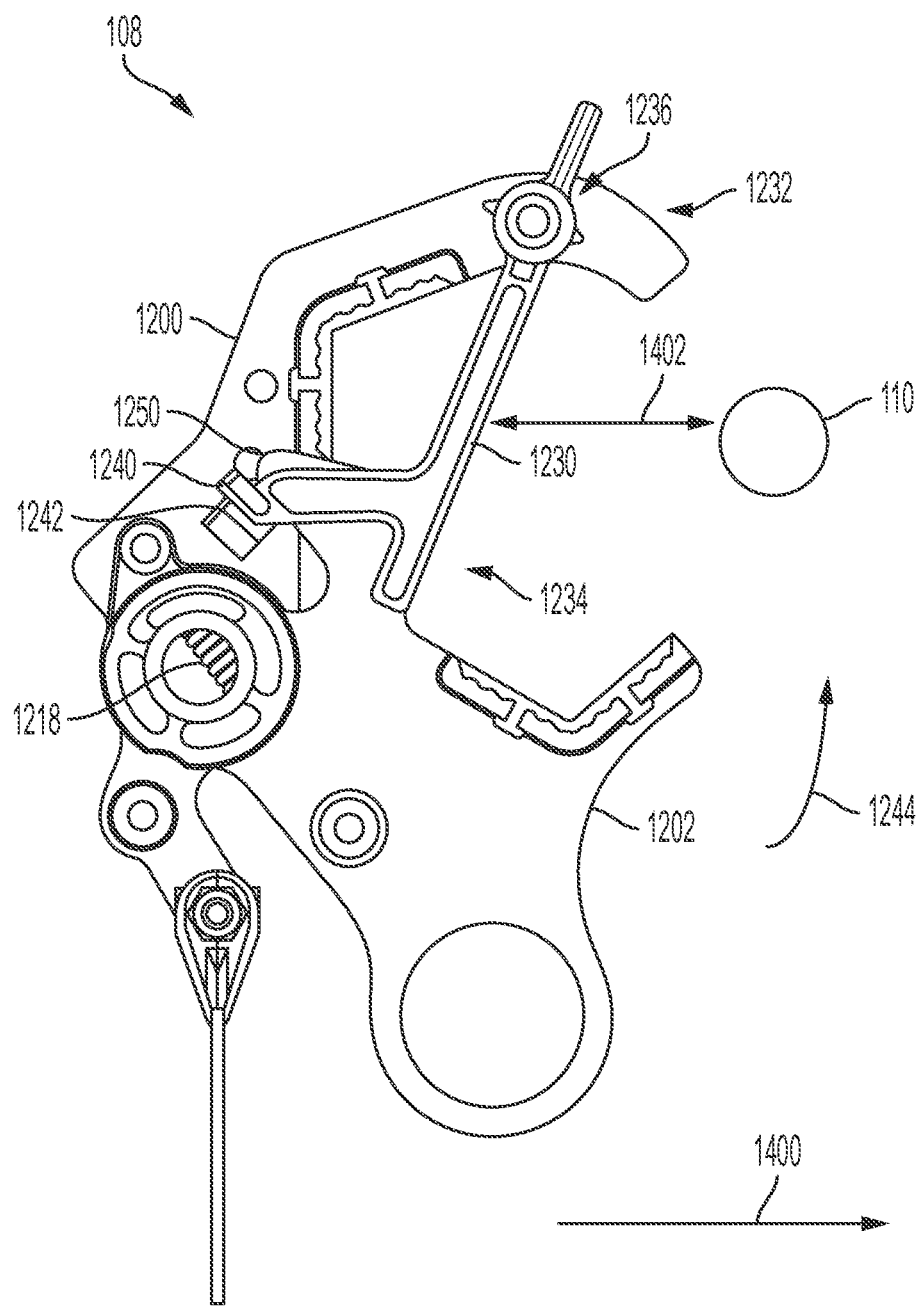
FIG. 14 is an illustration of an example clamp.

Referring to FIG. 14, in some embodiments, the first jaw 1200 can be formed of two parts that sandwich the second jaw 1202. In the cross-section view of FIG. 14, one side of the first jaw 1200 is removed to see the interaction between the components that make up the clamp 108. The clamp 108 includes an arresting member 1230 to selectively retain the clamp 108 in an opened position (e.g., the arrested position). For example, the arresting member 1230 may hold the first jaw 1200 and the second jaw 1202 in the opened position, such that the clamp 108 may receive the line 110 within the attachment end 1206. In some embodiments, the arresting member 1230 may extend along an axis between a first end 1232 and a second end 1234. The first end 1232 may be attached to the first jaw 1200. For example, the first end 1232 may be attached at an attachment location 1236 of the first jaw 1200. In some embodiments, the arresting member 1230 may be pivotably attached to the first jaw 1200, such that the arresting member 1230 may pivot relative to the first jaw 1200 about an axis 1238 (shown in FIG. 12).

The second end 1234 of the arresting member 1230 may be removably attached to the first jaw 1200. For example, the second end 1234 of the arresting member 1230 may comprise a first ledge 1240. The first ledge 1240 may comprise a protuberance, an outcropping, or the like that projects along a direction that is non-parallel (e.g., perpendicular, etc.) to an axis along which the arresting member 1230 extends. In some embodiments, the first ledge 1240 may engage a second ledge 1242 that is defined on the first jaw 1200. For example, the first ledge 1240 of the arresting member 1230 may rest upon the second ledge 1242 of the first jaw 1200 when the clamp 108 is in the opened, arrested position (e.g., as illustrated).

Also, while in the arrested position, the arresting member 1230 may be removably attached to the second jaw 1202. For example, the second jaw 1202 can include a nose area 1250. In some embodiments, the nose area 1250 can be formed on a relatively narrow portion of the second jaw 1202 that moves between the two halves of the first jaw 1200. As shown, the nose area 1250, together with the second ledge 1242, sandwiches the first ledge 1240 between the nose area 1250 and the second ledge 1242. As such, the first ledge 1240 presents a physical interference preventing rotation of the first jaw 1200 relative to the second jaw 1202. Similarly, the physical interference prevents rotation of the second jaw 1202 relative to the first jaw 1200. This is only one example of how the arresting member 1230 can interact with the first jaw 1200 and the second jaw 1202 to maintain the clamp 108 in the opened position (e.g., the arrested position) despite the force of the biasing member 1218 urging the clamp 108 to move toward the closed position.

In the opened, arrested position as shown in FIG. 14, the biasing member 1218 may exert a closing force 1244 (represented by a curved arrow) on the first jaw 1200 and the second jaw 1202 to bias the clamp 108 toward the closed position. When the arresting member 1230 is in contact with the second jaw 1202 (e.g., by virtue of the nose area 1250 resting upon the first ledge 1240), the arresting member 1230 may maintain the clamp 108 in the opened, arrested position, with the first jaw 1200 and the second jaw 1202 spaced apart despite the bias of the biasing member 1218 toward the closed position.

As described, the arresting member 1230 is configured to engage at least one of the first jaw 1200 or the second jaw 1202. The arresting member 1230 is movable between a first position relative to at least one of the first jaw 1200 or the second jaw 1202 and a second position relative to at least one of the first jaw 1200 or the second jaw 1202. In the first position, the arresting member 1230 is configured to at least one of: restrain rotation of the first jaw 1200 relative to the second jaw 1202 about the axis 1216 (shown in FIG. 12), or restrain rotation of the second jaw 1202 relative to the first jaw 1200 about the axis 1216. In the second position, the arresting member 1230 is configured to at least one of: enable rotation of the first jaw 1200 relative to the second jaw 1202 about the axis 1216, or enable rotation of the second jaw 1202 relative to the first jaw 1200 about the axis 1216.

Remaining with FIG. 14, the clamp 108 may be moved in a first direction 1400 toward the line 110. As the clamp 108 is moved toward the line 110, a distance 1402 between the line 110 and the arresting member 1230 may be reduced.

Figure 14B:
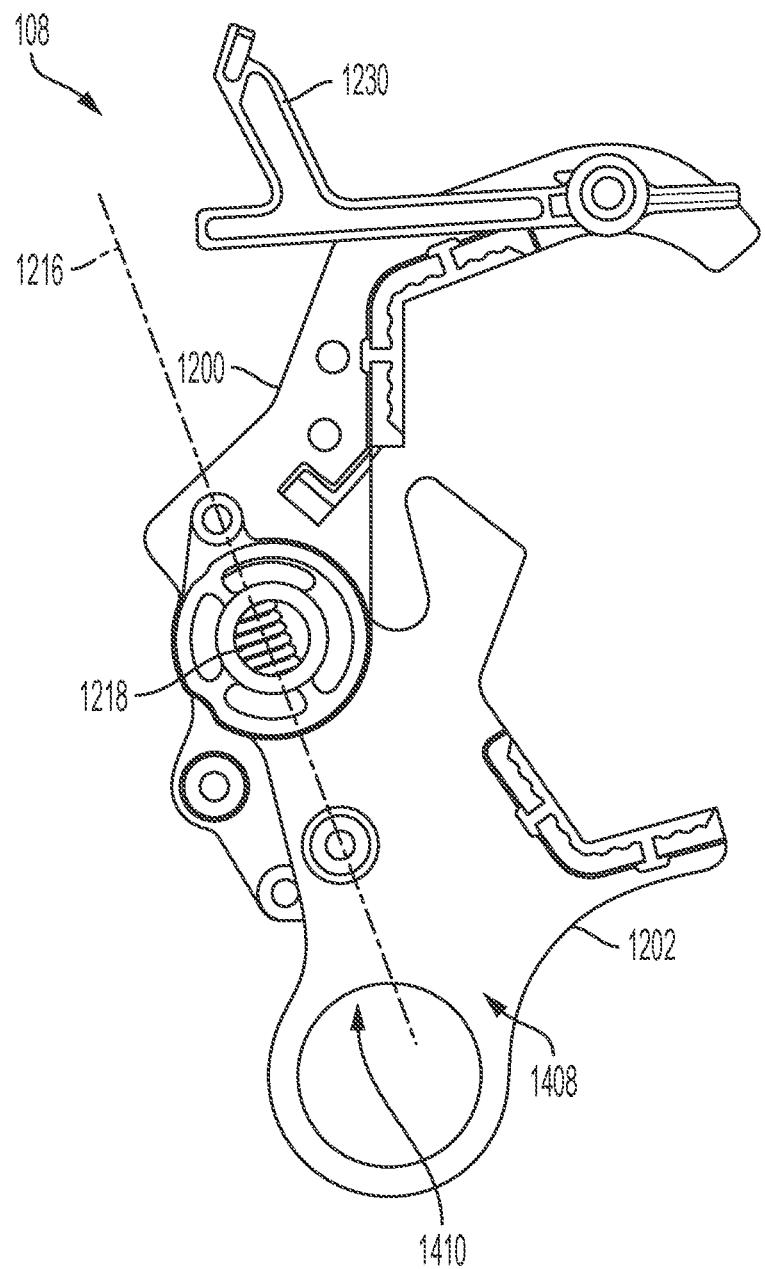
FIG. 14B is an illustration of an example clamp.

Referring to FIG. 14B, the clamp 108 can be placed into an over-center position, which can aid an operator in placing the clamp 108 in the arrested position. As shown, if the first jaw 1200 and the second jaw 1202 are a suitable number of degrees away from each other, the biasing member 1218 (or at least the biasing member axis 1226) will move from a first side 1408 of the axis 1216 to a second side 1410 of the axis 1216. In this position, the biasing member 1218 will thus be biasing the first jaw 1200 and the second jaw 1202 toward the opened position, rather than the closed position, and thus the clamp 108 will remain open without an external force maintaining the clamp 108 in the opened position. It is understood that a stop or limiter may be included on at least one of the jaws 1200, 1202 to limit the rotational travel distance in the over-center position.

Figure 15:
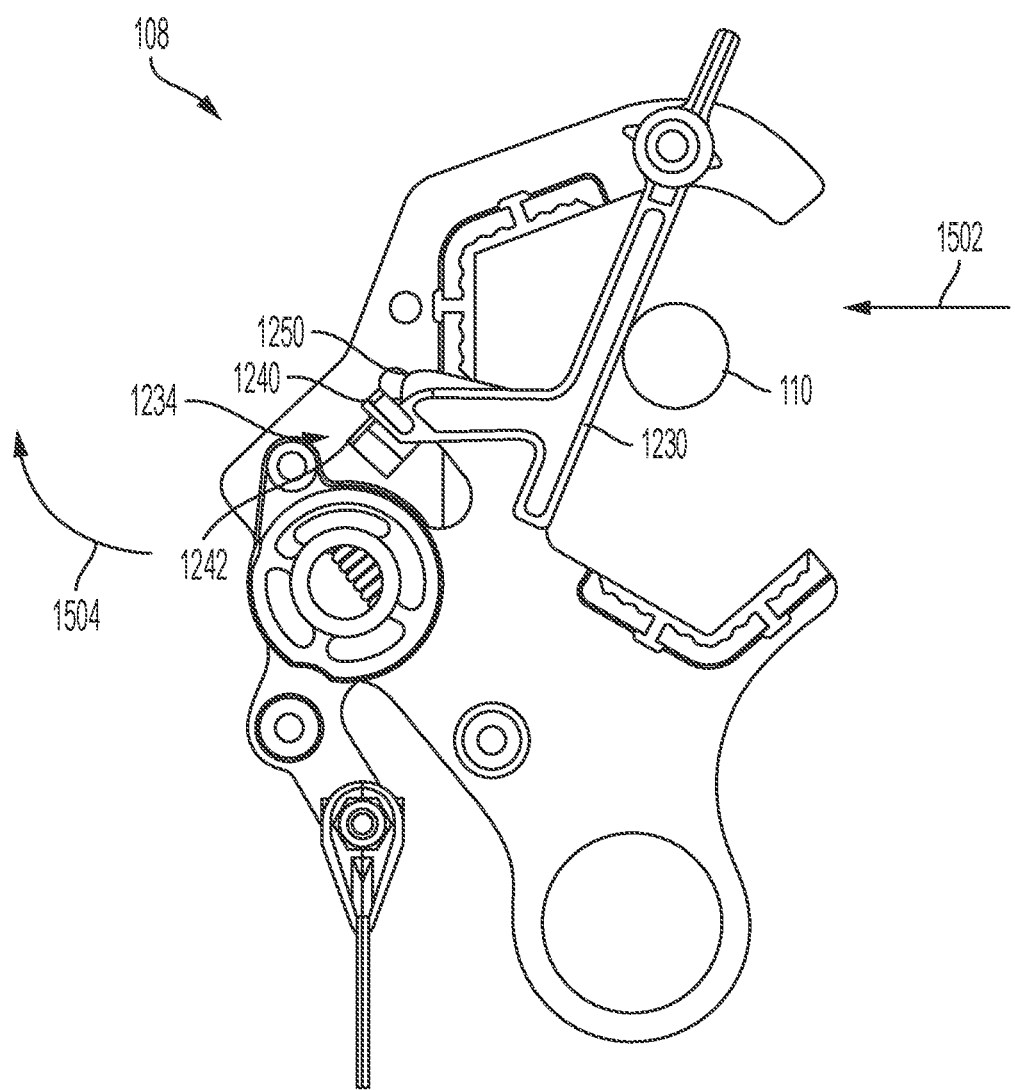
FIG. 15 is an illustration of an example clamp.

Referring to FIG. 15, the line 110 may eventually come into contact with the arresting member 1230 and apply a force in a second direction 1502 onto the arresting member 1230. This force in the second direction 1502 causes the first ledge 1240 of the arresting member 1230 to dislodge from its sandwiched location between the second ledge 1242 of the first jaw 1200 and the nose area 1250 of the second jaw 1202. The second end 1234 of the arresting member 1230 may therefore pivot in a backwards direction 1504.

Figure 16:
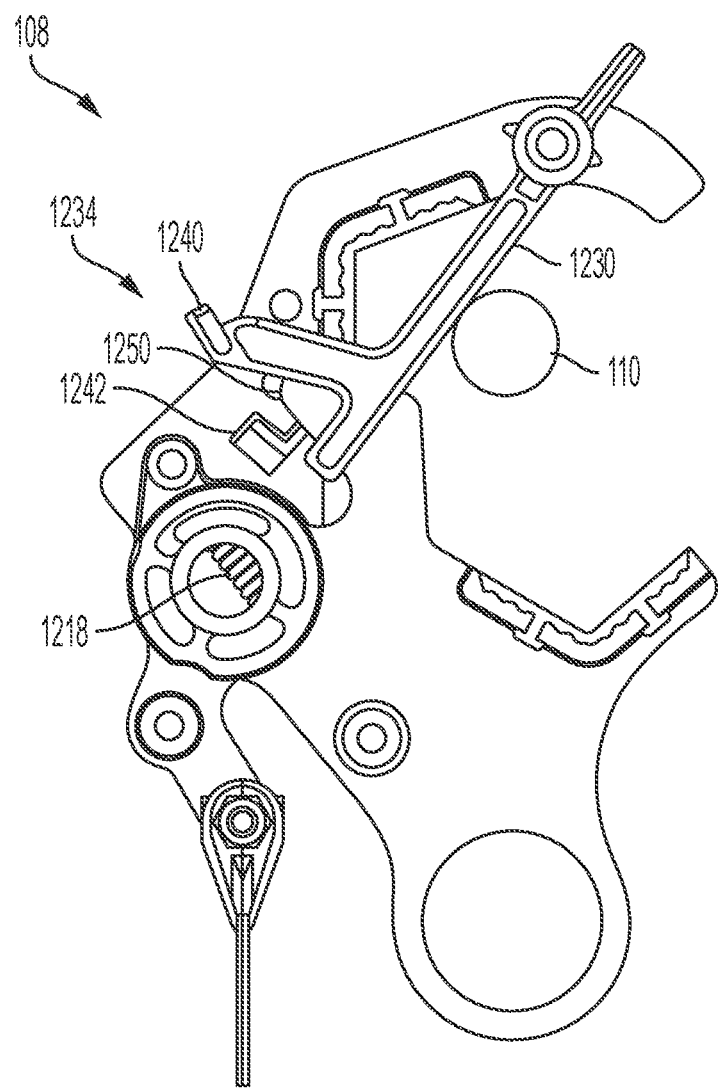
FIG. 16 is an illustration of an example clamp.

Referring to FIG. 16, as a result of the second end 1234 of the arresting member 1230 no longer contacting the second ledge 1242 of the first jaw 1200 and the nose area 1250 of the second jaw 1202, the arresting member 1230 may not maintain the first jaw 1200 and the second jaw 1202 in the opened (e.g., arrested) position. Rather, the force of the biasing member 1218 may cause the first jaw 1200 and the second jaw 1202 to move towards each other into the closed position.

Figure 17:
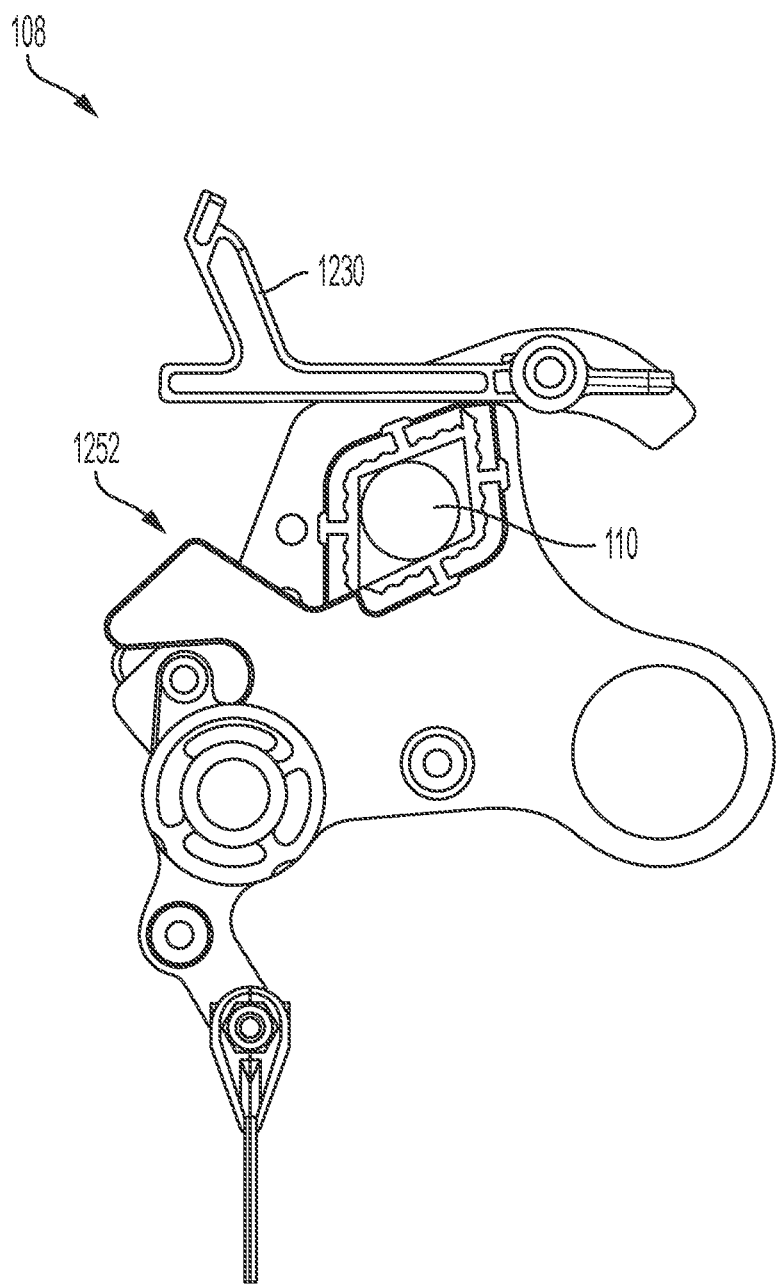
FIG. 17 is an illustration of an example clamp.

Referring to FIG. 17, in this way, the line 110 may be gripped between the first jaw 1200 and the second jaw 1202 to mount the clamp 108 to the line 110. The biasing member 1218 is configured to then maintain the clamp 108 in the closed position until it is acted upon by an outside force. As such, the clamp 108 can remain reliably mounted to the line for a relatively long time.

As a summary of the clamp 108 positions, the biasing member 1218 is configured to urge rotation of at least one of the first jaw 1200 or the second jaw 1202 to at least one of an over-center position, an arrested position, or a closed position. When the first jaw 1200 and the second jaw 1202 are in the over-center position, the biasing member 1218, or at least the biasing member axis 1406 is located on the first side 1408 of the axis 1216. When the first jaw 1200 and the second jaw 1202 are in the closed position, the biasing member 1218 is located on the second side 1410 of the axis 1216.

Figure 18:
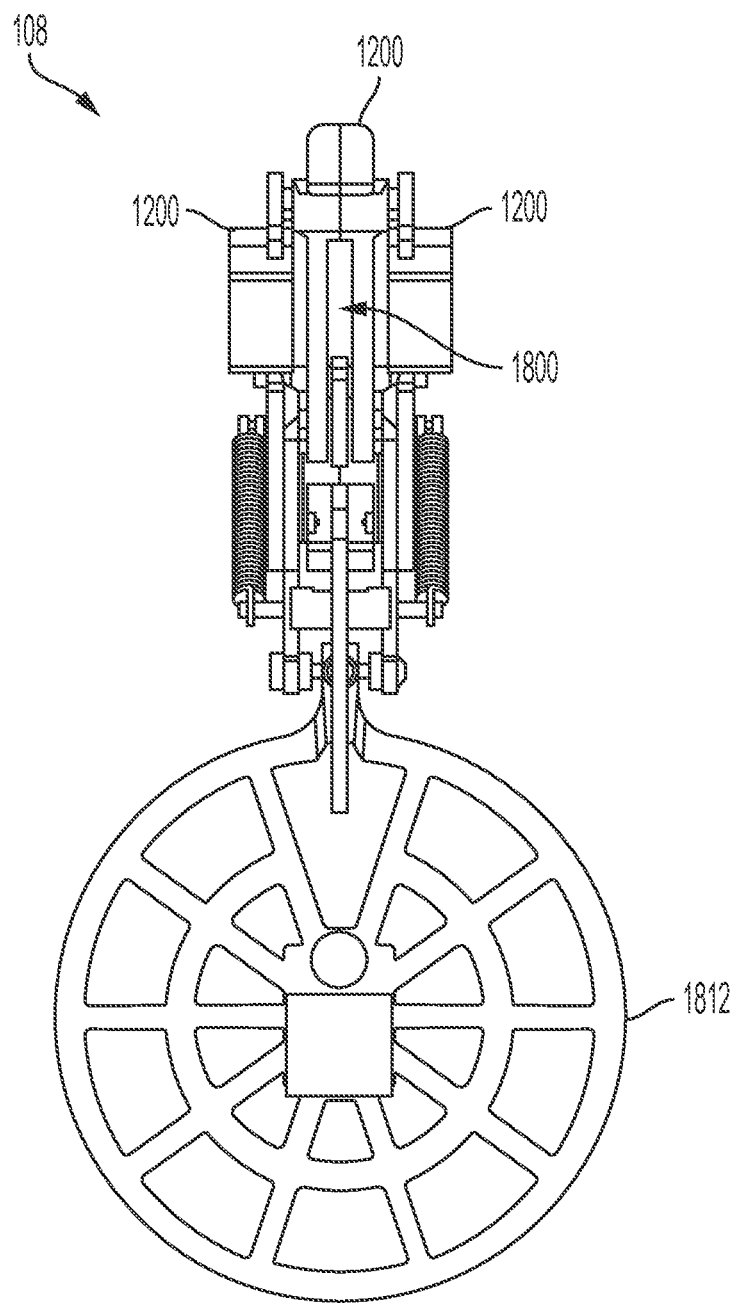
FIG. 18 is an illustration of an example clamp.

Referring to FIG. 18, in some embodiments, the first jaw 1200 may define a slot 1800 that is defined between spaced apart jaw walls of the first jaw 1200. This slot 1800 may be sized to accommodate the arresting member 1230 as the arresting member 1230 pivots in the backwards direction 1504 (shown in FIG. 15) and through the first jaw 1200.

Figure 19:
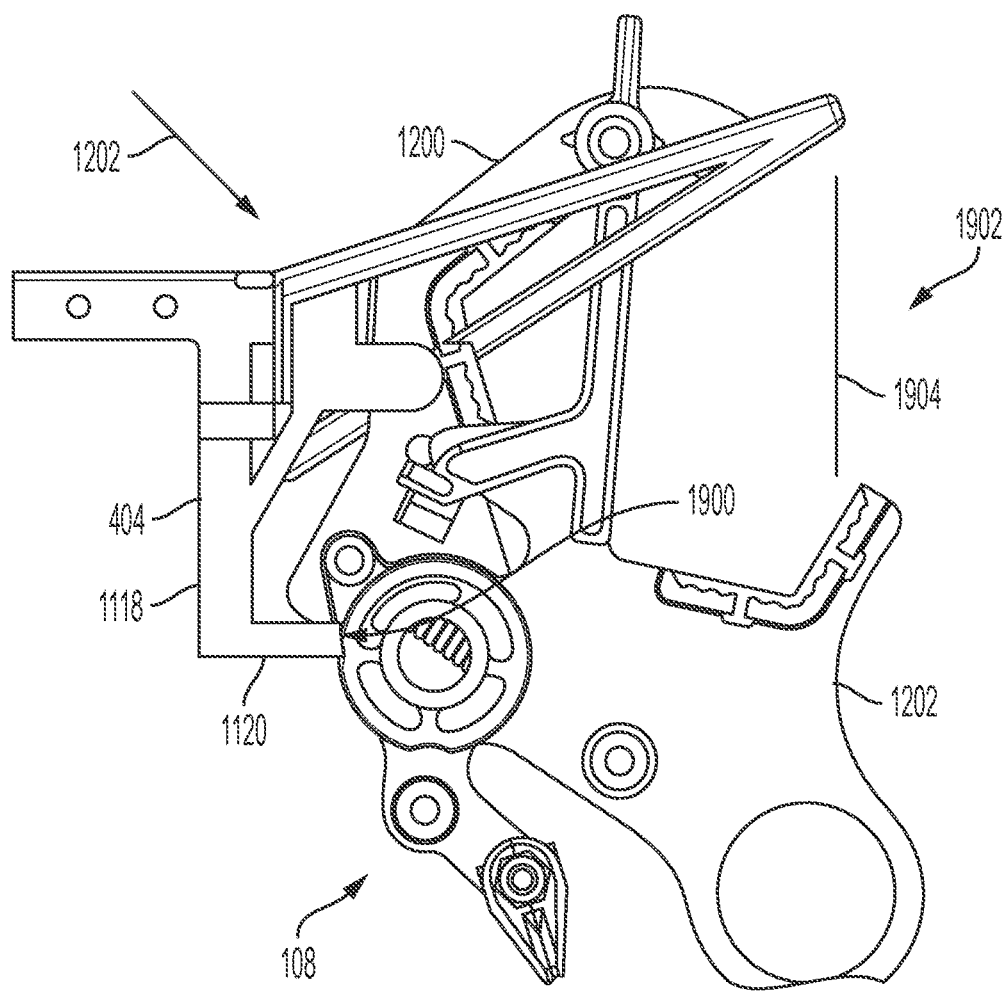
FIG. 19 is an illustration of an example clamp.

Referring to FIG. 19, the clamp 108 is shown attached to the second attachment feature 404 of the guide 400. The second attachment feature 404 is configured to support the clamp 108 for mounting to the line 110 by flying, toward the line, the UAV 100 to which the guide 400 is attached as has been previously discussed. The attachment feature 404 includes an attachment component 1114 (shown in FIG. 11) configured to attach the clamp 108 to the guide 400. In FIG. 19, the clamp is shown in the arrested position and the clamp 108 is in position to be mounted to the line 110.

Figure 20:
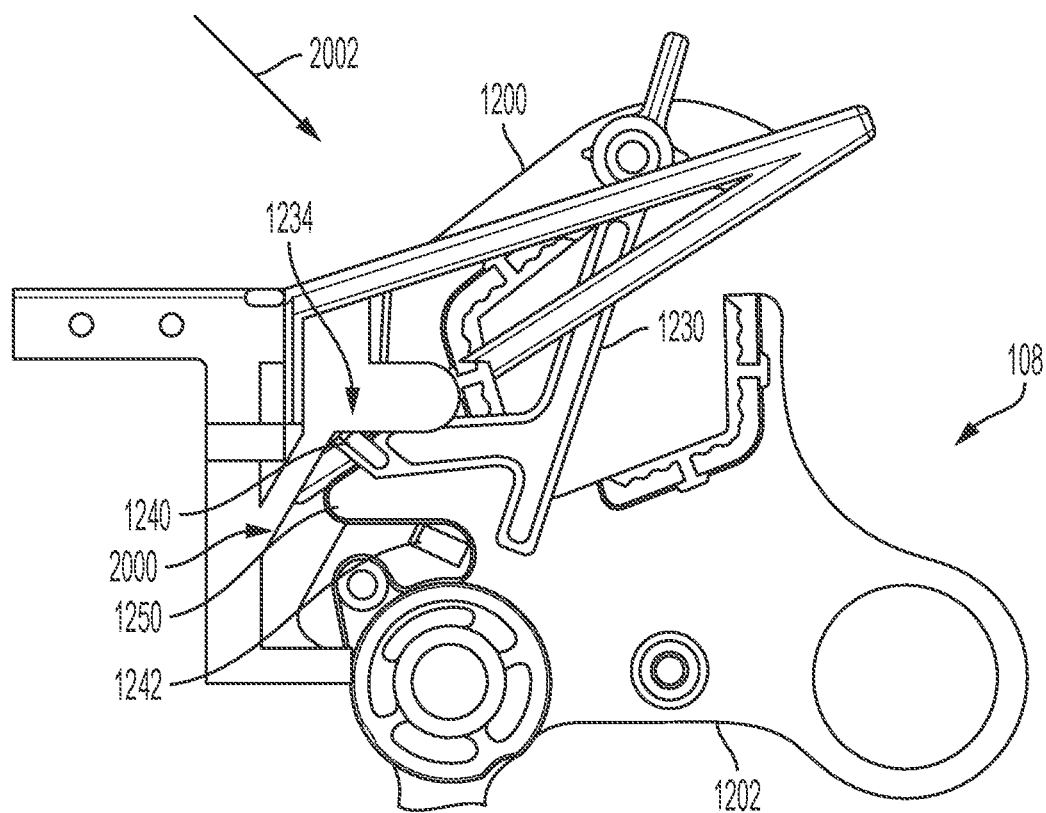
FIG. 20 is an illustration of an example clamp.

Referring to FIG. 20, the line 110 (not shown in this figure), has contacted the arresting member 1230. The resultant force between the line 110 and the arresting member 1230 causes the second end 1234 of the arresting member 1230 to leave engagement or contact with the second ledge 1242 of the first jaw 1200 and the nose area 1250 of the second jaw 1202. As a result of the second end 1234 of the arresting member 1230 no longer contacting the second ledge 1242 of the first jaw 1200 and the nose area 1250 of the second jaw 1202, the arresting member 1230 may not maintain the first jaw 1200 and the second jaw 1202 in the opened (e.g., arrested) position, and the clamp 108 is beginning to move to the closed position.

Also in FIG. 20, the second attachment feature 404 includes a backing portion 2000. In some embodiments, the backing portion 2000 is angled and is configured to be impacted by the arresting member 1230. As the biasing member 1218 (not shown) forces the second jaw 1202 to rotate relative to the first jaw 1200, a portion 1252 of the second jaw 1202 (shown in FIG. 17) strikes the arresting member 1230 with significant force. This force propels the arresting member 1230 (e.g., the first ledge 1240) into contact with the backing portion 2000 as the arresting member 1230 rotates.

The backing portion 2000 is configured to exert a detachment force in the direction of arrow 2002 on the clamp 108 to forcibly detach the clamp 108 from the guide 400. The detachment force 2002 is a function of kinetic energy (e.g., rapid movement of the second jaw 1202 relative to the first jaw 1200) that causes the clamp 108 to move from the arrested position to the closed position. This detachment occurs as the clamp 108 moves from the arrested position to the closed position whereby a distance between a first jaw 1200 of the clamp 108 and a second jaw 1202 of the clamp 108 is decreased to mount the clamp 108 to the line 110.

The backing portion 2000 is configured to exert the detachment force 2002 to the arresting member 1230 of the clamp 108 responsive to the arresting member 1230 contacting the backing portion 2000 as the clamp 108 moves from the arrested position to the closed position. The arresting member 1230 then translates the force 2002 to at least one of the first jaw 1200 or the second jaw 1202 to overcome the forces maintaining attachment between the clamp 108 and the second attachment feature 404, thus removing the clamp 108 from the second attachment feature 404 and the guide 400.

Figure 21:
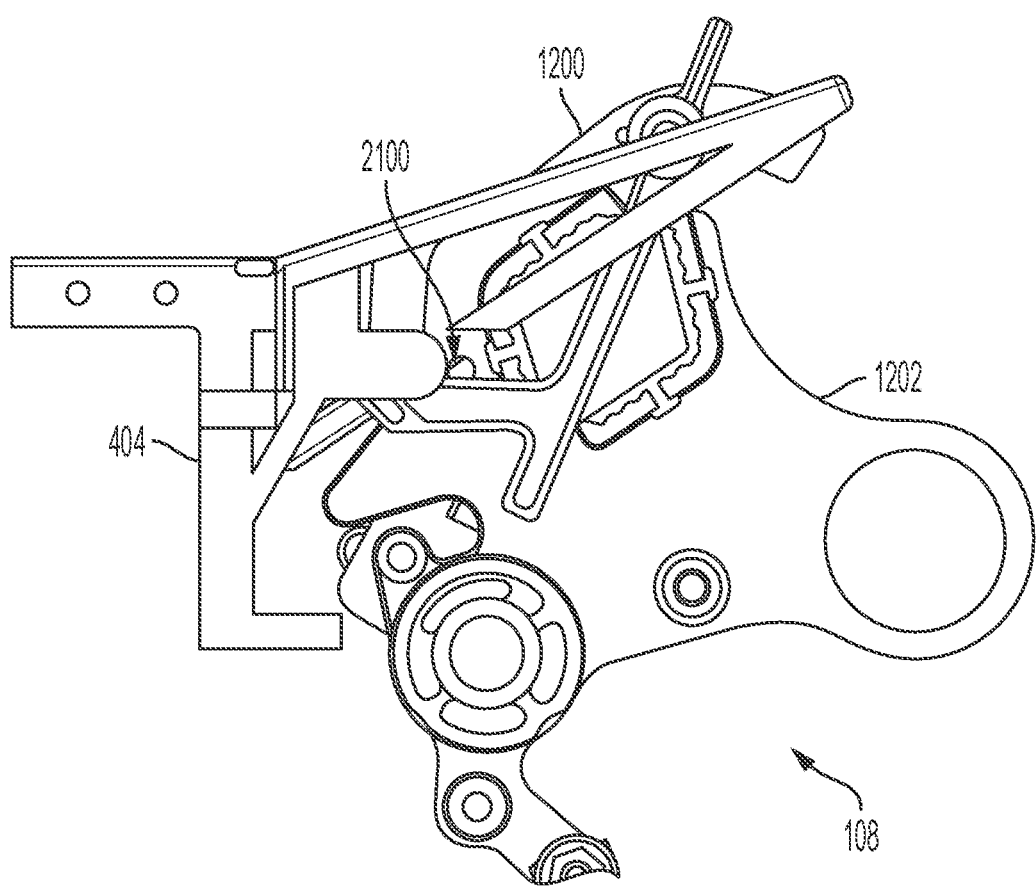
FIG. 21 is an illustration of an example clamp.

Referring to FIG. 21, as previously discussed, the second attachment feature 404 includes an attachment component 1100 includes a first mating portion 1116 (shown in FIG. 11) configured to mate with a second mating portion 2100 of the clamp 108 to attach the clamp 108 to the guide 400. In some embodiments, the second mating portion 2100 is an aperture defined by a portion of the first jaw 1200. It is to be understood that the first mating portion 1116 (e.g., the protrusion on the second attachment feature 404) can be located instead on the clamp 108 and the second mating portion 2100 (e.g., the aperture defined by the clamp 108) can be located on the second attachment feature 404. In order to ease the forcible, automatic removal of the clamp 108 instantaneously with the mounting of the clamp 108 to the line 110, the attachment component 1100 can be elastically deformable to attach the clamp 108 to the guide 400.

Returning to FIG. 19, the second attachment feature 404 can include the previously discussed abutment wall 1118 and the abutment extension 1120. In some embodiments, a face 1900 of the abutment extension 1120 can contact the clamp 108 when the clamp 108 is attached to the second attachment feature 404. It is possible that the clamp 108 may have some ability to rotate about the connection with the second attachment feature 404 at the first mating portion 1116 engagement with the second mating portion 2100 of the clamp 108. However, the contact between the clamp 108 and the abutment extension 1120 helps maintain the open side 1902 of the clamp 108 at a particular angle with respect to the plane 226 (shown in FIG. 2).

The contact between the clamp 108 and the abutment extension 1120 enables the guide 400 to be configured to support the clamp 108 such that an imaginary clamp line 1904 between the first jaw 1200 of the clamp 108 and the second jaw 1202 of the clamp 108 when the clamp 108 is in the arrested position is non-parallel to the plane 226 intersecting the first propeller 210, the second propeller 214, and the third propeller 218 (shown in FIG. 2).

Figure 22:
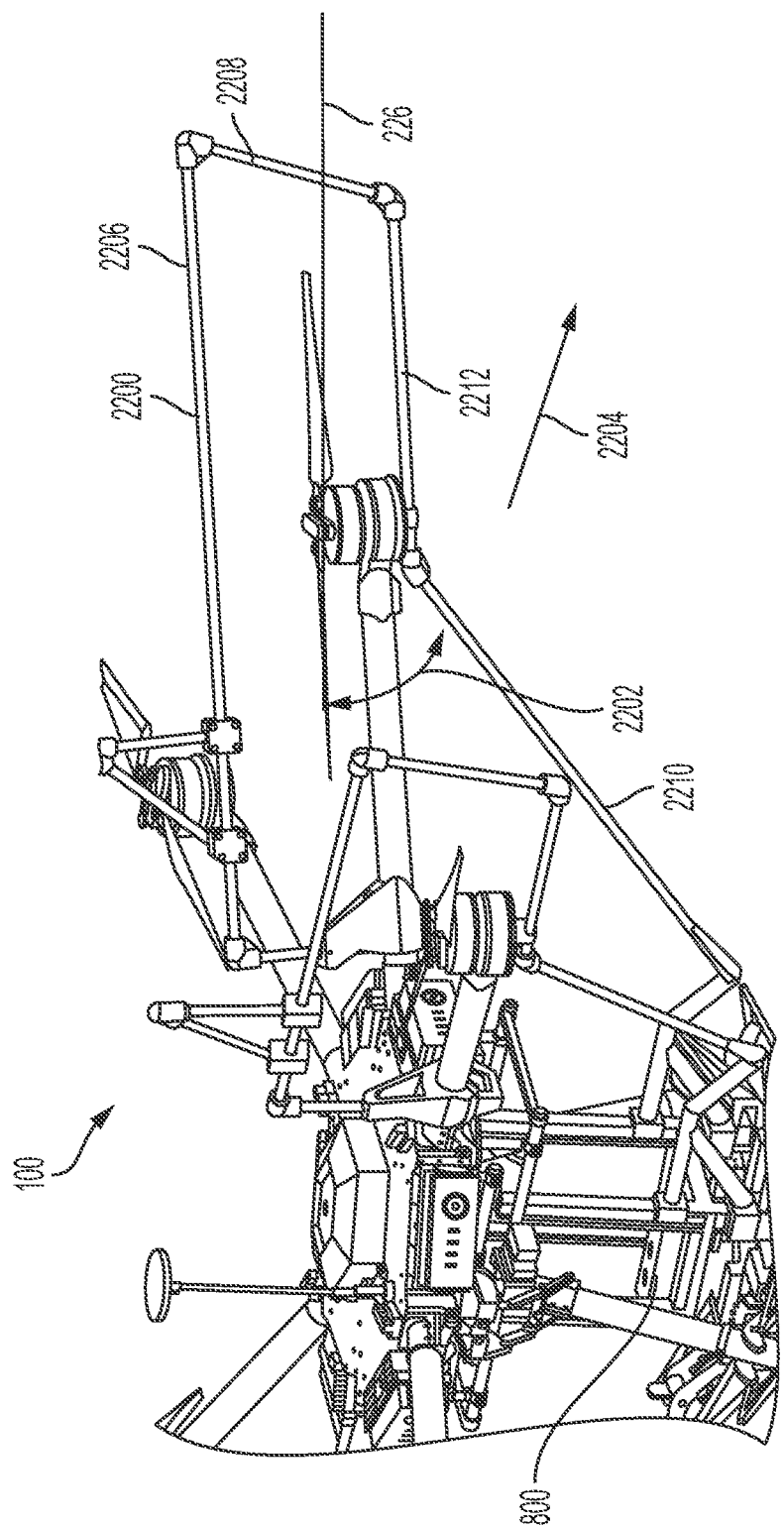
FIG. 22 is an illustration of an example propeller guard.

Referring to FIG. 22, the UAV 100 can include a propeller guard 2200 that is at an angle 2202 relative to the plane 226 intersecting the first propeller 210, the second propeller 214, and the third propeller 218 to direct the clamp 108 to the line 110. As has been discussed, the rotation device 800 enables the UAV 100 to approach the line 110 to mount the clamp 108 to the line 110 from a single orientation (e.g., line 2204). The propeller guard 2200 can extend help ensure the line 110 will not contact the propellers on the side of the UAV 100 that approaches the line 110. A first side 2206 of the propeller guard 2200 can be located above the propeller, and then angle to a second side 2208 of the propeller that is generally in front of the propeller (e.g., in the direction 2204 of the application of the clamp 108). The propeller guard 2200 then extends along a third side 2210 at an angle 2202 relative to the plane 226 to direct the clamp 108 to the line 110. In some examples there may be an intermediate propeller guard portion 2212 between the second side 2208 and the third side 2210.

Figure 23:
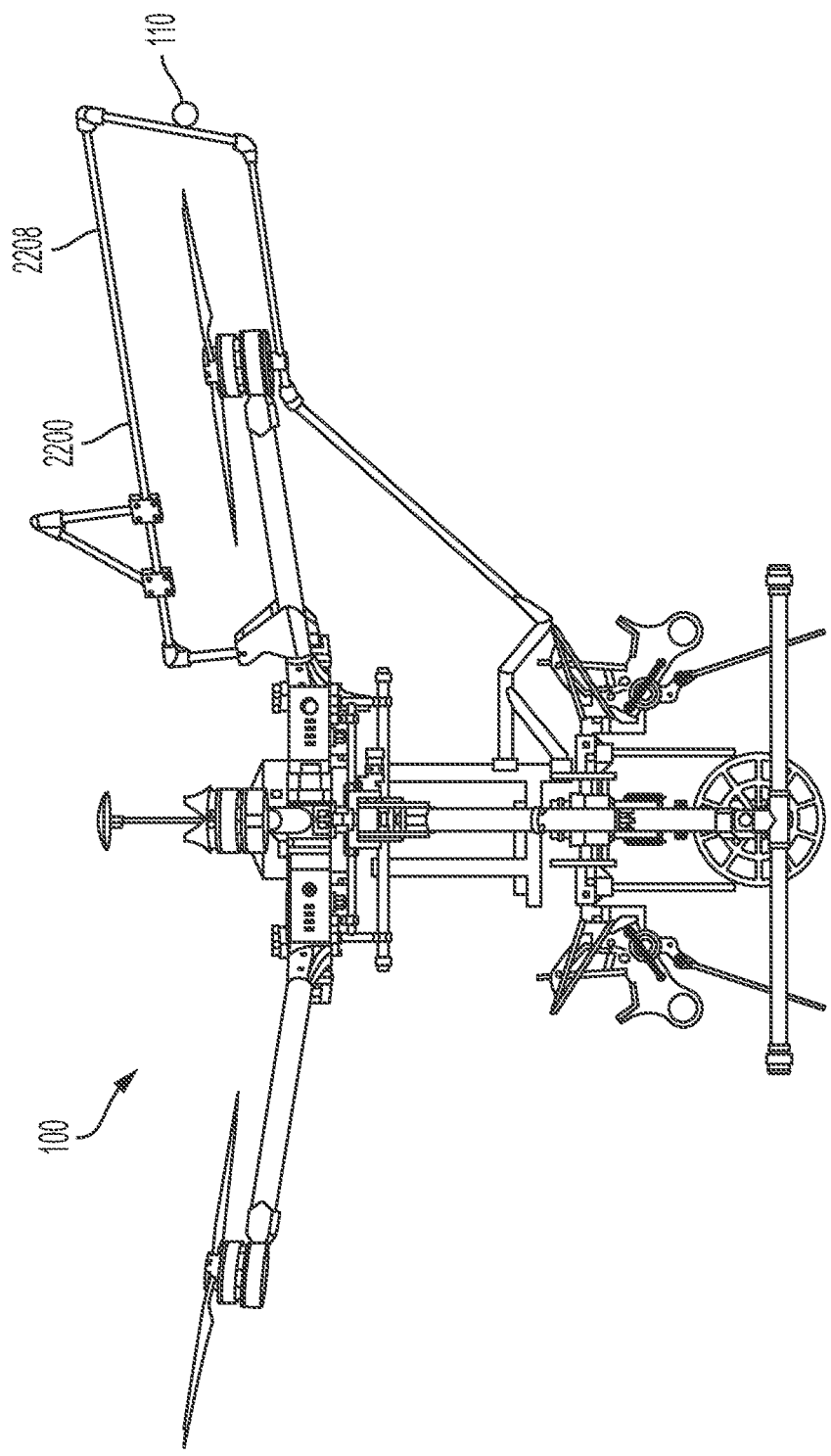
FIG. 23 is an illustration of an example propeller guard

Referring to FIG. 23, the line 110 is shown in contact with the second side 2208 of the propeller guard 2200 to show the propeller guard 2200 inhibiting and or prohibiting contact between the line 110 and the propellers of the UAV 100.

Figure 24:
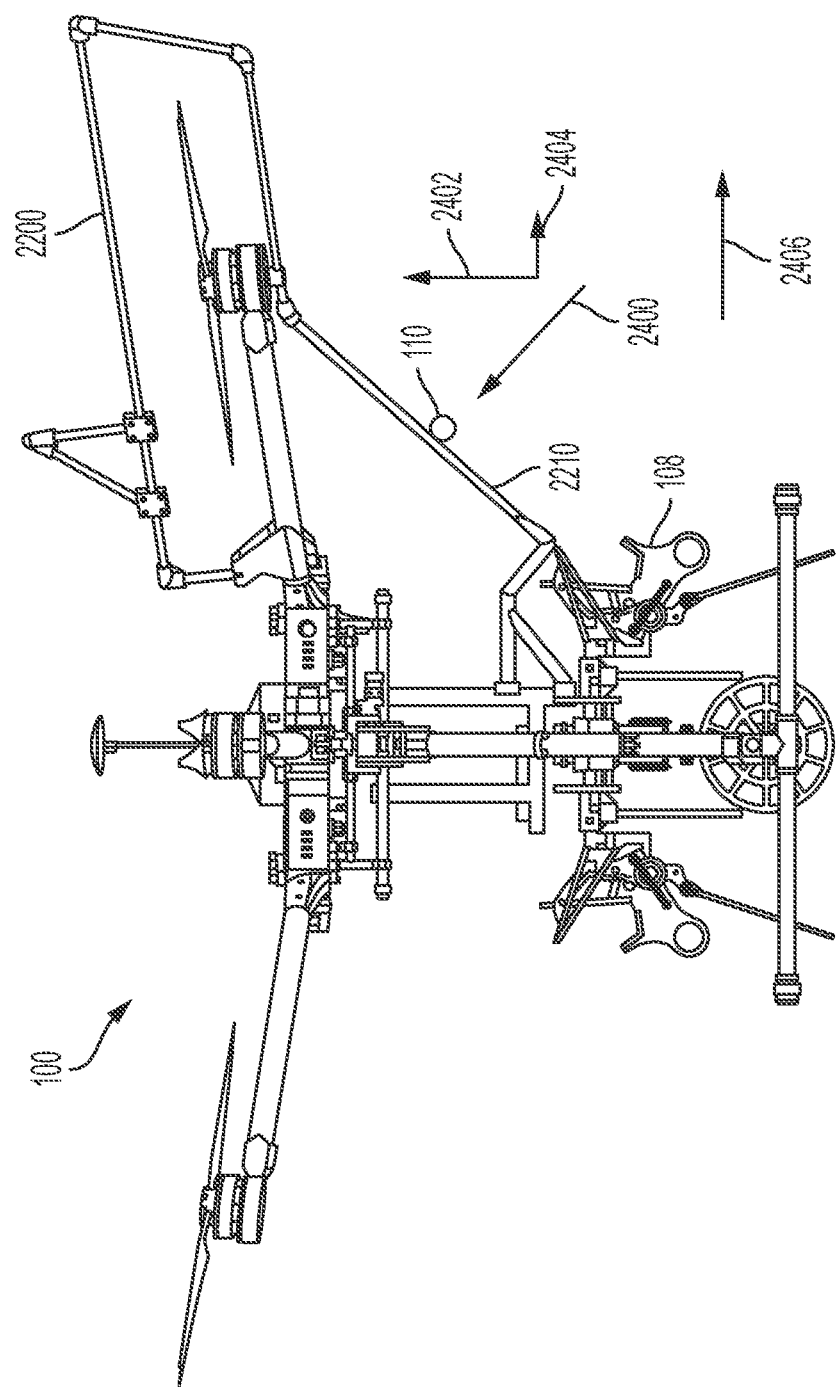
FIG. 24 is an illustration of an example propeller guard.

Referring to FIG. 24, the line 110 is shown in contact with the third side 2210 of the propeller guard 2200 that is configured to direct the clamp 108 to the line 110. At contact, a force imparted to the propeller guard 2200 third side 2210 is represented by line 2400. The resultant forces on the UAV 100 can be represented in orthogonal directions as vertical force 2402 and horizontal force 2404. The resultant vertical force 2402 will urge the UAV 100 in an upward direction to direct the clamp 108 to the line 110. The vertical force 2402 will continue to urge the UAV 100 in an upward direction as the UAV 100 is moving in the direction toward the line 110 (e.g., direction 2406).

Figure 25:
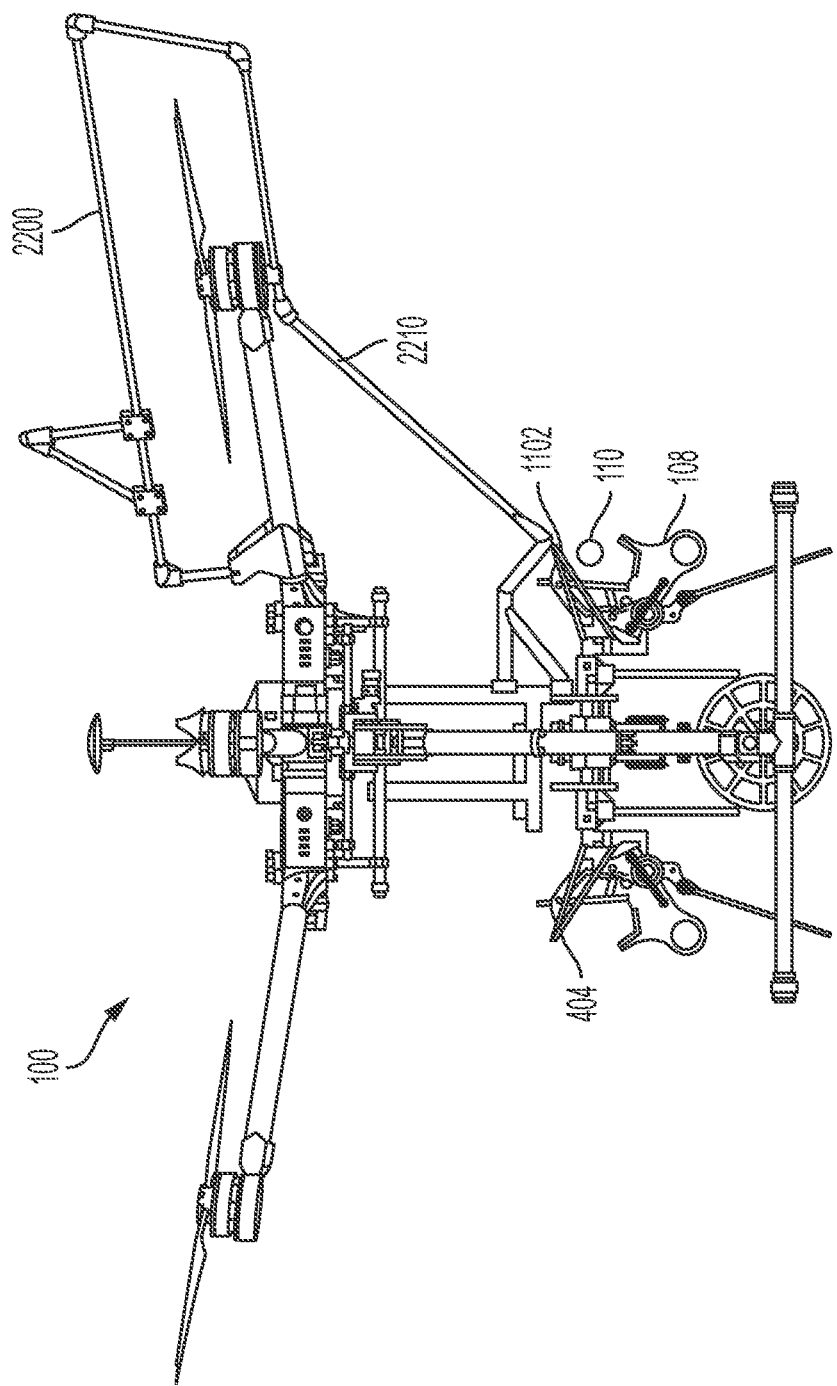
FIG. 25 is an illustration of an example propeller guard

Referring to FIG. 25, the elevation view of the UAV 100 shows cooperation between the third side 2210 of the propeller guard 2200 and the alignment structure 1102 of the second attachment feature 404. As the line 110 passes away from the end of the third side 2210 of the propeller guard 2200, the line 110 can contact the alignment structure 1102 to further direct the clamp 108 to the line 110. In some embodiments, any gap between the third side 2210 and the alignment structure 1102 are significantly smaller than a diameter of the line 110 such that the line cannot pass between the third side 2210 and the alignment structure 1102.

Figure 26:
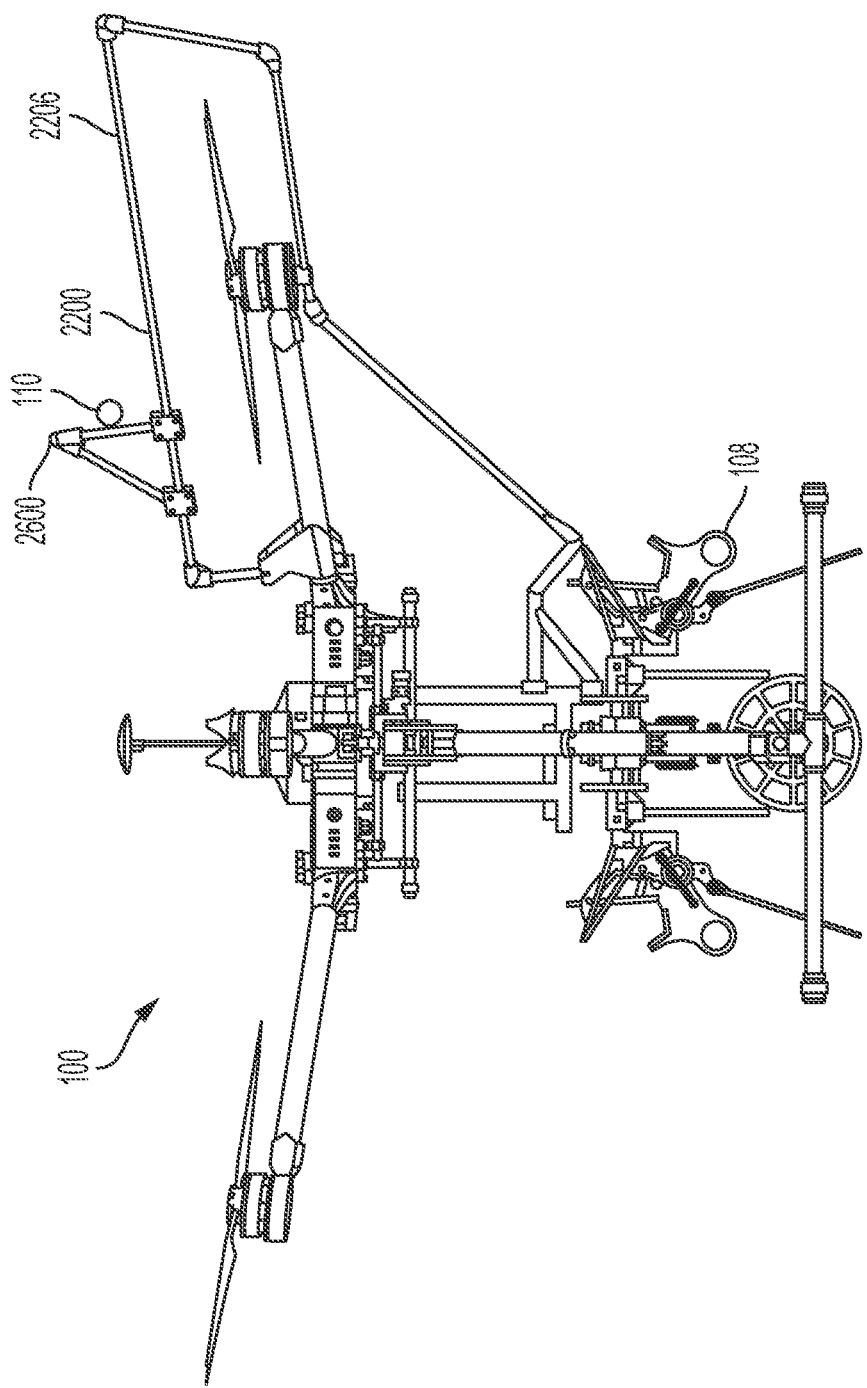
FIG. 26 is an illustration of an example propeller guard.

Referring to FIG. 26, the propeller guard 2200 can include an upward facing stop 2600 extending away from the first side 2206 of the propeller guard 2200. In FIG. 26, the line 110 is shown in contact with the stop 2600 to demonstrate the potential of the stop 2600 to reduce and/or eliminate the possibility of the line 110 passing over a portion of the front side of the UAV 100 and making contact with the propellers on the side opposite the forward side of the UAV 100.

In some embodiments, the UAV 100 can include a first camera to provide visual assistance to a ground-based operator. For example, the first camera can include a system of communications 106 between the UAV 100 and the ground-based controller 104 such that the first camera can relay pictures and/or moving images from an aerial location to the ground-based controller 104. The ground-based operator can view the images from the first camera in order to properly position the UAV 100 to align the clamp 108 to the line 110. In some embodiments, the ground-based operator can view a screen on the ground-based controller to fly the UAV 100 to present the clamp 108 to the line 110 and cause contact between the clamp 108 and the line 110 to move the arresting member xxx to automatically close the clamp 108 around the line 110 to mount the clamp 108 to the line 110. In general, the first camera can be mounted to face a direction toward what may be considered the "front" of the UAV 100, such that the ground-based operator can watch the line 110 as it is approached by the UAV 100 and guide the UAV 100 to the line 110.

Additionally, the UAV 100 can include a second camera mounted on an arm of the UAV 100 and facing toward the clamp 108 that is attached to the guide 400 or the second attachment feature 404. The second camera can include a system of communications 106 between the UAV 100 and one or more ground-based controllers. In some embodiments, a second ground-based operator can view the images from the second camera on a second ground-based controller 114 (shown in FIG. 1) in order to limit the amount of information presented at the ground-based controller 104. The second camera can relay information regarding the interaction between the clamp 108 and the line 110 that may not be within the viewing range of the first camera.

Returning to FIG. 18, A power line protection device 1812 can be provided for protecting a power line (e.g., line 110) from animals (e.g., avifauna) and/or for protecting animals from the power line. In some embodiments, the animals comprise airborne animals, such as birds, bats, etc. In some examples, the animals may be airborne during the day and/or at night. To limit animal contact with the line 110, the power line protection device 1812 is provided. The power line protection device 1812 is effective in deterring avifauna (e.g., birds, bats, and other flying creatures) from flying into the line 110 during the day and/or at night. For example, the power line protection device 1812 can emit light, so as to deter avifauna (e.g., birds, bats, and other flying creatures) at night. Additionally, the power line protection device 1812 is conspicuous during the day and can reflect light, so as to deter animals during the day.

In some embodiments, the power line protection device 1812 may be brightly colored, such as by having an orange color, yellow color, red color, etc. However, these bright colors may not be visible in low light conditions (e.g., dawn, dusk, night time). As such, one or more structures, components, etc. may be provided for reflecting and/or emitting light, with this reflected and/or emitted light being visible in low light conditions and during the day.

In some embodiments, the line protection device 1812 may be attached to the clamp 108. The line protection device 1812 may be attached in any number of ways, such as with mechanical fasteners, or the like. In some embodiments, the line protection device 1812 may hang from a bottom side of the clamp 108, such that the line protection device 1812 is relatively visible by birds or other animals.

Figure 27:
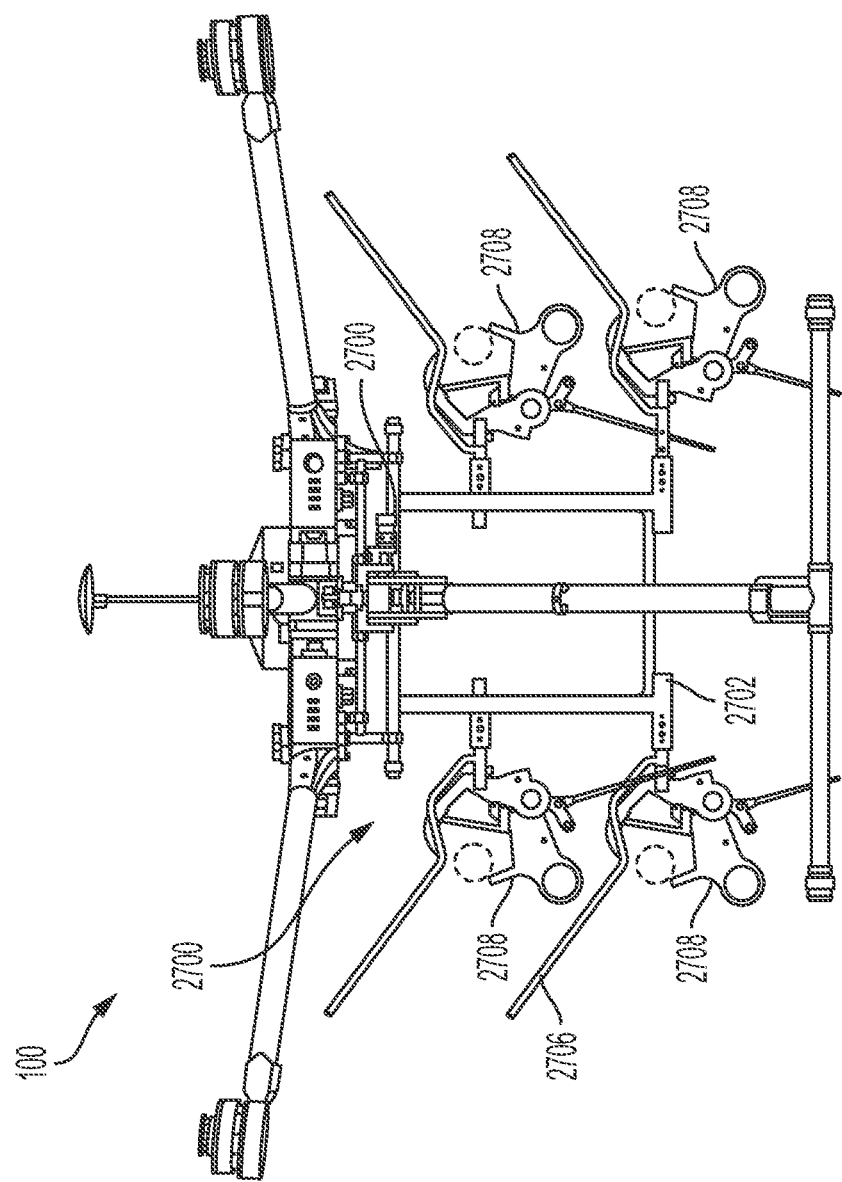
FIG. 27 is an illustration of an example unmanned aerial vehicle.

Referring to FIG. 27, in some embodiments, the UAV 100 can include a guide 2700. The guide 2700 includes a mount 2702, a first attachment feature 2704, and a second attachment feature 2706 configured to support a clamp 2708. In some embodiments, the mount 2702 and the second attachment feature 2706 may be attached to each other with additional components between the mount 2702 and the second attachment feature 2706, as is the case with the embodiment shown in FIG. 5. However, in some embodiments, such as the embodiment in FIG. 27, the second attachment feature 2706 is attached directly to the mount 2702.

As shown in FIG. 7, the base 610 of the mount 2702 may define one or more attachment openings 700. For example, the base 610 may define a first attachment opening 702, a second attachment opening 704, a third attachment opening 706, and/or a fourth attachment opening 708. The attachment openings 700 may be sized to receive the second attachment feature 2706. In some embodiments, the guide 2700 does not include a rotation device, and an operator is required to orient the UAV 100 for each particular clamp 108 to be mounted to the line 110.

Figure 28:
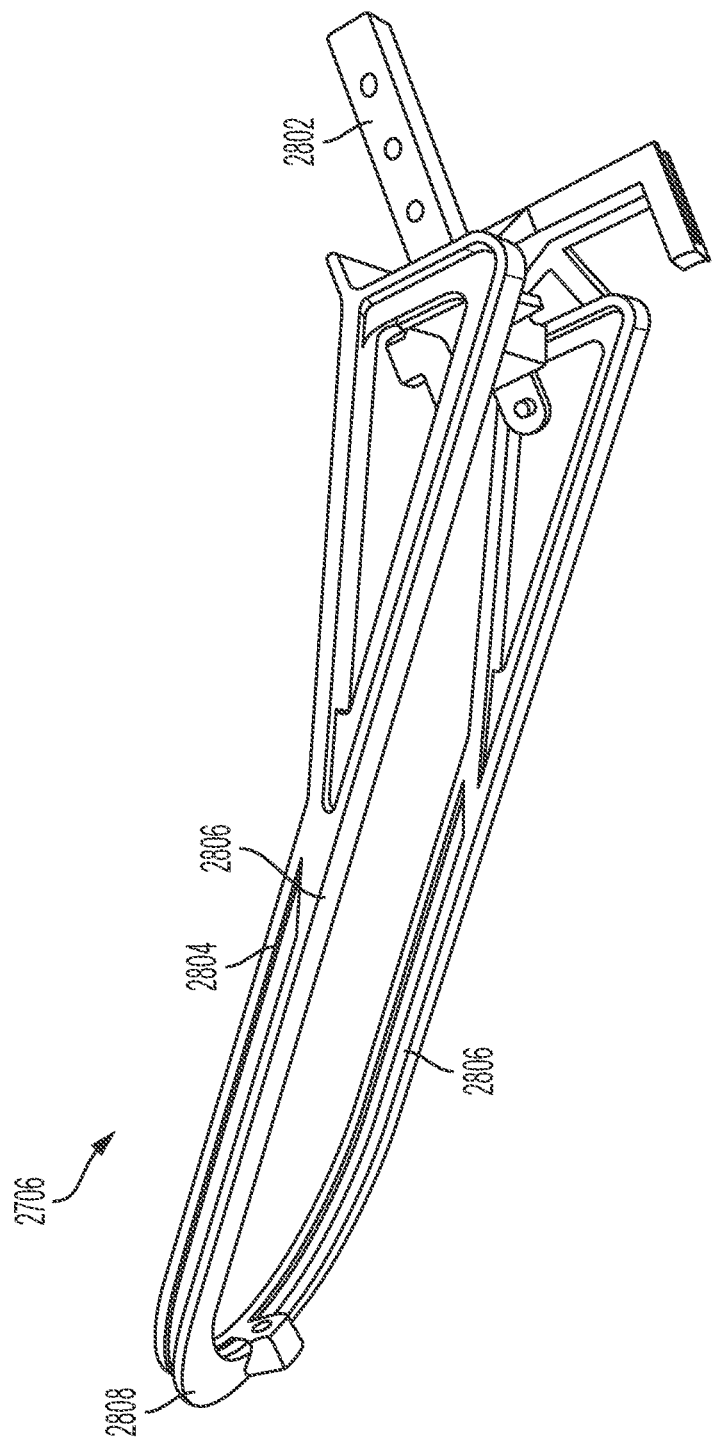
FIG. 28 is an illustration of an example second attachment feature.

Referring to FIG. 28, a second attachment feature 2706 according to some embodiments is illustrated. In these embodiments, the second attachment feature 2706 comprises an attachment portion 2802. The attachment portion 2802 may extend outwardly from a center of the second attachment feature 2706 and may be sized to fit within one of the attachment openings 700. The attachment portion 2802 may have one or more openings to allow for mechanical fasteners to pass there-through so as to attach the second attachment feature 2706 to the mount 2702.

The second attachment feature 2706 comprises an alignment structure 2804 that is attached to the attachment portion 2802. In some embodiments, attachment portion 2802 may extend along an axis, with the alignment structure 2804 extending non-parallel to the axis. In some embodiments, the alignment structure 2804 may define an angle with respect to the axis along which the attachment portion 2802 extends. The angle may be, for example, between about 30 degrees to about 60 degrees. In some embodiments, the alignment structure 2804 may comprise a pair of elongated arms 2806 that extend substantially parallel to each other, and may be attached to each other by a connection portion 2808. As will be explained above with other embodiments of the second attachment feature, the alignment structure 2804 may assist in aligning the clamp 108 to the line 110.

Figure 29:
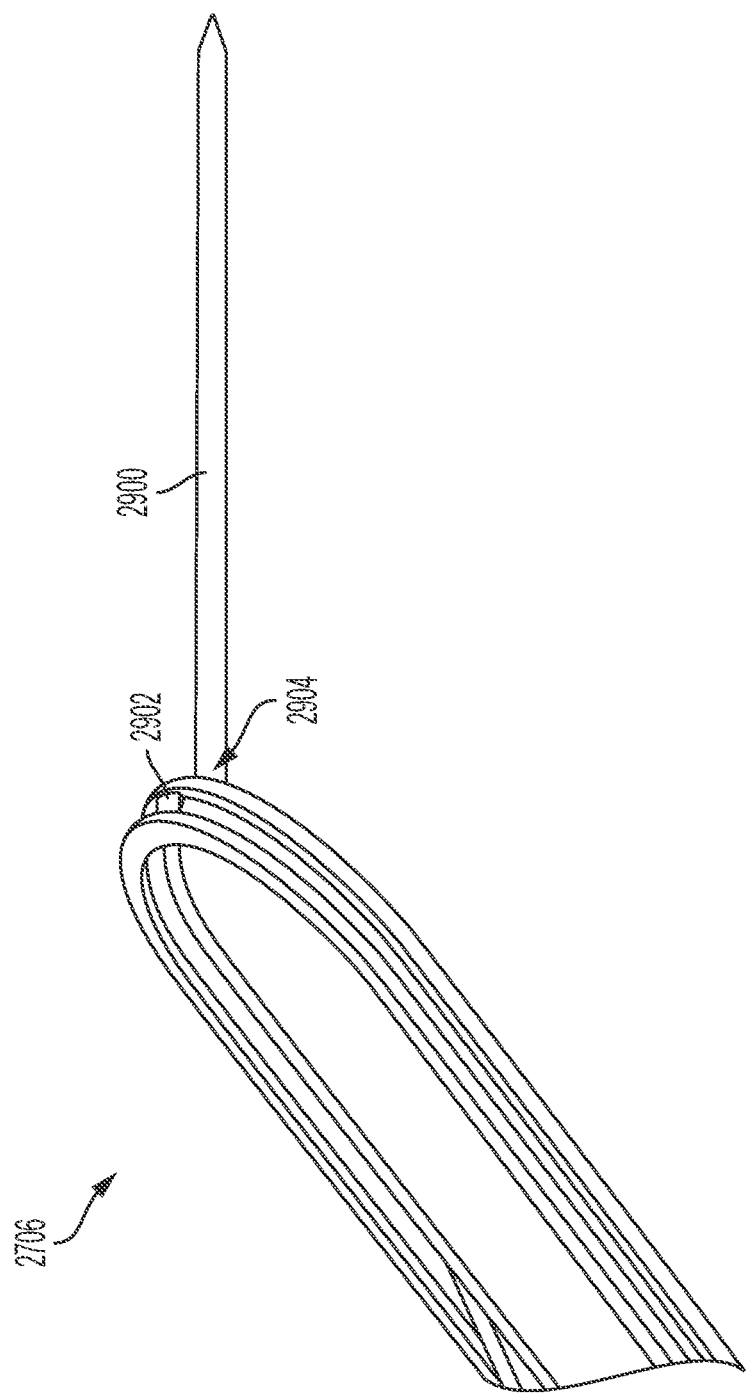
FIG. 29 is an illustration of an example second attachment feature.

Referring to FIG. 29, in some embodiments, the second attachment feature 2706 can include a guide structure 2900. In some embodiments, the guide structure 2900 may be attached to the connection portion 2808 of the second attachment feature 2706. The connection portion 2808 may comprise a wall 2902 that defines a guide opening 2904 into which the guide structure 2900 may be received. In this way, the guide structure 2900 may extend along an axis outwardly from the second attachment feature 2706. The guide structure 2900 may assist a drone operator who is operating the UAV 100 to provide a point of reference relative to the UAV 100 and the line 110. In some embodiments, the guide structure 2900 can include a ball at a distal end of the guide structure 2900.

Figure 30:
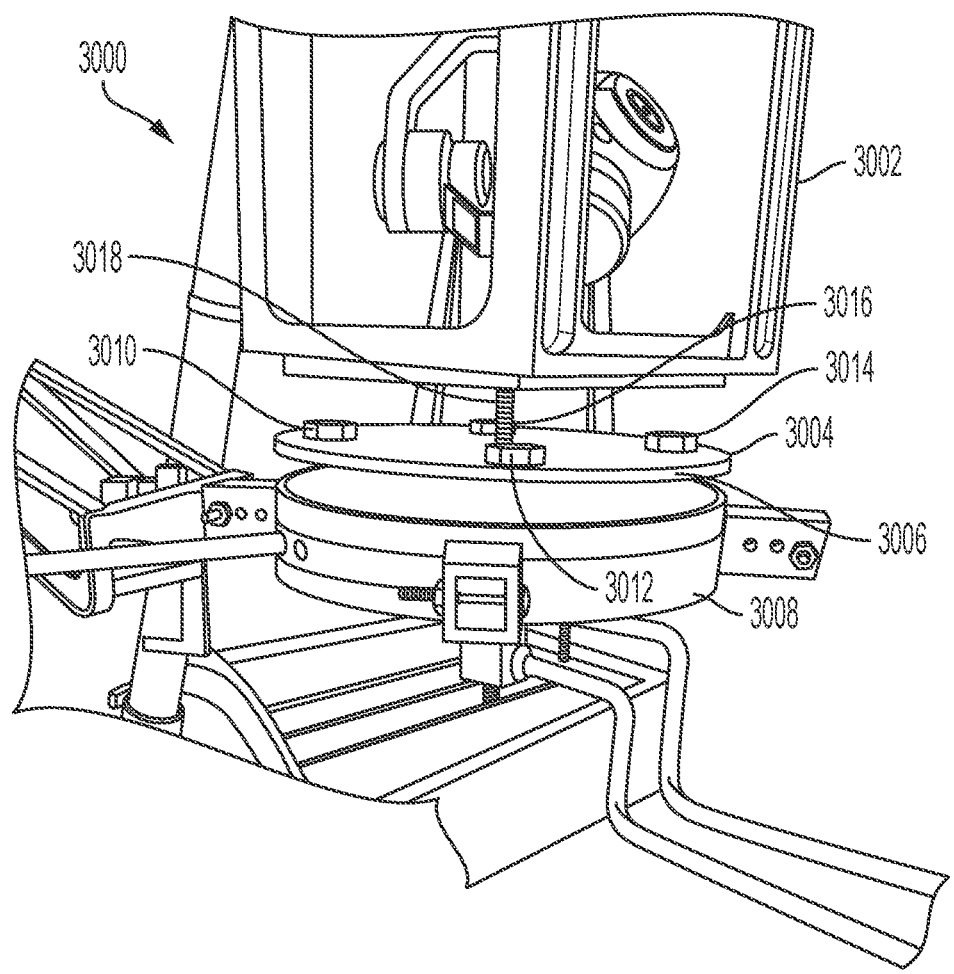
FIG. 30 is an illustration of an example mounting assembly.

Referring to FIG. 30, a guide 3000 according to some embodiments is illustrated. The guide 3000 comprises a mount 3002 and a rotation device 3004. The rotation device 3004 is configured to attach several second attachment features 2706 and is configured to rotate to present each second attachment feature 2706 sequentially to a line 110 in order to mount the clamp 108 to the line 110.

The rotation device 3004 comprises a cover 3006 and a base 3008. In some embodiments, the cover 3006 may be attached to the base 3008, with the base 3008 being movable relative to the cover 3006. The cover 3006 may have a top side and a bottom side. In some embodiments, the top side may face the UAV 100 while the bottom side may face the base 3008.

In some embodiments, the top side of the cover 3006 may comprise one or more attachment structures that assist in attaching the cover 3006 to the UAV 100. For example, the cover 3006 may comprise a first attachment structure 3010, a second attachment structure 3012, a third attachment structure 3014, and a fourth attachment structure 3016. In some embodiments, the first attachment structure 3010, the second attachment structure 3012, the third attachment structure 3014, and the fourth attachment structure 3016 may extend outwardly from the top side of the cover 3006. In this way, top surfaces of the first attachment structure 3010, the second attachment structure 3012, the third attachment structure 3014, and the fourth attachment structure 3016 may define a first plane, while remaining portions of the cover 3006 may define a second plane that is non-coplanar (e.g., offset) with respect to the first plane. It is to be appreciated that a bottom side of the UAV 100 may comprise one or more recesses that are sized and/or shaped to receive the first attachment structure 3010, the second attachment structure 3012, the third attachment structure 3014, and the fourth attachment structure 3016.

The cover 3006 may receive a fastener 3018 (e.g., a threaded fastener) through the cover opening defined by the cover 3006 so as to attach the cover 3006 to the UAV 100.

Figure 31:
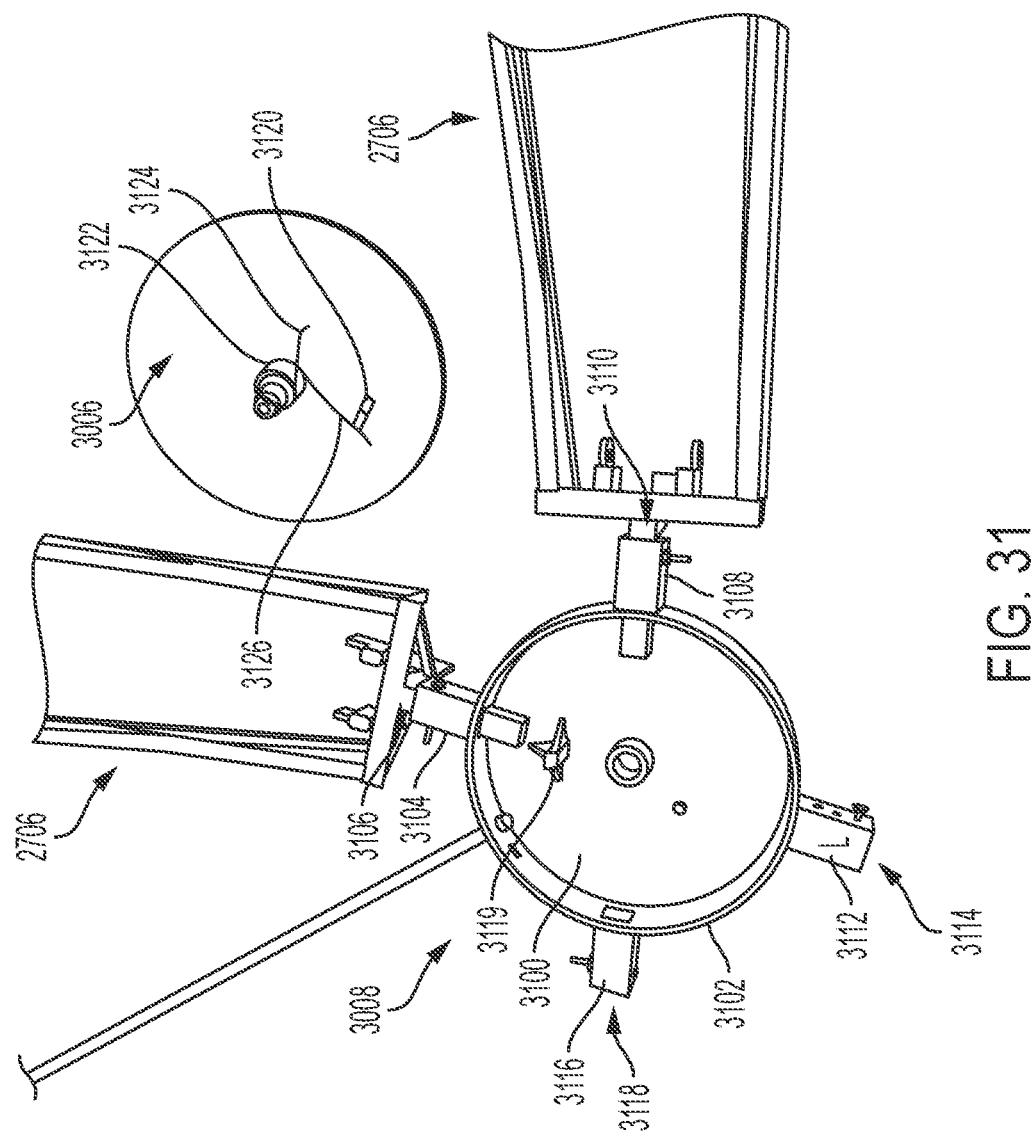
FIG. 31 is an illustration of an example mounting assembly.

Referring to FIG. 31, the base 3008 according to some embodiments is illustrated. In some embodiments, the base 3008 comprises a base wall 3100 that is surrounded by a surrounding wall 3102. The cover 3006 may be attached to the surrounding wall 3102 so as to define a gap, a space, a recess, or the like between the cover 3006 and the base wall 3100. In some embodiments, the base wall 3100 may have a substantially rounded shape, though other shapes (e.g., square, etc.) are envisioned.

In some embodiments, the base 3008 comprises one or more walls that define attachment openings. For example, the base 3008 may comprise a first wall 3104 that defines a first attachment opening 3106, a second wall 3108 that defines a second attachment opening 3110, a third wall 3112 that defines a third attachment opening 3114, and a fourth wall 3116 that defines a fourth attachment opening 3118. In some embodiments, the first wall 3104, the second wall 3108, the third wall 3112, and the fourth wall 3116 may project outwardly from the surrounding wall 3102. In this way, ends of the first wall 3104, the second wall 3108, the third wall 3112, and the fourth wall 3116 may be spaced a distance apart from the surrounding wall 3102. In some embodiments, the first wall 3104, the second wall 3108, the third wall 3112, and the fourth wall 3116 may be spaced apart between about 80 degrees to about 100 degrees about the surrounding wall 3102. For example, the first wall 3104, the second wall 3108, the third wall 3112, and the fourth wall 3116 may be spaced apart about 90 degrees from one another. However, in other examples, such a spacing may be different than as illustrated herein.

In some embodiments, the second attachment feature 2706 may be attached to the base 3008. For example, the second attachment feature 2706 may be received within one of the attachment openings 700 in a as described herein with respect to FIG. 7. In this way, the base 3008 may receive a plurality of second attachment features 2706, such as a second attachment feature 2706 within each of the first attachment opening 232, the second attachment opening 234, the third attachment opening 236, and/or the fourth attachment opening 238 (collectively attachment openings 700).

Remaining with FIG. 31, the base 3008 may comprise a first stopper 3119 while the cover 3006 may comprise a second stopper 3120. In some embodiments, the first stopper 3119 comprises a projection, protuberance, or other structure formed along an interior wall of the base 3008. The second stopper 3120 may comprise a projection, protuberance, or other structure formed along an interior wall of the cover 3006. In some embodiments, the first stopper 3119 and the second stopper 3120 may face each other when the cover 3006 is attached to the base 3008.

In some embodiments, a biasing device 3122 may comprise a first biasing end 3124 and a second biasing end 3126. The first biasing end 3124 and the second biasing end 3126 may project outwardly from an axis (e.g. central axis 206) along which the biasing device 3122 extends. That is, in some embodiments, the biasing device 3122 may define an opening that extends along an axis, with the first biasing end 3124 and the second biasing end 3126 extending perpendicular to the axis.

When the cover 3006 is attached to the base 3008, the first biasing end 3124 of the biasing device 3122 may engage the first stopper 3119 while the second biasing end 3126 of the biasing device 3122 may engage the second stopper 3120. For example, a protrusion end of a protrusion may be received within an opening 3128 defined within the base 3008. In this way, due to the cover 3006 being attached to and non-movable relative to the UAV 100, the biasing device 3122 may cause the base 3008 to move relative to the cover 3006. For example, with the first biasing end 3124 of the biasing device 3122 engaging the first stopper 3119 and the second biasing end 3126 of the biasing device 3122 engaging the second stopper 3120, the biasing device 3122 may apply a biasing force to the base 3008 to cause the base 3008 to rotate relative to the cover 3006.

In some embodiments, a push mechanism (not shown) may be attached to a bottom side of the base 3008. The push mechanism may project outwardly from a perimeter of the base 3008, and may be fixedly attached to the fastener. In some embodiments, the biasing device 3122 may cause the base 3008 to move relative to the cover 3006. In operation, the base 3008 may be limited from further movement due to the clamps 108 contacting the push mechanism. Once a clamp 108 has been attached to the line 110, the force applied by the biasing device 3122 to the base 3008 may cause further rotation of the base 3008, at least until the next clamp 108 contacts the push mechanism. In this way, the base 3008 and the cover 3006 may provide an auto-indexing feature for attaching clamps 108 to one or more lines 110.

Figure 32:
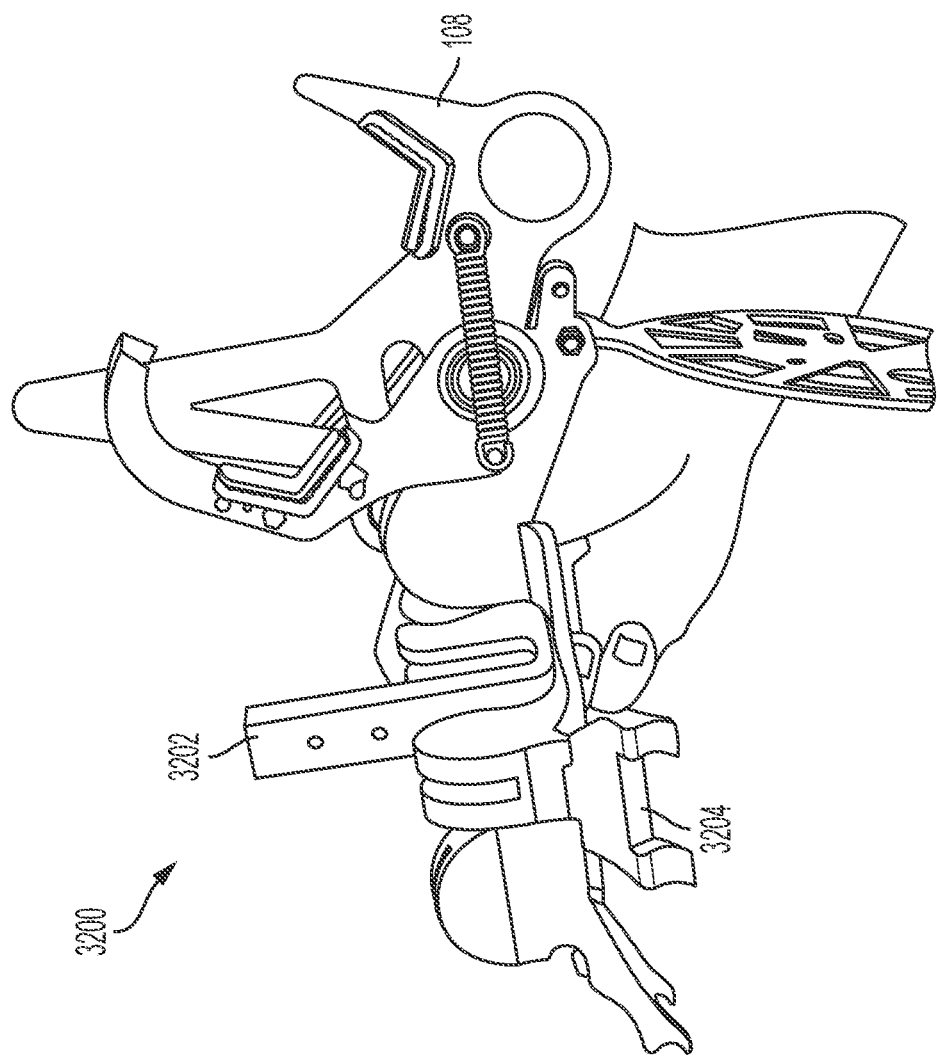
FIG. 32 is an illustration of an example clamp.

Referring to FIG. 32, a guide 3200 according to some embodiments is illustrated. In some embodiments, the guide 3200 comprises a first attachment portion 3202 and a second attachment portion 3204. A clamp 108 may be received by the first attachment portion 3202 and the second attachment portion 3204. In some embodiments, the guide 3200 is configured to receive a plurality of clamps 108, such as four clamps, for example.

Figure 33:
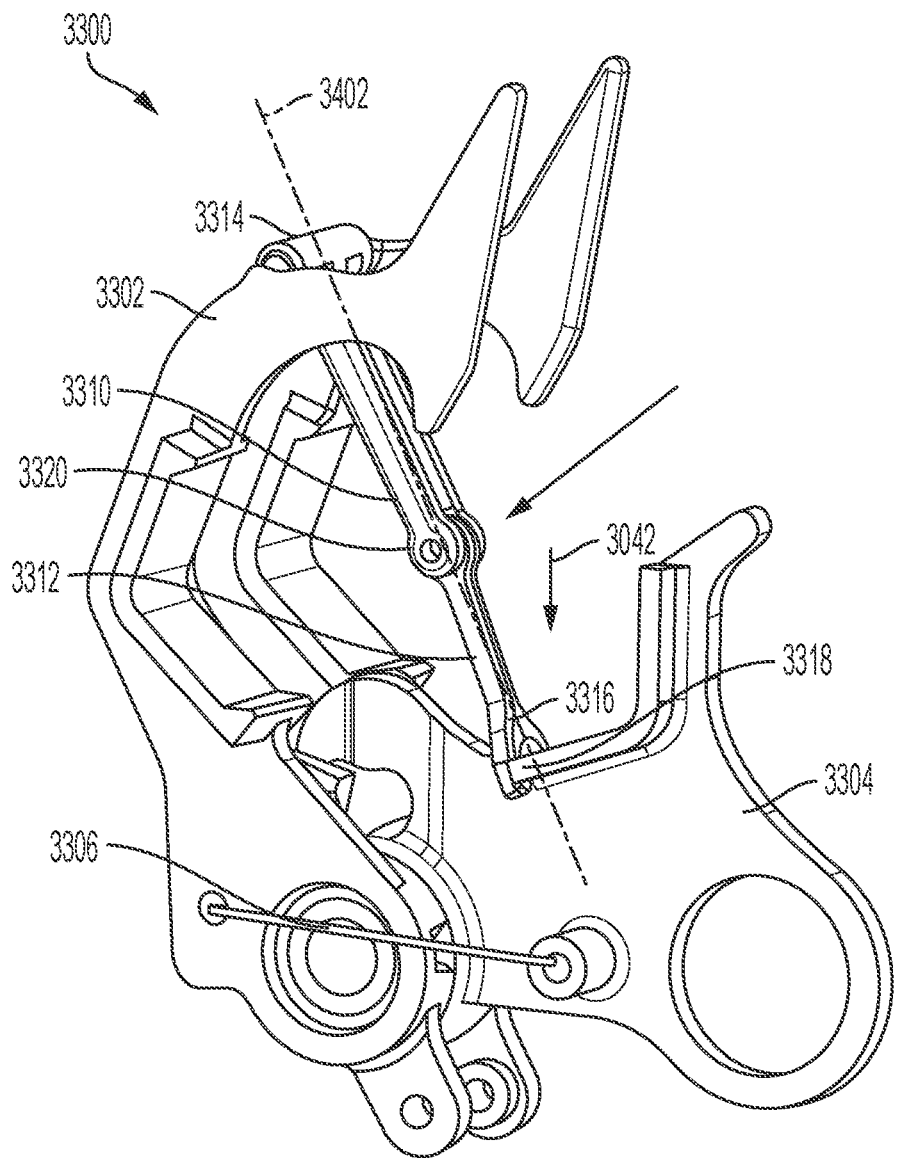
FIG. 33 is an illustration of an example clamp.
Figure 34:
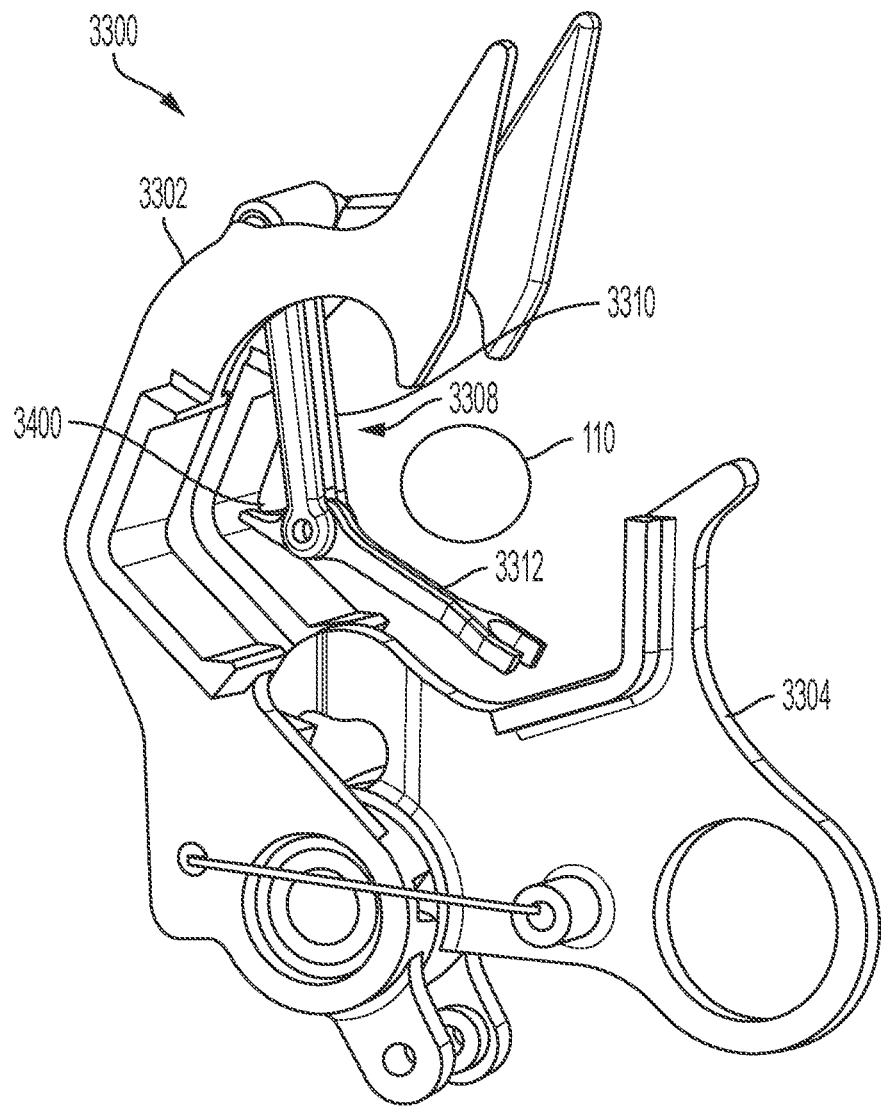
FIG. 34 is an illustration of an example clamp.

Referring to FIGS. 33 and 34, a clamp 3300 is illustrated according to some embodiments. In some embodiments, the clamp 3300 can include a first jaw 3302, a second jaw 3304, a biasing member 3306, and an arresting member 3308, etc. In some embodiments, the arresting member 3308 comprises a first arresting portion 3310 and a second arresting portion 3312. The first arresting portion 3310 may have a first end 3314 that is pivotably attached to the first jaw 3302. The second arresting portion 3312 may have a first ledge 3316 that engages a second ledge 3318 of the second jaw 3304, similar to previously described embodiments. In some embodiments, the first arresting portion 3310 and the second arresting portion 3312 may be attached by an arresting pivot 3320. In this way, the first arresting portion 3310 and the second arresting portion 3312 may pivot relative to each other about the arresting pivot 3320.

As illustrated in FIG. 34, the second arresting portion 3312 comprises a stop member 3400. The stop member 3400 may selectively abut the first arresting portion 3310. In some embodiments, the arresting member 3308 is movable between an extended position (e.g., as illustrated in FIG. 33) in which the first arresting portion 3310 and the second arresting portion 3312 extend along an axis 3402, and a folded position (e.g. as illustrated in FIG. 34) in which the first arresting portion 3310 and the second arresting portion 3312 extend non-linearly with respect to each other. In some embodiments, when the first arresting portion 3310 and the second arresting portion 3312 are in the extended position, the stop member 3400 may limit the arresting member 3308 from moving to the folded position by abutting the first arresting portion 3310.

In operation, the arresting member 3308 may maintain the first jaw 3302 and the second jaw 3304 in the opened position when the arresting member 3308 is in the extended position. When the line 110 contacts the arresting member 3308, the first arresting portion 3310 and the second arresting portion 3312 may pivot from the extended position to the folded position (e.g., as illustrated in FIG. 34). With the arresting member 3308 in the folded position, the biasing member 3306 may move the clamp 3300 from the opened position to the closed position.

Figure 35:
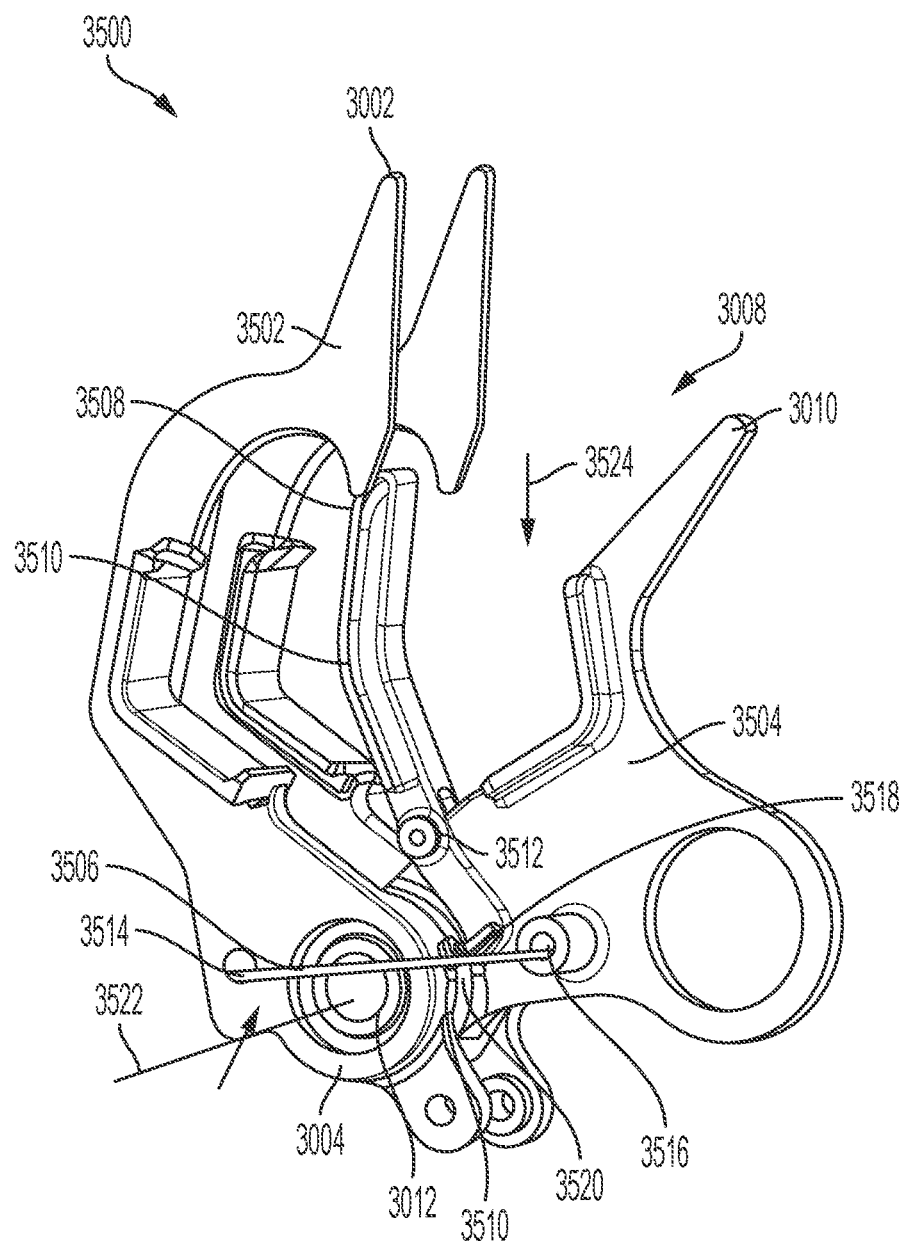
FIG. 35 is an illustration of an example clamp.

Referring to FIG. 35, some embodiments of the clamp 3500 is illustrated. In some embodiments, the clamp 3500 may comprise a first jaw 3502, a second jaw 3504, a biasing member 3506, and an arresting member 3508. In some embodiments, the arresting member 3508 may extend non-linearly between opposing ends. For example, a center portion 3510 of the arresting member 3508 may form an angle.

The arresting member 3508 may be pivotably attached to the second jaw 3504 at the attachment location 3512. In some embodiments, the arresting member 3508 may be attached to the second jaw 3504 at a location that is between a first end 3514 and a second end 3516 of the arresting member 3508. For example, a location towards a center 3510 of the arresting member 3508 may be pivotably attached to the second jaw 3504, such that the arresting member 3508 may pivot relative to the second jaw 3504.

In some embodiments, the arresting member 3508 includes a first ledge 3518. The first ledge 3518 may comprise a protuberance, an outcropping, or the like. The first ledge 3518 may engage a second ledge 3520 that is defined in the first jaw 3502. For example, the first jaw 3502 may define an opening in which the second ledge 3520 may be formed. In some embodiments, the second ledge 3520 may be formed adjacent to an axis 3522. In such some embodiments, the axis 3522 and the second ledge 3520 may be located on a same side (e.g., below) the location of the pivotable attachment between the arresting member 3508 and the second jaw 3504. In some embodiments, the second ledge 3520 may comprise a shelf, an outcropping, or the like.

In operation, the first ledge 3518 of the arresting member 3508 may rest upon the second ledge 3520 of the first jaw 3502 when the clamp 3500 is in the opened position (e.g., as illustrated in FIG. 35). In the opened position, the biasing member 3506 may exert a closing force 3524 on the first jaw 3502 and the second jaw 3504 to bias the clamp 3500 towards the closed position. When the arresting member 3508 is in contact with the second jaw 3504 (e.g., by virtue of the first ledge 3518 resting upon the second ledge 3520), the arresting member 3508 may maintain the clamp 3500 in the opened position, with the first jaw 3502 and the second jaw 3504 spaced apart.

Figure 36:
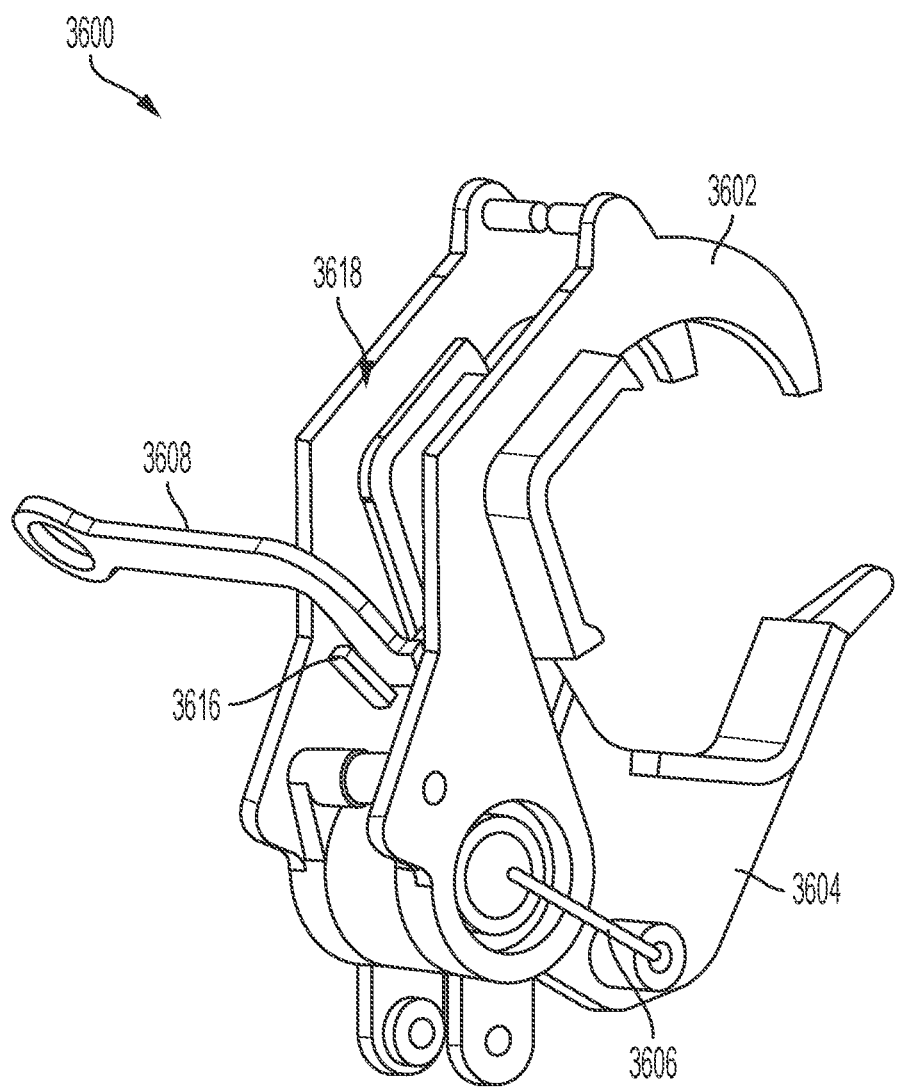
FIG. 36 is an illustration of an example clamp.

Referring to FIG. 36, a clamp 3600 according to some embodiments is illustrated. In some embodiments, the clamp 3600 can include a first jaw 3602, a second jaw 3604, a biasing member 3606, and an arresting member 3608. In some embodiments, the arresting member 3608 may be disposed at a rear of the first jaw 3602.

In some embodiments, the arresting member 3608 may be removably attached to the first jaw 3602 at the attachment location 3610. The arresting member 3608 can extend between a first end 3612 and a second end 3614. The first end 3612 may be removably attached to the first jaw 3602. For example, the first jaw 3602 may define a second ledge 3616 that is formed between the walls that define a slot 3618. The first end 3612 of the arresting member 3608 may engage and rest upon the second ledge 3616. In some embodiments, the second jaw 3604 comprises a stopper 3620. The stopper 3620 may be positioned within the slot 3618. The arresting member 3608 may initially be inserted within the slot 3618 so as to rest upon the second ledge 3616. Opposite the second ledge 3616, the stopper 3620 may contact and engage the arresting member 3608. In this way, the second ledge 3616 may be disposed on a first side 3622 of the arresting member 3608 while the stopper 3620 may be disposed on an opposing second side of the arresting member 3608.

In operation, the arresting member 3608 may rest upon the second ledge 3616 of the first jaw 3602 when the clamp 3600 is in the opened position (e.g., as illustrated). In the opened position, the biasing member 3606 may exert a closing force 3624 on the first jaw 3602 and the second jaw 3604 to bias the clamp 3600 towards the closed position. When the arresting member 3608 is in contact with the stopper 3620, the arresting member 3608 may maintain the clamp 3600 in the opened position, with the first jaw 3602 and the second jaw 3604 spaced apart.

The arresting member 3608 may be moved in a direction away from the clamp 3600 such that the arresting member 3608 may be removed from the second ledge 3616. As the arresting member 3608 is removed from the second ledge 3616, the stopper 3620 may no longer contact and/or engage the arresting member 3608. In this way, the arresting member 3608 may not maintain the first jaw 3602 and the second jaw 3604 in the opened position. Rather, the force of the biasing member 3606 may cause the first jaw 3602 and the second jaw 3604 to move towards each other into the closed position. In this way, the line 110 may be gripped between the first jaw 3602 and the second jaw 3604.

Figure 37:
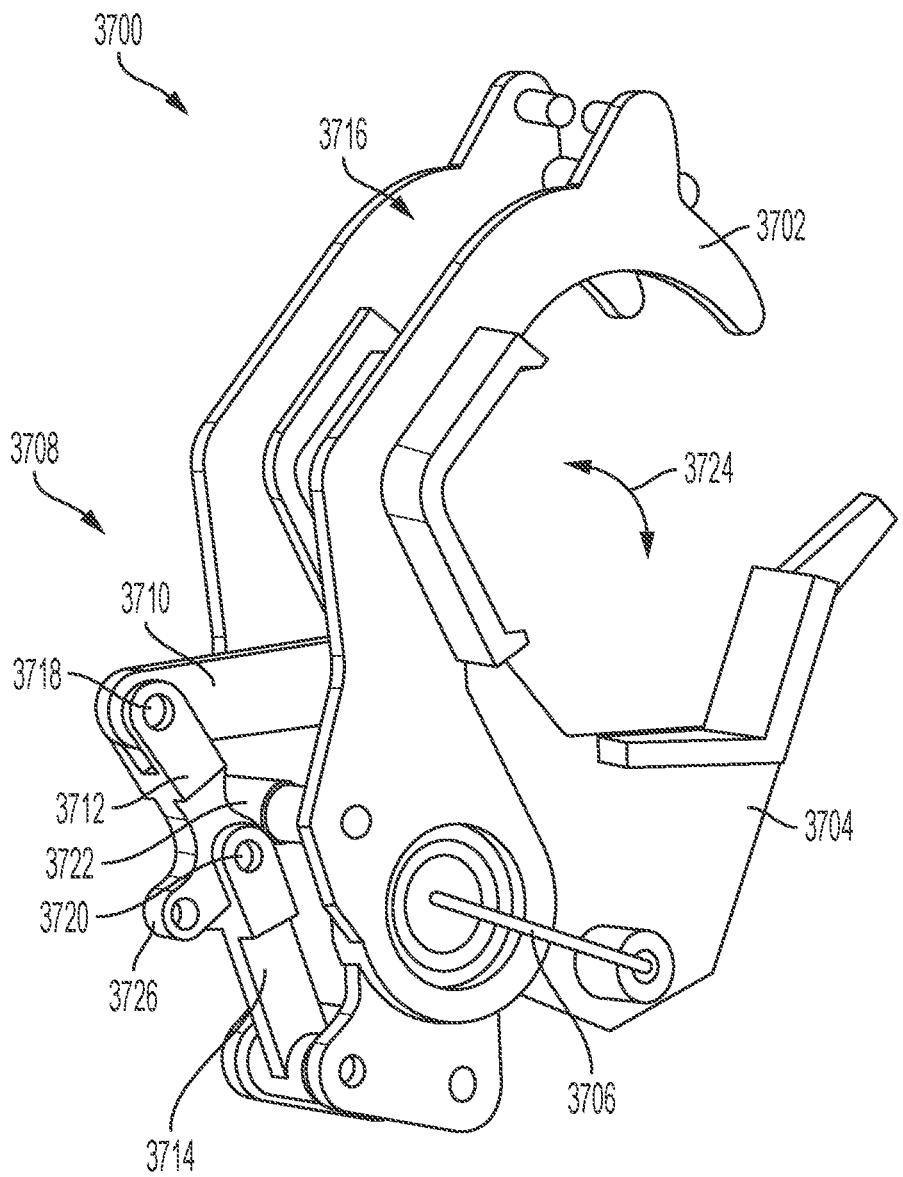
FIG. 37 is an illustration of an example clamp.

Referring to FIG. 37, a clamp 3700 according to some embodiments is illustrated. The clamp 3700 can include a first jaw 3702, a second jaw 3704, a biasing member 3706, and an arresting member 3708. In some embodiments, the arresting member 3708 may be disposed at a rear of the first jaw 3702.

In some embodiments, the arresting member 3708 comprises one or more arresting arms. For example, the arresting member 3708 comprises a first arresting arm 3710, a second arresting arm 3712, and a third arresting arm 3714. The first arresting arm 3710 may extend from a rear of the second jaw 3704 and through a slot 3716 defined by the first jaw 3702. In some embodiments, the second arresting arm 3712 may be pivotably attached to the first arresting arm 3710 at a first pivot attachment 3718. In this way, the first arresting arm 3710 and the second arresting arm 3712 may pivot relative to each other. In some embodiments, the arresting member 3708 includes the third arresting arm 3714 that is pivotably attached to the second arresting arm 3712 at a second pivot attachment 3720. In this way, the second arresting arm 3712 and the third arresting arm 3714 may pivot relative to each other. Opposite the second pivot attachment 3720, the third arresting arm 3714 may be attached to the first jaw 3702.

In some embodiments, the first jaw 3702 comprises a stopper 3722 that extends between the walls that define the slot 3716. The second arresting arm 3712 and/or the third arresting arm 3714 may abut and/or contact the stopper 3722.

In operation the second arresting arm 3712 and the third arresting arm 3714 may pivot towards the stopper 3722 so as to contact the stopper 3722 adjacent to the second pivot attachment 3720. In the opened position, the biasing member 3706 may exert a closing force 3724 on the first jaw 3702 and the second jaw 3704 to bias the clamp 3700 towards the closed position. When the second arresting arm 3712 and the third arresting arm 3714 are in contact with the stopper 3722, the first arresting arm 3710 is limited from pivoting downwardly towards the third arresting arm 3714. In this way, when the arresting member 3708 abuts and/or contacts the stopper 3722, the arresting member 3708 may maintain the clamp 3700 in the opened position, with the first jaw 3702 and the second jaw 3704 spaced apart.

In some embodiments, to move the clamp 3700 from the opened position toward the closed position, the arresting member 3708 may be moved in a direction away from the stopper 3722. For example, the second arresting arm 3712 may comprise a gripping location 3726 that is adjacent to the second pivot attachment 3720. A force may be applied to the gripping location 3726 to move the second arresting arm 3712 away from the stopper 3722. In turn, the third arresting arm 3714 may likewise move away from the stopper 3722. With the second arresting arm 3712 and the third arresting arm 3714 moving away from the stopper, the first arresting arm 3710 may move towards the third arresting arm 3714 (e.g., downwardly). In this way, the arresting member 3708 may not maintain the first jaw 3702 and the second jaw 3704 in the opened position. Rather, the force of the biasing member 3706 may cause the first jaw 3702 and the second jaw 3704 to move towards each other into the closed position. In this way, the line 110 may be gripped between the first jaw 3702 and the second jaw 3704.

Figure 38:
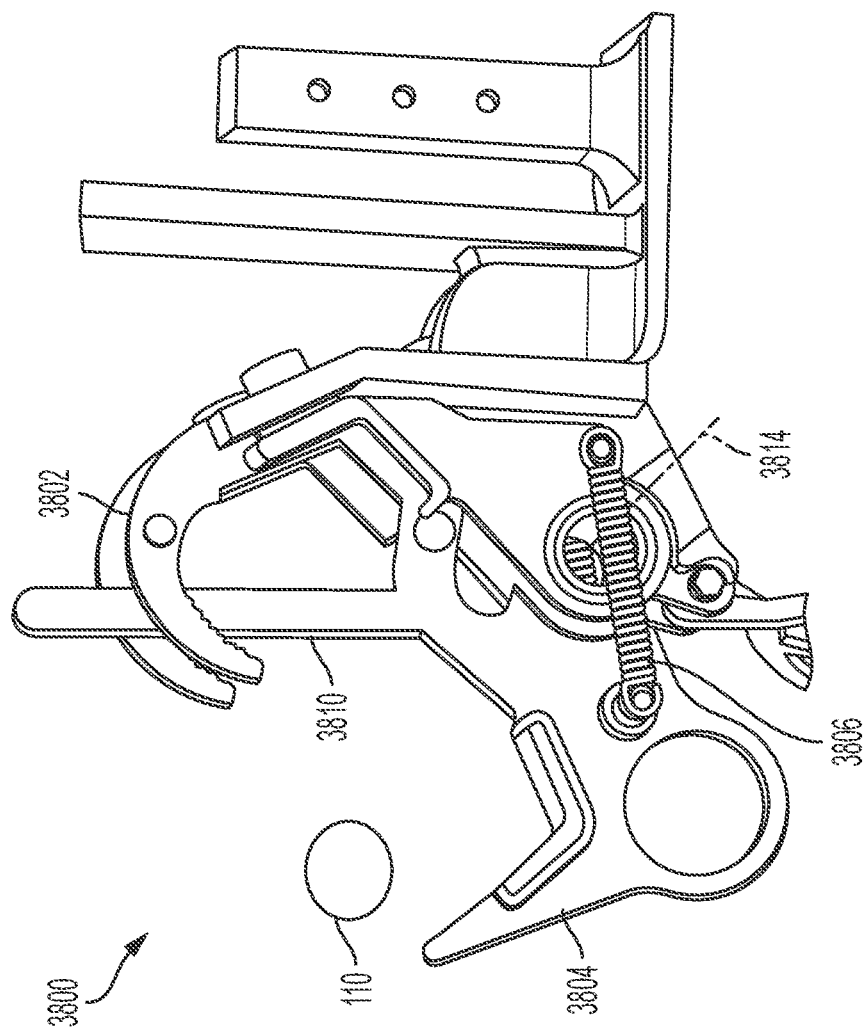
FIG. 38 is an illustration of an example clamp.

Referring to FIG. 38, a clamp 3800 according to some embodiments is illustrated. The clamp 3800 can include a first jaw 3802, a second jaw 3804, and a biasing member 3806. In some embodiments, the clamp 3800 may not include an arresting member. Rather, the position of the biasing member 3806 may maintain the clamp 3800 in an opened position versus a closed position.

For example, in the opened position, as illustrated in FIG. 38, the biasing member 3806 may be located on a side of the axis 3814, such as by being located below the axis 3814. In this way, the biasing member 3806 may apply a force to the first jaw 3802 and the second jaw 3804. However, due to the biasing member 3806 being located below the axis 3814, the first jaw 3802 and the second jaw 3804 may remain in the opened position. In other words, the biasing member 3806 is urging the first jaw 3802 and the second jaw 3804 to the opened position because the clamp 3800 is in an over-center position.

In some embodiments, to move the clamp 3800 from the opened position towards the closed position, the clamp 3800 may be moved into proximity to the line 110. As the line 110 moves towards the clamp 3800, the line 110 may contact a jaw wall 3810 of the second jaw 3804. Contact between the line 110 and the jaw wall 3810 of the second jaw 3804 may provide a sufficient amount of force for the second jaw 3804 to overcome the biasing force of the biasing member 3806. In turn, the second jaw 3804 may begin to rotate relative to the first jaw 3802. This rotation may allow for the biasing member 3806 to move upwards such that, the biasing member 3806 may be located on an opposite side of the axis 3814 (e.g., above the axis). In this way, the biasing member 3806 may no longer maintain the first jaw 3802 and the second jaw 3804 in the opened position. Rather, the force of the biasing member 3806 may cause the first jaw 3802 and the second jaw 3804 to move towards each other into the closed position. In this way, the line 110 may be gripped between the first jaw 3802 and the second jaw 3804.

Figure 39:
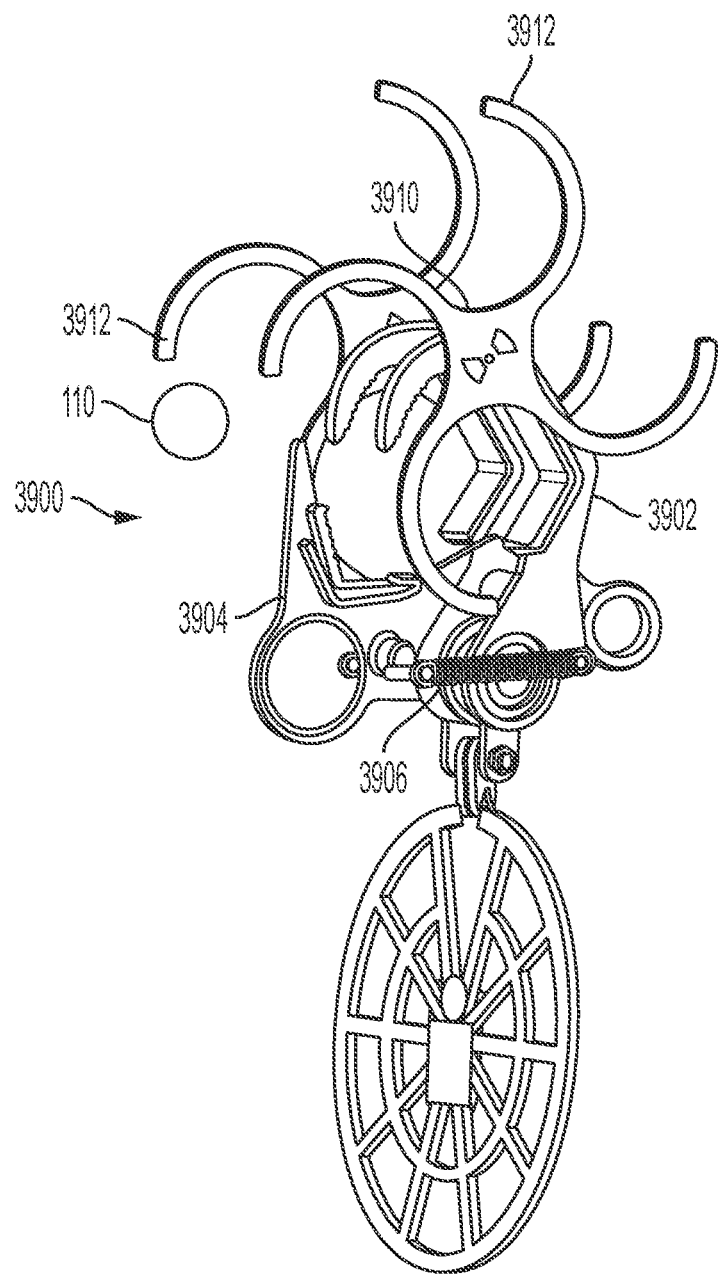
FIG. 39 is an illustration of an example clamp.

Referring to FIG. 39, a clamp 3900 according to some embodiments is illustrated. The clamp 3900 can include a first jaw 3902, a second jaw 3904, and a biasing member 3906. The illustrated clamp of FIG. 39 is similar to the clamp 3800 of FIG. 38. However, in some embodiments, the clamp 3900 can include a disengagement structure, such as a wheel 3910. The wheel 3910 may be rotatably attached to the first jaw 3902. In some embodiments, when the clamp 3900 moves into proximity with the line 110, the line 110 may engage a leg 3912 of the wheel 3910. Such an engagement may cause the wheel 3910 to rotate. As the wheel 3910 rotates, one or more legs 3912 of the wheel 3910 may contact a mounting structure (not shown) to which the clamp 3900 is mounted. This contact may assist in releasing the clamp 3900 from the mounting structure.

Figure 40:
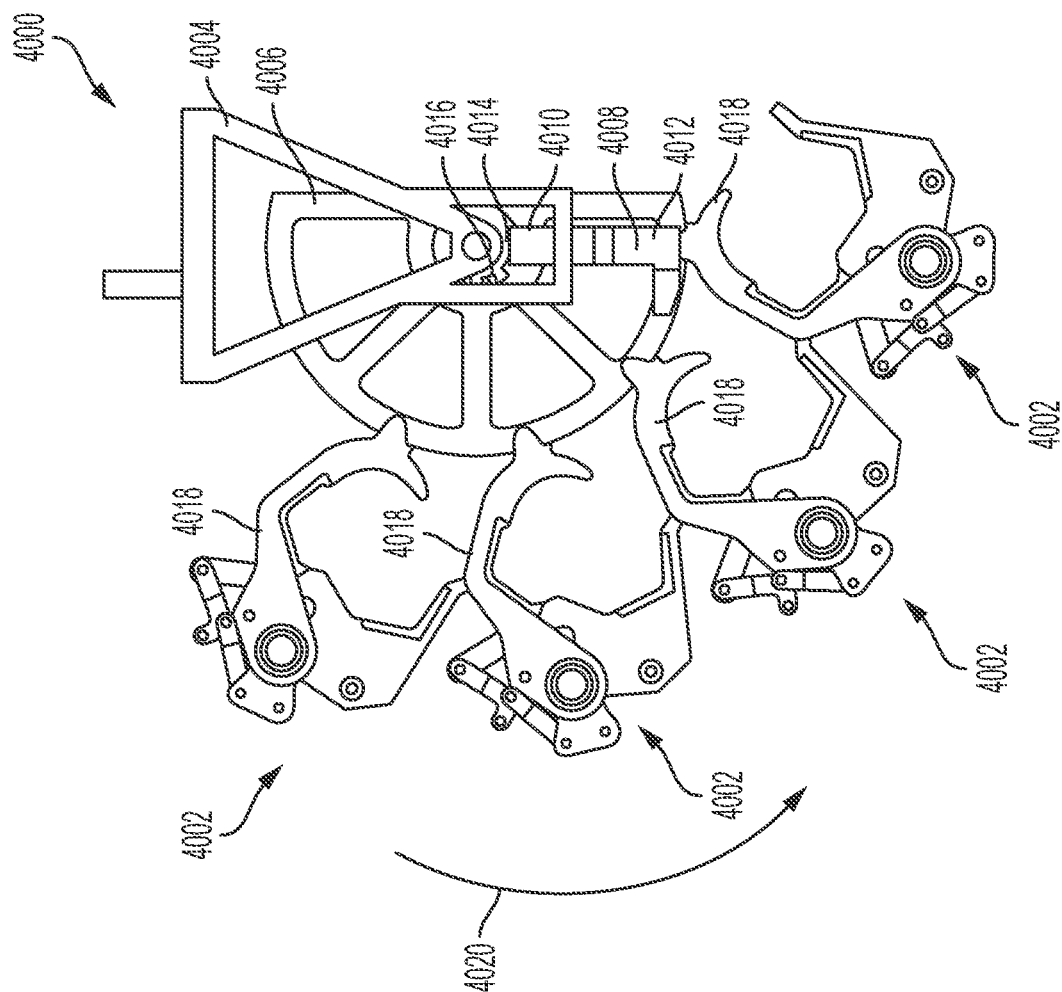
FIG. 40 is an illustration of an example clamp mounting assembly.

Referring to FIG. 40, some embodiments mounting structure 4000 is illustrated for mounting the clamps 4002 to a line 110. In some embodiments, one or more of the clamps that have been described herein may be used in association with the mounting structure 4000. The mounting structure 4000 may comprise a base 4004 and a wheel 4006. In some embodiments, the base 4004 may be attached to the UAV 100, while the wheel 4006 may be attached to the base 4004. In some embodiments, the mounting structure 4000 comprises a mounting arm 4008 that is movable relative to the wheel 4006.

The mounting arm 4008 may extend between a gear end 4010 and an engagement end 4012. In some embodiments, the gear end 4010 may be located in proximity to a center of the wheel 4006 while the engagement end 4012 may be located towards a perimeter of the wheel 4006. The gear end 4010 may comprise a stopper 4014 for engaging with gears 4016 of the wheel 4006. In some embodiments, the gears 4016 define one or more slots, openings, or the like that are formed in a portion of the wheel 4006. In some embodiments, the mounting arm 4008 may normally be biased to a position in which the engagement end 4012 is in contact with the wheel 4006 and the gear end 4010 is located a distance away from the gears 4016. Due to the force of gravity (e.g., from the clamps 4002 being supported on a perimeter of the wheel 4006), the wheel 4006 may pivot downwardly as represented by arrow 4020. As the wheel 4006 rotates, the engagement end 4012 may receive a portion of the clamp 4002, such as a wall 4018. In this way, a wall of the clamp 4002 may be positioned between the engagement end of the mounting arm 4008 and the wheel 4006. The outwardly flared shape of the engagement end 4012 may further facilitate receiving a portion of the clamp 4002.

As the portion of the clamp 4002 is received by the engagement end 4012, the gear end 4010 of the mounting arm 4008 may move into engagement with the gears 4016. That is, the stopper 4014 of the mounting arm 4008 may pivot so as to be received within one of the gear openings of the gear 4016. With the stopper 4014 in place, the wheel 4006 is substantially limited from inadvertently rotating. However, once a clamp 4002 has received a line and the clamp is disengaged from the wheel 4006, the wheel 4006 may rotate, thus positioning the next clamp 4002 in place relative to the line 110.

Figure 41:
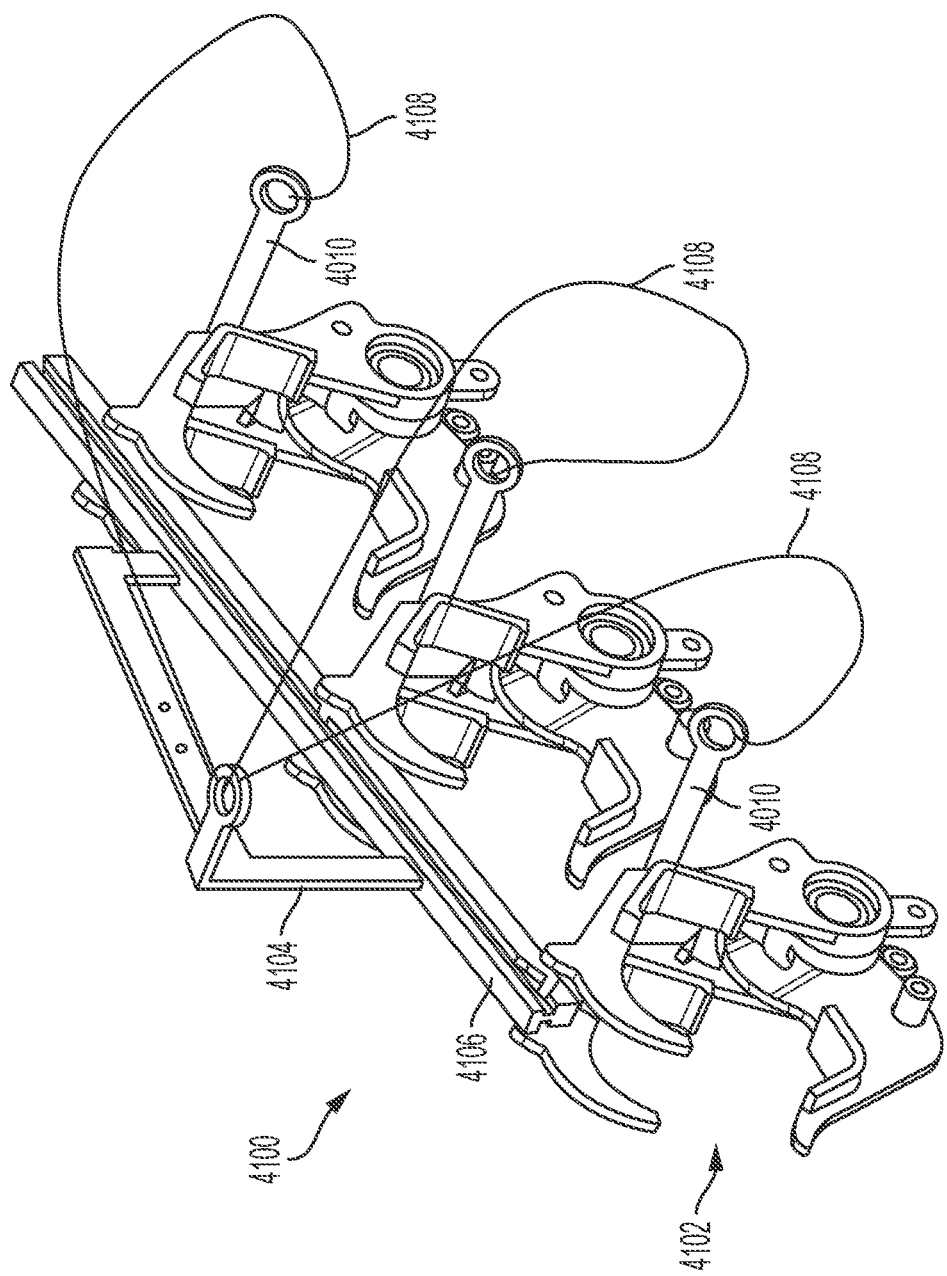
FIG. 41 is an illustration of an example clamp mounting assembly.

Referring to FIG. 41, a mounting structure 4100 according to some embodiments is illustrated for mounting a set of clamps 4102 to a line 110. In some embodiments, one or more of the clamps that have been described herein may be used in association with the mounting structure 4100. The mounting structure 4100 may comprise a frame 4104 and a clamp holder 4106. In some embodiments, one or more of the clamps 4102 may be attached to the clamp holder 4106. The frame 4104 may be attached to the UAV 100, such that the clamps 4102 may be transported towards the line 110. In some embodiments, the mounting structure 4100 comprises a wire 4108 that may be attached to the frame 4104 and to a triggering mechanism 4110 of the clamps 4102. In this way, one of the clamps 4102 may be attached to a line 110. As the UAV 100 is flying away, the wire 4108 may cause the triggering mechanism 4110 to disengage from the clamp 4102 and, thus, cause the clamp 4102 to move from the opened position to the closed position. In this way, the clamp 4102 may be attached to the line 110. Once one of the clamps 4102 is attached to the line 110, gravity may assist in causing the next clamp 4102 to slide down the clamp holder 4106 towards an end 4112 of the clamp holder 4106.

As described herein, the present application provides for an unmanned aerial vehicle (e.g., a drone) to maneuver a clamp from the ground to a line (e.g., overhead conductor) and mount the clamp to the line without the physical presence of a line worker near the line. To achieve this, an auto-triggering clamp is described to enable the clamp to automatically latch onto the line by using kinetic energy that has been converted from potential energy in a biasing member as the clamp triggers itself through contact with a line. A carrier system has also been developed to work with available commercial drones to enable the clamp to be carried to the line and then be released once the clamp has latched onto the line. This system may replace conventional bucket truck or helicopter installation methods.

The components of this design may comprise at least one of a drone, associated control hardware and/or software, human pilot, clamp, or a drone mounted guide. The drone pilot may mount the drone guide to the drone. Then, the pilot may install a clamp into the carrier and set a trigger so that the clamp may be ready to be installed on a line. In some embodiments, some drone guides may be capable of holding multiple clamps to help accelerate the installation process of multiple clamps (e.g., drone does not have to return to ground for every clamp). Next, the pilot may power up the drone and navigate up to the line. The pilot may then maneuver the drone so that the clamp is driven into the line which may trip the trigger and close the clamp around the line. The clamp may (e.g., nearly) simultaneously release from the guide and may remain fixed to the line while the pilot navigates the drone to the next install location. When there are no more clamps left to be installed, the pilot may land the drone and repeat the installation process until all of the clamps have been installed.

In some embodiments, wildlife strikes of powerlines have been problematic in the power-utility industry. The present disclosure relates to a device to hold a clamp and transport the clamp up to the powerline.

The cradle disclosed herein may allow a clamp to be transported and installed on a line (e.g., a powerline) via drone. Prior to this design, a way to install clamps was to either use a hot stick or to apply the clamp by hand. Both of these methods were inefficient. The cradle disclosed herein allows a worker to remain on the ground while using a drone to transport a clamp up to the line and then remotely install the clamp. However, some of the described clamps herein can be used in conjunction with a hot stick.

The present application relates to a guide, or clamp cradle, that provides the basic functions of holding a clamp securely, transporting the clamp to a desired installation location on an overhead line via drone, guiding the line into the clamp jaws, and then releasing the clamp once the clamp is fully engaged on the line. The apparatus and methods of the present application may accomplish these tasks while the operator remains on the ground.

A function of a cradle as provided herein may be to hold a clamp while the clamp is being lifted up to a line (e.g., an overhead conductor). The clamp may accomplish this by using two small ears with protruding plastic nubs. When a clamp is placed in the cradle, the nubs can have an interference fit with the clamp which may cause the cradle ears to flex outward slightly. When the nubs on the cradle ears line up with two holes that are molded into the clamp, the ears may spring back to their original position and the nubs may drop into the holes. The clamp may then be suspended on these nubs. To remove the clamp from the cradle, the ears may be sprung outward slightly to allow the nubs to come out of the holes on the clamp body. This attachment method may provide an easy, secure fit while at the same time requiring a low enough disengagement force to allow the clamp will detach from the cradle. The nubs on the ears may have an angled face on a surface that helps to lower the amount of force required to disengage the clamp from the cradle.

To provide positive disengagement, the cradle may incorporate an angled stop surface for a clamp swinging trigger. When a clamp is flown into a line and tripped, the swinging trigger on the clamp may be forced backward by an angled surface designed into a center of the clamp. As the trigger swings backward, the trigger may come into contact with the trigger stop surface designed into the cradle. This contact may force the clamp downward and the drone/cradle assembly upward. This force may be enough to overcome the disengagement force of the cradle nubs and the clamp may then positively disengage from the cradle. This disengagement force may tend to push the drone upward away from the line.

Another feature is an angled guide feature. The angled guide may help to direct a line (e.g., powerline) into the correct position to consistently trigger the clamp. The guide may allow for a greater degree of misalignment during install. For example, the line may be up to 5 inches above the clamp opening when the drone pilot begins to fly the clamp into the line. Rather than missing the clamp opening, the line may contact the guide feature and be guided into the correct position as the drone is piloted forward. The cradle may also incorporate a contact stop that supports the clamp and prevents the clamp from rotating as the line is forced against the triggering mechanism.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component correspond to component A and component B or two different or two identical components or the same component.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An unmanned aerial vehicle for mounting a clamp to a line comprising:
   a body;
   first propeller attached to the body;
   a second propeller attached to the body;
   a third propeller attached to the body, wherein:
      the body is between at least one of the first propeller and the second propeller, the first propeller and the third propeller, or the second propeller and the third propeller;
   a guide attached to the body, wherein the guide is configured to support the clamp for mounting to the line by flying the unmanned aerial vehicle toward the line, wherein the guide is configured to support the clamp such that an imaginary clamp line between a first jaw of the clamp and a second jaw of the clamp when the clamp is in an arrested position is non-parallel to a plane intersecting the first propeller, the second propeller, and the third propeller, wherein:
      the guide comprises an attachment feature configured to support the clamp;
   a rotation device configured to rotate about an axis perpendicular to the plane, wherein the attachment feature is attached to the rotation device such that rotation of the rotation device at least one of: maneuvers the clamp into a first position for mounting to the line or maneuvers a second clamp into a second position for mounting to a second line; and
   a propeller guard attached to the body and configured to inhibit the first propeller from contacting the line and to direct the clamp to the line, wherein:
      the propeller guard is below the first propeller, to an exterior side of the first propeller relative to the body, and above the first propeller.

2. The unmanned aerial vehicle of claim 1, wherein the guide comprises a quick disconnect feature that enables the rotation device to be selectively connected to the body.

3. The unmanned aerial vehicle of claim 1 comprising:
   a support structure attached to the body, wherein:
      the body has a first side and a second side;
      the support structure is attached to the first side of the body and is configured to support the unmanned aerial vehicle on a surface when the unmanned aerial vehicle is not flying; and
      the guide is attached to the first side of the body, the second side facing generally upward.

4. The unmanned aerial vehicle of claim 1, wherein the guide comprises an alignment structure configured to direct the clamp to the line for mounting the clamp to the line.

5. The unmanned aerial vehicle of claim 3, comprising a mount attached to the first side of the body, the mount configured to receive the guide to attach the guide to the body.

6. An unmanned aerial vehicle for mounting a clamp to a line comprising:
   a body;
   first propeller attached to the body;
   a second propeller attached to the body;
   a third propeller attached to the body, wherein:
      the body is between at least one of the first propeller and the second propeller, the first propeller and the third propeller, or the second propeller and the third propeller;
   a guide attached to the body, wherein the guide is configured to support the clamp for mounting to the line by flying the unmanned aerial vehicle toward the line, wherein the guide is configured to support the clamp such that an imaginary clamp line between a first jaw of the clamp and a second jaw of the clamp when the clamp is in an arrested position is non-parallel to a plane intersecting the first propeller, the second propeller, and the third propeller, wherein:
      the guide comprises an attachment feature configured to support the clamp;
   a rotation device configured to rotate about an axis perpendicular to the plane, wherein the attachment feature is attached to the rotation device such that rotation of the rotation device at least one of: maneuvers the clamp into a first position for mounting to the line or maneuvers a second clamp into a second position for mounting to a second line; and a propeller guard attached to the body and configured to inhibit the first propeller from contacting the line and to direct the clamp to the line, wherein:
the propeller guard is at an angle relative to the plane intersecting the first propeller, the second propeller, and the third propeller to direct the clamp to the line.

7. The unmanned aerial vehicle of claim 6, wherein the guide comprises a quick disconnect feature that enables the rotation device to be selectively connected to the body.

8. The unmanned aerial vehicle for mounting a clamp to a line of claim 7, wherein:
the quick disconnect includes a plug and a socket connector such that the quick disconnect does not require the use of hand tools to operate.

9. The unmanned aerial vehicle of claim 6, wherein the guide comprises an alignment structure configured to direct the clamp to the line for mounting the clamp to the line.

10. The unmanned aerial vehicle of claim 6, comprising a mount attached to a first side of the body, the mount configured to receive the guide to attach the guide to the body.

11. An unmanned aerial vehicle for mounting a clamp to a line comprising:
a body;
a propeller attached to the body;
a guide attached to the body and configured to support the clamp for mounting to the line by flying the unmanned aerial vehicle toward the line, the guide comprising an attachment feature, wherein
the attachment feature is configured to support the clamp, the attachment feature comprising:
an attachment component configured to attach the clamp to the guide; and
a backing portion configured to exert a detachment force on the clamp to detach the clamp from the guide as the clamp moves from an arrested position to a closed position whereby a distance between a first jaw of the clamp and a second jaw of the clamp is decreased to mount the clamp to the line; and
a propeller guard attached to the body and configured to inhibit the propeller from contacting the line and to direct the clamp to the line, wherein
the propeller guard is below the propeller, to an exterior side of the propeller relative to the body, and above the propeller.

12. The unmanned aerial vehicle of claim 11, wherein the detachment force is a function of kinetic energy that causes the clamp to move from the arrested position to the closed position.

13. The unmanned aerial vehicle of claim 11, wherein the backing portion is configured to exert the detachment force to an arresting member of the clamp responsive to the arresting member contacting the backing portion as the clamp moves from the arrested position to the closed position.

14. The unmanned aerial vehicle of claim 11, wherein the attachment component comprises a first mating portion configured to mate with a second mating portion of the clamp to attach the clamp to the guide.

15. The unmanned aerial vehicle of claim 11, wherein the attachment component is elastically deformable to attach the clamp to the guide.

16. The unmanned aerial vehicle of claim 11, wherein the attachment feature comprises:
an alignment structure having elongated arms, the alignment structure attached to an attachment portion;
a cross-brace that extends substantially perpendicular to the attachment portion, and the cross-brace attached to the attachment portion;
a first attachment wall attached to the cross-brace;
a second attachment wall attached to the cross-brace; and
a first mating portion attached to the first attachment wall, the first mating portion configured to attach the clamp to the guide.

17. The unmanned aerial vehicle of claim 16, wherein the attachment feature comprises:
an abutment wall attached to the cross-brace; and
an abutment extension attached to the abutment wall such that an end of the abutment extension is spaced apart from the abutment wall and is in closer proximity to the cross-brace than the first mating portion.

18. The unmanned aerial vehicle of claim 16, wherein the cross-brace comprises:
a first attachment wall; and
a second attachment wall, wherein the first attachment wall, the second attachment wall, and the alignment structure are attached to a single side of the cross-brace such that the first attachment wall and the second attachment wall are disposed between the elongated arms of the alignment structure.

19. The unmanned aerial vehicle of claim 18, wherein the first attachment wall and the second attachment wall extend a distance outwardly from the cross-brace, and may be spaced apart to define an opening.

20. The unmanned aerial vehicle of claim 16, wherein the attachment portion is attached to a first side of the cross-brace and the alignment structure is attached to a second side of the cross-brace.

* * * * *